United States Patent
Leopold

(10) Patent No.: US 10,618,625 B2
(45) Date of Patent: Apr. 14, 2020

(54) INTEGRATED SLAT CHINE APPARATUS AND METHODS

(71) Applicant: The Boeing Company, Chicago, IL (US)

(72) Inventor: David Daniel Leopold, Seattle, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 15/648,103

(22) Filed: Jul. 12, 2017

(65) Prior Publication Data

US 2019/0016439 A1 Jan. 17, 2019

(51) Int. Cl.

| B64C 3/50 | (2006.01) |
|---|---|
| B64C 9/22 | (2006.01) |
| B64C 23/06 | (2006.01) |
| B64C 3/58 | (2006.01) |
| B64C 9/26 | (2006.01) |
| B64C 9/34 | (2006.01) |
| B64C 21/00 | (2006.01) |

(52) U.S. Cl.
CPC ............. B64C 3/50 (2013.01); B64C 3/58 (2013.01); B64C 9/22 (2013.01); B64C 9/26 (2013.01); B64C 9/34 (2013.01); B64C 21/00 (2013.01); B64C 23/06 (2013.01)

(58) Field of Classification Search
CPC .. B64C 3/50; B64C 21/00; B64C 9/34; B64C 23/06; B64C 9/26; B64C 9/22; B64C 3/58; B64C 9/14
See application file for complete search history.

(56) References Cited

U.S. PATENT DOCUMENTS

| 2,800,291 | A | * | 7/1957 | Stephens | ............... | B62D 35/00 |
|---|---|---|---|---|---|---|
| | | | | | | 244/200 |
| 3,285,542 | A | | 11/1966 | Holmquist | | |
| 7,900,871 | B2 | * | 3/2011 | Rincker | ................ | B64C 23/06 |
| | | | | | | 244/134 A |

(Continued)

FOREIGN PATENT DOCUMENTS

| EP | 2479106 | 7/2012 |
|---|---|---|
| EP | 3428059 | 1/2019 |

(Continued)

OTHER PUBLICATIONS

European Patent Office, "Extended European Search Report," issued in connection with European Patent Application No. 18167242.9, dated Oct. 17, 2018, 8 pages.

(Continued)

*Primary Examiner* — Assres H Woldemaryam

(74) *Attorney, Agent, or Firm* — Hanley, Flight & Zimmerman, LLC

(57) ABSTRACT

Integrated slat chine apparatus and methods are described. An example apparatus includes a chine and a slat. The chine is coupled to an airfoil. The chine includes a lateral surface. The slat is located adjacent the lateral surface of the chine and coupled to the airfoil. The slat is movable relative to the airfoil between a stowed position and a deployed position. The slat is to expose the lateral surface of the chine when the slat is in the deployed position and to cover the lateral surface of the chine when the slat is in the stowed position.

20 Claims, 26 Drawing Sheets

(56) References Cited

U.S. PATENT DOCUMENTS

| | | | | |
|---|---|---|---|---|
| 8,118,265 B2* | 2/2012 | Ferrari | ............. | B64C 3/58 |
| | | | | 244/199.1 |
| 8,622,350 B1* | 1/2014 | Hoffenberg | ............. | B64C 9/26 |
| | | | | 244/213 |
| 9,464,532 B2* | 10/2016 | Sutton | ............. | F01D 7/00 |
| 2009/0108141 A1* | 4/2009 | Shmilovich | ............. | B64C 3/58 |
| | | | | 244/207 |
| 2010/0176249 A1* | 7/2010 | Schwetzler | ............. | B64C 7/02 |
| | | | | 244/199.1 |
| 2012/0187253 A1* | 7/2012 | Dodd | ............. | B64C 3/50 |
| | | | | 244/214 |

FOREIGN PATENT DOCUMENTS

| | | | | |
|---|---|---|---|---|
| WO | 2008017134 | 2/2008 | | |
| WO | WO-2008017134 A2 * | 2/2008 | ............. | B64C 3/58 |
| WO | 2011099276 | 8/2011 | | |

OTHER PUBLICATIONS

Owens, Chris, "[HD] Delta Connection E170 KLGA-KORD," [https://www.youtube.com/watch?v=izVdKrbC7cU], retrieved on Jul. 12, 2017, 3 pages.

* cited by examiner

INTEGRATED SLAT CHINE APPARATUS AND METHODS

FIELD OF THE DISCLOSURE

This disclosure relates generally to slats and, more specifically, to integrated slat chine apparatus and methods.

BACKGROUND

Slats are lift enhancement devices for use with airfoils (e.g., wings) of aircraft. Any number of slats may be located at and/or arranged along a topside and/or a leading edge of an airfoil in a spanwise direction of the airfoil. Conventional slats are movable between a stowed position located at a topside and/or a leading edge of an airfoil to which the slat is coupled, and a deployed position in which at least a portion of the slat (e.g., a leading edge of the slat) is located forward of the leading edge of the airfoil. When deployed, a slat increases the camber of the airfoil to which the slat is coupled and also delays boundary layer separation, thereby increasing the maximum coefficient of lift associated with the airfoil at higher angles of attack. The deployment of slats typically provides for improved (e.g., increased) handling of the aircraft at lower speeds (e.g., aircraft speeds of Mach 0.4 or less).

SUMMARY

Integrated slat chine apparatus and methods are disclosed herein. In some disclosed examples, a first example apparatus comprises a chine and a slat. In some disclosed examples, the chine is coupled to an airfoil. In some disclosed examples, the chine has a lateral surface. In some disclosed examples, the slat is located adjacent the lateral surface of the chine and coupled to the airfoil. In some disclosed examples, the slat is movable relative to the airfoil between a stowed position and a deployed position. In some disclosed examples, the slat is to expose the lateral surface of the chine when the slat is in the deployed position and to cover the lateral surface of the chine when the slat is in the stowed position.

In some disclosed examples, a second example apparatus comprises a chine and a slat. In some disclosed examples, the chine is coupled to an airfoil. In some disclosed examples, the chine has a first lateral surface and a second lateral surface located opposite the first lateral surface. In some disclosed examples, the slat is coupled to the airfoil. In some disclosed examples, the chine is located within a lateral extent of the slat along the airfoil. In some disclosed examples, the slat is movable relative to the airfoil between a stowed position and a deployed position. In some disclosed examples, the slat is to expose the first lateral surface and the second lateral surface of the chine when the slat is in the deployed position and to cover the first lateral surface and the second lateral surface of the chine when the slat is in the stowed position.

In some disclosed examples, a third example apparatus comprises a chine and a slat. In some disclosed examples, the chine is coupled to an airfoil. In some disclosed examples, the chine has an outer mold line. In some disclosed examples, the slat is coupled to the airfoil. In some disclosed examples, the chine is located within a lateral extent of the slat along the airfoil. In some disclosed examples, the slat is movable relative to the airfoil between a stowed position and a deployed position. In some disclosed examples, the slat is to expose the outer mold line of the chine when the slat is in the deployed position and to cover the outer mold line of the chine when the slat is in the stowed position.

In some disclosed examples, a first example method comprises moving a slat relative to an airfoil between a stowed position and a deployed position. In some disclosed examples, the slat is coupled to the airfoil. In some disclosed examples, the slat is located adjacent a lateral surface of a chine. In some disclosed examples, the chine is coupled to the airfoil. In some disclosed examples, the slat is to expose the lateral surface of the chine when the slat is in the deployed position and to cover the lateral surface of the chine when the slat is in the stowed position.

In some disclosed examples, a second example method comprises moving a slat relative to an airfoil between a stowed position and a deployed position. In some disclosed examples, the slat is coupled to the airfoil. In some disclosed examples, the chine is coupled to the airfoil. In some disclosed examples, the chine is located within a lateral extent of the slat along the airfoil. In some disclosed examples, the chine has a first lateral surface and a second lateral surface located opposite the first lateral surface. In some disclosed examples, the slat is to expose the first lateral surface and the second lateral surface of the chine when the slat is in the deployed position and to cover the first lateral surface and the second lateral surface of the chine when the slat is in the stowed position.

In some disclosed examples, a third example method comprises moving a slat relative to an airfoil between a stowed position and a deployed position. In some disclosed examples, the slat is coupled to the airfoil. In some disclosed examples, a chine having an outer mold line is coupled to the airfoil. In some disclosed examples, the chine is located within a lateral extent of the slat along the airfoil. In some disclosed examples, the slat is to expose the outer mold line of the chine when the slat is in the deployed position and to cover the outer mold line of the chine when the slat is in the stowed position.

Figure 1:
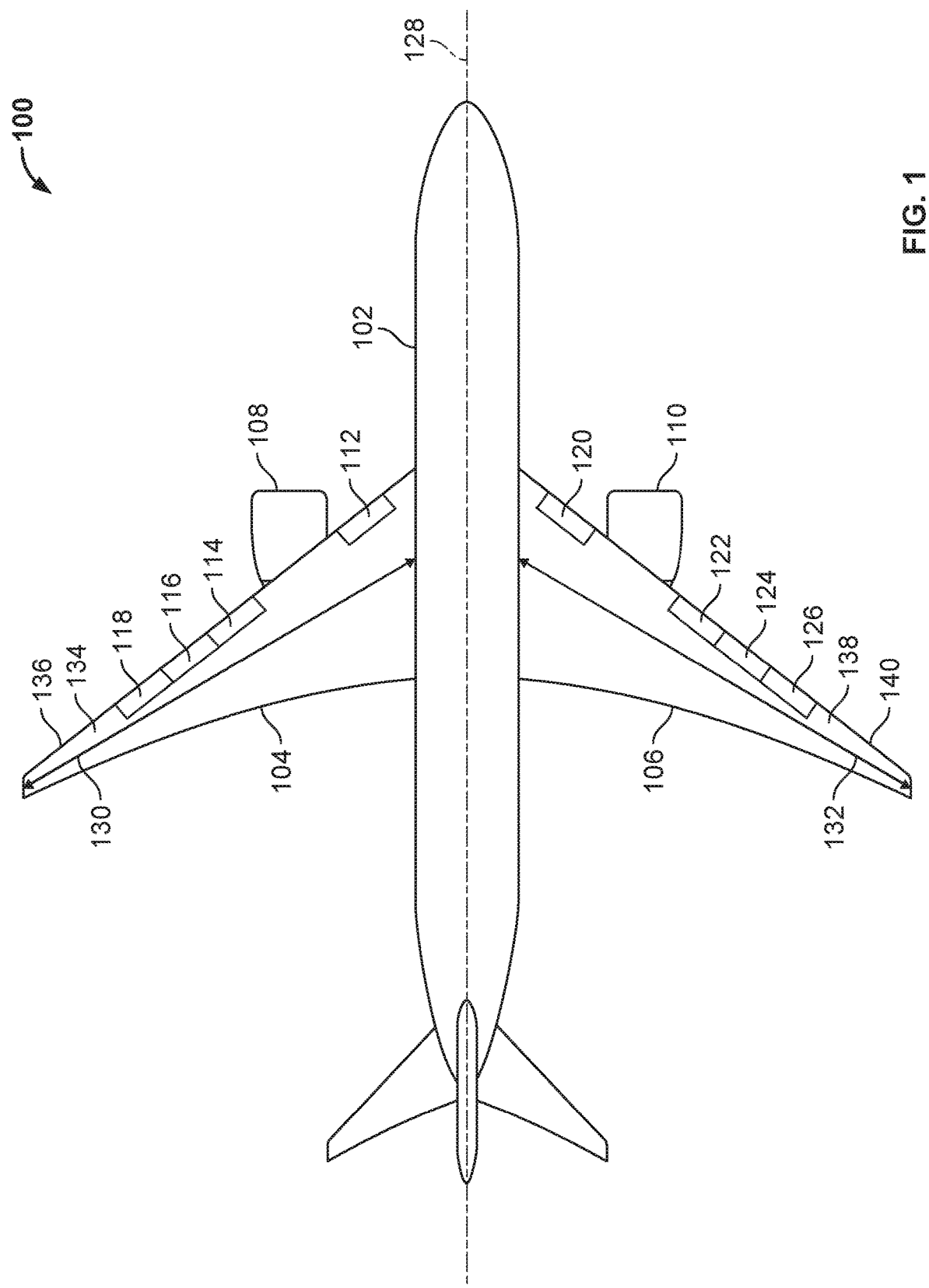
FIG. 1 illustrates an example aircraft in which an example integrated slat chine may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Optimizing the aerodynamic performance of a swept aircraft wing presents a challenge with respect to tuning an inboard portion of the wing (e.g., between a fuselage and a nacelle and/or engine coupled to the wing) and an outboard portion of the wing (e.g., beyond the nacelle and/or engine in a direction toward the tip of the wing) to ensure that the inboard portion stalls first. By ensuring that the inboard portion of the wing stalls first, the stall will advantageously be accompanied by a nose-down aircraft characteristic.

Known solutions for optimizing the inboard portion of the wing include implementing one or more chine(s) coupled to and/or integrated with the exterior of the nacelle. While the implementation of nacelle chines may be beneficial for the purpose of tuning the inboard portion of the wing, the presence of the nacelle chines may give rise to undesirable aerodynamic performance penalties during high-speed operation of the aircraft (e.g., during cruise). Moreover, nacelle chines fail to provide an adequate solution for tuning the outboard portion of the wing, primarily due to the lack of an outboard engine. The inboard portion of the wing must therefore typically be detuned to compensate for the outboard portion of the wing, and to ensure proper performance of the wing and the aircraft. Detuning the inner portion of the wing results in a sub-optimized wing, however, when a preferred solution would be to strengthen and/or increase the aerodynamic performance of the outboard portion of the wing. As a result of such detuning, the wing and the aircraft suffer significant aerodynamic performance penalties.

Known solutions for increasing the performance of the outboard portion of the wing include implementing an auto-slat and/or auto-gap function to move the outboard slat into a gapped configuration while maintaining an inboard slat in a sealed (e.g., non-gapped) configuration. Such auto-slat and/or auto gap functions typically operate at a predetermined angle of attack to ensure that the outboard slat moves quickly enough to cause the inner portion of the wing to stall prior to the outer portion of the wing. The implementation of such auto-slat and/or auto-gap functions undesirably places enormous demands on the deployment and/or actuation assemblies that control the movement of the outboard slat.

Unlike the known solutions and/or known configurations described above, the integrated slat chine apparatus and methods disclosed herein advantageously increase the aerodynamic performance (e.g., increase the maximum lift coefficient) of an airfoil when a slat of the apparatus is deployed (e.g., during takeoff and/or landing operations of an aircraft) relative to a chine of the apparatus that is coupled to and/or integrated with the airfoil. For example, the chine of the apparatus may advantageously generate a vortex to energize and/or re-energize a boundary layer of the airfoil to which the chine is coupled. The generated vortex may increase a lift to drag (L/D) ratio associated with the airfoil when the slat of the apparatus is deployed. The disclosed integrated slat chine apparatus and methods provide the aforementioned benefit without adversely impacting the aerodynamic performance of the airfoil when the slat of the apparatus is stowed (e.g., during a cruise operation of an aircraft) relative to the chine of the apparatus. Implementation of the disclosed integrated slat chine apparatus and methods may also advantageously reduce (e.g., eliminate) any reliance on and/or need for auto-slat and/or auto-gap functions and associated actuation hardware.

FIG. 1 illustrates an example aircraft 100 in which an example integrated slat chine may be implemented in accordance with the teachings of this disclosure. The aircraft 100 includes an example fuselage 102, a first example wing 104 (e.g., a first airfoil), a second example wing 106 (e.g., a second airfoil), a first example nacelle 108, a second example nacelle 110, a first example slat 112, a second example slat 114, a third example slat 116, a fourth example slat 118, a fifth example slat 120, a sixth example slat 122, a seventh example slat 124, and an eighth example slat 126.

The fuselage 102 of FIG. 1 has a generally cylindrical shape that defines an example longitudinal axis 128 of the aircraft 100. The first wing 104 and the second wing 106 of FIG. 1 are respectively coupled to the fuselage 102 and swept in a rearward direction of the aircraft 100. The first wing 104 includes and/or defines a first example spanwise direction 130, and the second wing 106 includes and/or defines a second example spanwise direction 132. The first nacelle 108 of FIG. 1 is coupled to the first wing 104, and the second nacelle 110 of FIG. 1 is coupled to the second wing 106.

In the illustrated example of FIG. 1, respective ones of the first slat 112, the second slat 114, the third slat 116, and the fourth slat 118 are shown in a stowed position relative to the first wing 104 of FIG. 1, and respective ones of the fifth slat 120, the sixth slat 122, the seventh slat 124, and the eighth slat 126 are shown in a stowed position relative to the second wing 106 of FIG. 1. Respective ones of the first slat 112, the second slat 114, the third slat 116, and the fourth slat 118 are coupled to and/or deployable from the first wing 104 of FIG. 1, and respective ones of the fifth slat 120, the sixth slat 122, the seventh slat 124, and the eighth slat 126 are coupled to and/or deployable from the second wing 106 of FIG. 1. When in the stowed position shown in FIG. 1, respective ones of the first slat 112, the second slat 114, the third slat 116, and the fourth slat 118 are located at and/or arranged along an example topside 134 and/or an example leading edge 136 of the first wing 104 of FIG. 1, and respective ones of the fifth slat 120, the sixth slat 122, the seventh slat 124, and the eighth slat 126 are located at and/or arranged along an example topside 138 and/or an example leading edge 140 of the second wing 106 of FIG. 1.

In the illustrated example of FIG. 1, the first slat 112 is located inboard on the first wing 104 relative to the first nacelle 108, and the fifth slat 120 is located inboard on the second wing 106 relative to the second nacelle 110. Respective ones of the second slat 114, the third slat 116, and the fourth slat 118 are located outboard on the first wing 104 relative to the first nacelle 108, and respective ones of the sixth slat 122, the seventh slat 124, and the eighth slat 126 are located outboard on the second wing 106 relative to the second nacelle 110.

Figure 2:
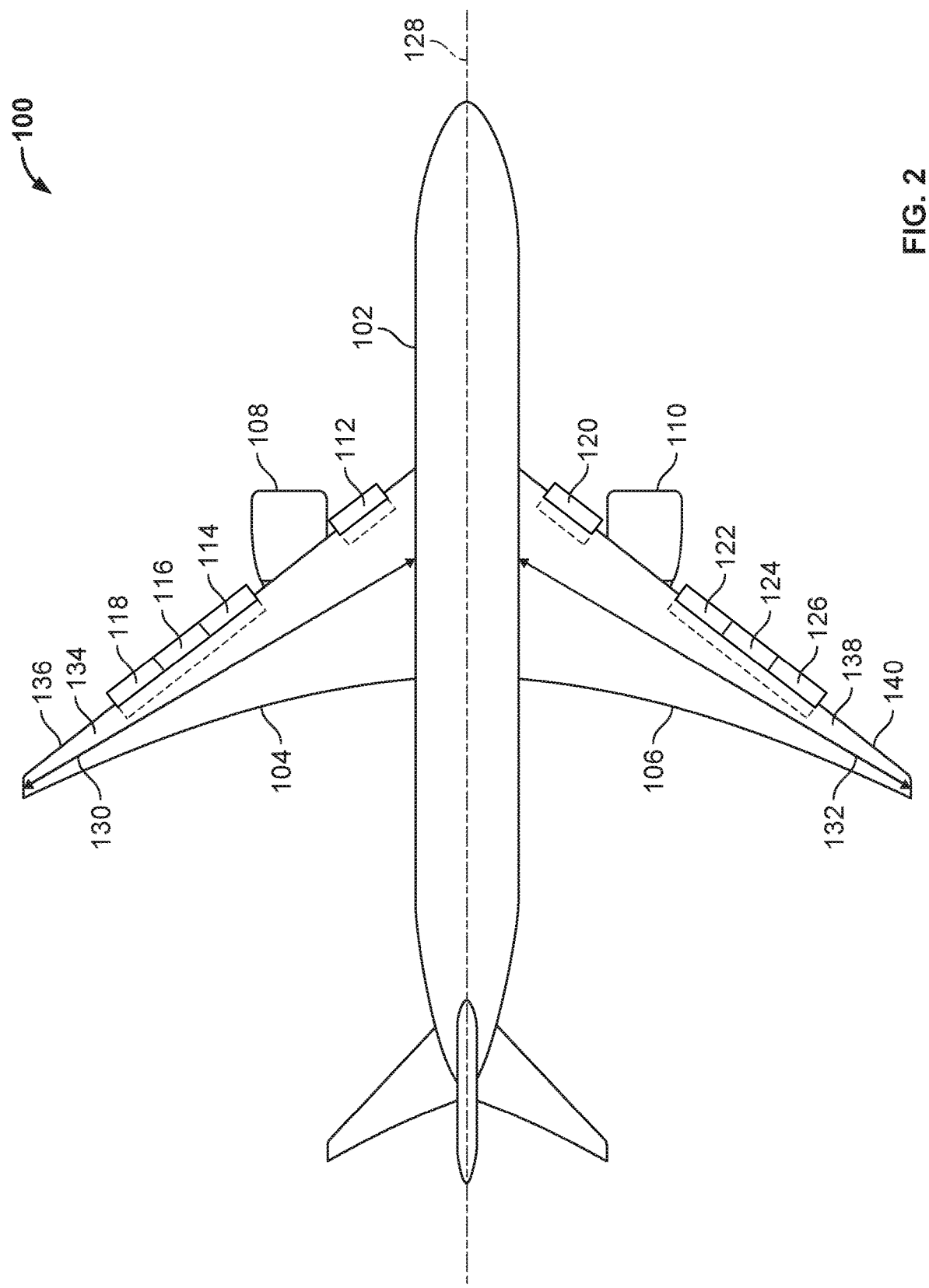
FIG. 2 illustrates the example aircraft of FIG. 1 with the example slats of FIG. 1 deployed.

FIG. 2 illustrates the example aircraft 100 of FIG. 1 with the example slats of FIG. 1 (e.g., the first slat 112, the second slat 114, the third slat 116, the fourth slat 118, the fifth slat 120, the sixth slat 122, the seventh slat 124, and the eighth slat 126) deployed. In the illustrated example of FIG. 2, respective ones of the first slat 112, the second slat 114, the third slat 116, and the fourth slat 118 are shown in a deployed position relative to the first wing 104 of FIG. 2, and respective ones of the fifth slat 120, the sixth slat 122, the seventh slat 124, and the eighth slat 126 are shown in a deployed position relative to the second wing 106 of FIG. 2. Respective ones of the first slat 112, the second slat 114, the third slat 116, the fourth slat 118, the fifth slat 120, the sixth slat 122, the seventh slat 124, and the eighth slat 126 of FIG. 1 may be deployed to a sealed position or a gapped position. As used herein, the terms "sealed position" and "sealed configuration" refer interchangeably to a slat position and/or configuration in which a gap does not exist between a trailing edge of a deployed slat and a leading edge of an airfoil (e.g., a wing) to which the slat is coupled. An example sealed configuration is shown and described herein in connection with FIGS. 6 and 7. As used herein, the terms "gapped position" and "gapped configuration" refer interchangeably to a slat position and/or configuration in which a gap exists between a trailing edge of a deployed slat and a leading edge of an airfoil (e.g., a wing) to which the slat is coupled. An example gapped configuration is shown and described herein in connection with FIGS. 3-5.

As further described below in connection with the examples of FIGS. 3-9, one or more chine(s) may be coupled to and/or integrated with the first wing 104 of FIGS. 1 and 2 adjacent to one or more of the of the first slat 112, the second slat 114, the third slat 116, and/or the fourth slat 118 of FIGS. 1 and 2. One or more chine(s) may also be coupled to and/or integrated with the second wing 106 of FIGS. 1 and 2 adjacent to one or more of the of the fifth slat 120, the sixth slat 122, the seventh slat 124, and/or the eighth slat 126 of FIGS. 1 and 2. In some such examples, one or more of the slat(s) may cover one or more lateral surface(s) of the adjacent chine when the slat(s) is/are in a stowed position (e.g., the stowed position shown in FIG. 1), and the one or more slat(s) may expose the one or more lateral surface(s) of the adjacent chine when the slat(s) is/are in a deployed position (e.g., the deployed position shown in FIG. 2).

For example, a first chine may be coupled to and/or integrated with the first wing 104 of FIGS. 1 and 2 such that the first chine is located and/or positioned between the second slat 114 and the third slat 116 of FIGS. 1 and 2. In such an example, the second slat 114 and the third slat 116 may cover the lateral surfaces of the first chine when the second slat 114 and the third slat 116 are in the stowed position shown in FIG. 1, and the second slat 114 and the third slat 116 may expose the lateral surfaces of the first chine when the second slat 114 and the third slat 116 are in the deployed position shown in FIG. 2.

As another example, a second chine may be coupled to and/or integrated with the second wing 106 of FIGS. 1 and 2 such that the second chine is located and/or positioned between the sixth slat 122 and the seventh slat 124 of FIGS. 1 and 2. In such an example, the sixth slat 122 and the seventh slat 124 may cover the lateral surfaces of the second chine when the sixth slat 122 and the seventh slat 124 are in the stowed position shown in FIG. 1, and the sixth slat 122 and the seventh slat 124 may expose the lateral surfaces of the second chine when the sixth slat 122 and the seventh slat 124 are in the deployed position shown in FIG. 2.

In some examples, respective ones of the chines extend orthogonally from a leading edge of an airfoil (e.g., a wing) to which the chine is coupled. For example, a first chine coupled to and/or integrated with the first wing 104 of FIGS. 1 and 2 adjacent the second slat 114 of the first wing 104 may extend orthogonally from the leading edge 136 of the first wing 104 in a direction that is parallel to a direction of deployment of the second slat 114 relative to the first wing 104. As another example, a second chine coupled to and/or integrated with the second wing 106 of FIGS. 1 and 2 adjacent the sixth slat 122 of the second wing 106 may extend orthogonally from the leading edge 140 of the second wing 106 in a direction that is parallel to a direction of deployment of the sixth slat 122 relative to the second wing 106.

As further described below in connection with the examples of FIGS. 10-16, one or more chine(s) may additionally and/or alternatively be coupled to and/or integrated with the first wing 104 of FIGS. 1 and 2 at a location within a lateral extent (e.g., an extent in the first spanwise direction 130 of the first wing 104) of one or more of the of the first slat 112, the second slat 114, the third slat 116, and/or the fourth slat 118 of FIGS. 1 and 2. One or more chine(s) may also additionally and/or alternatively be coupled to and/or integrated with the second wing 106 of FIGS. 1 and 2 at a location within a lateral extent (e.g., an extent in the second spanwise direction 132 of the second wing 106) of one or more of the of the fifth slat 120, the sixth slat 122, the seventh slat 124, and/or the eighth slat 126 of FIGS. 1 and 2. In some such examples, the slat may cover a first lateral surface of the corresponding chine and a second lateral surface of the corresponding chine located opposite the first lateral surface when the slat is in a stowed position (e.g., the stowed position shown in FIG. 1). The slat may expose the first lateral surface and the second lateral surface of the corresponding chine when the slat is in a deployed position (e.g., the deployed position shown in FIG. 2).

For example, a first chine may be coupled to and/or integrated with the first wing 104 of FIGS. 1 and 2 such that the first chine is located within the lateral extent of the second slat 114 of FIGS. 1 and 2. In such an example, the second slat 114 may cover the lateral surfaces of the first chine when the second slat 114 is in the stowed position shown in FIG. 1, and the second slat 114 may expose the lateral surfaces of the first chine when the second slat 114 is in the deployed position shown in FIG. 2.

As another example, a second chine may be coupled to and/or integrated with the second wing 106 of FIGS. 1 and 2 such that the second chine is located within the lateral extent of the sixth slat 122 of FIGS. 1 and 2. In such an example, the sixth slat 122 may cover the lateral surfaces of the second chine when the sixth slat 122 is in the stowed position shown in FIG. 1, and the sixth slat 122 may expose the lateral surfaces of the second chine when the sixth slat 122 is in the deployed position shown in FIG. 2.

In some examples, respective ones of the chines extend orthogonally from a leading edge of an airfoil (e.g., a wing) to which the chine is coupled. For example, a first chine coupled to and/or integrated with the first wing 104 of FIGS. 1 and 2 at a location within the lateral extent of the second slat 114 of the first wing 104 may extend orthogonally from the leading edge 136 of the first wing 104 in a direction that is parallel to a direction of deployment of the second slat 114 relative to the first wing 104. As another example, a second chine coupled to and/or integrated with the second wing 106 of FIGS. 1 and 2 at a location within the lateral extent of the sixth slat 122 of the second wing 106 may extend orthogonally from the leading edge 140 of the second wing 106 in a direction that is parallel to a direction of deployment of the sixth slat 122 relative to the second wing 106.

As further described below in connection with the examples of FIGS. 17-23, one or more chine(s) may additionally and/or alternatively be coupled to and/or integrated with the first wing 104 of FIGS. 1 and 2 at a location within a lateral extent (e.g., an extent in the first spanwise direction 130 of the first wing 104) of one or more of the of the first slat 112, the second slat 114, the third slat 116, and/or the fourth slat 118 of FIGS. 1 and 2. One or more chine(s) may also additionally and/or alternatively be coupled to and/or integrated with the second wing 106 of FIGS. 1 and 2 at a location within a lateral extent (e.g., an extent in the second spanwise direction 132 of the second wing 106) of one or more of the of the fifth slat 120, the sixth slat 122, the seventh slat 124, and/or the eighth slat 126 of FIGS. 1 and 2. In some such examples, the slat may cover an outer mold line of the corresponding chine when the slat is in a stowed position (e.g., the stowed position shown in FIG. 1), and the slat may expose the outer mold line of the corresponding chine when the slat is in a deployed position (e.g., the deployed position shown in FIG. 2).

For example, a first chine may be coupled to and/or integrated with the first wing 104 of FIGS. 1 and 2 such that the first chine is located within the lateral extent of the second slat 114 of FIGS. 1 and 2. In such an example, the second slat 114 may cover the outer mold line of the first chine when the second slat 114 is in the stowed position shown in FIG. 1, and the second slat 114 may expose the outer mold line of the first chine when the second slat 114 is in the deployed position shown in FIG. 2.

As another example, a second chine may be coupled to and/or integrated with the second wing 106 of FIGS. 1 and 2 such that the second chine is located within the lateral extent of the sixth slat 122 of FIGS. 1 and 2. In such an example, the sixth slat 122 may cover the outer mold line of the second chine when the sixth slat 122 is in the stowed position shown in FIG. 1, and the sixth slat 122 may expose the outer mold line of the second chine when the sixth slat 122 is in the deployed position shown in FIG. 2.

In some examples, respective ones of the chines extend orthogonally from a leading edge of an airfoil (e.g., a wing) to which the chine is coupled. For example, a first chine coupled to and/or integrated with the first wing 104 of FIGS. 1 and 2 at a location within the lateral extent of the second slat 114 of the first wing 104 may extend orthogonally from the leading edge 136 of the first wing 104 in a direction that is parallel to a direction of deployment of the second slat 114 relative to the first wing 104. As another example, a second chine coupled to and/or integrated with the second wing 106 of FIGS. 1 and 2 at a location within the lateral extent of the sixth slat 122 of the second wing 106 may extend orthogonally from the leading edge 140 of the second wing 106 in a direction that is parallel to a direction of deployment of the sixth slat 122 relative to the second wing 106.

In some examples, respective ones of the chines extend from a leading edge of an airfoil (e.g., a wing) to which the chine is coupled at an angle that is not orthogonal relative to the leading edge. For example, a first chine coupled to and/or integrated with the first wing 104 of FIGS. 1 and 2 at a location within the lateral extent of the second slat 114 of the first wing 104 may extend from the leading edge 136 of the first wing 104 in a direction that is offset from and/or at an angle to a direction of deployment of the second slat 114 relative to the first wing 104. As another example, a second chine coupled to and/or integrated with the second wing 106 of FIGS. 1 and 2 at a location within the lateral extent of the sixth slat 122 of the second wing 106 may extend from the leading edge 140 of the second wing 106 in a direction that is offset from and/or at an angle to a direction of deployment of the sixth slat 122 relative to the second wing 106. In some examples, the angle at which a chine extends from a leading edge of an airfoil to which the chine is coupled may be approximately fifteen degrees inboard relative to the direction of deployment of a corresponding slat (e.g., a slat that is to cover the outer mold line of the chine when the slat is in a stowed position).

While the aircraft 100 of FIGS. 1 and 2 is illustrated as having a total of eight slats (e.g., the first slat 112, the second slat 114, the third slat 116, the fourth slat 118, the fifth slat 120, the sixth slat 122, the seventh slat 124, and the eighth slat 126), the aircraft 100 of FIGS. 1 and 2 may in other examples include additional (e.g., ten, twelve, fourteen, etc.) or fewer (e.g., two, four, six) slats. In some examples, the location(s), size(s), and/or shape(s) of respective ones of the slats (e.g., the first slat 112, the second slat 114, the third slat 116, the fourth slat 118, the fifth slat 120, the sixth slat 122, the seventh slat 124, and the eighth slat 126) of the aircraft 100 may differ relative to the location(s), size(s) and/or shape(s) of the slats shown in FIGS. 1 and 2.

Figure 3:
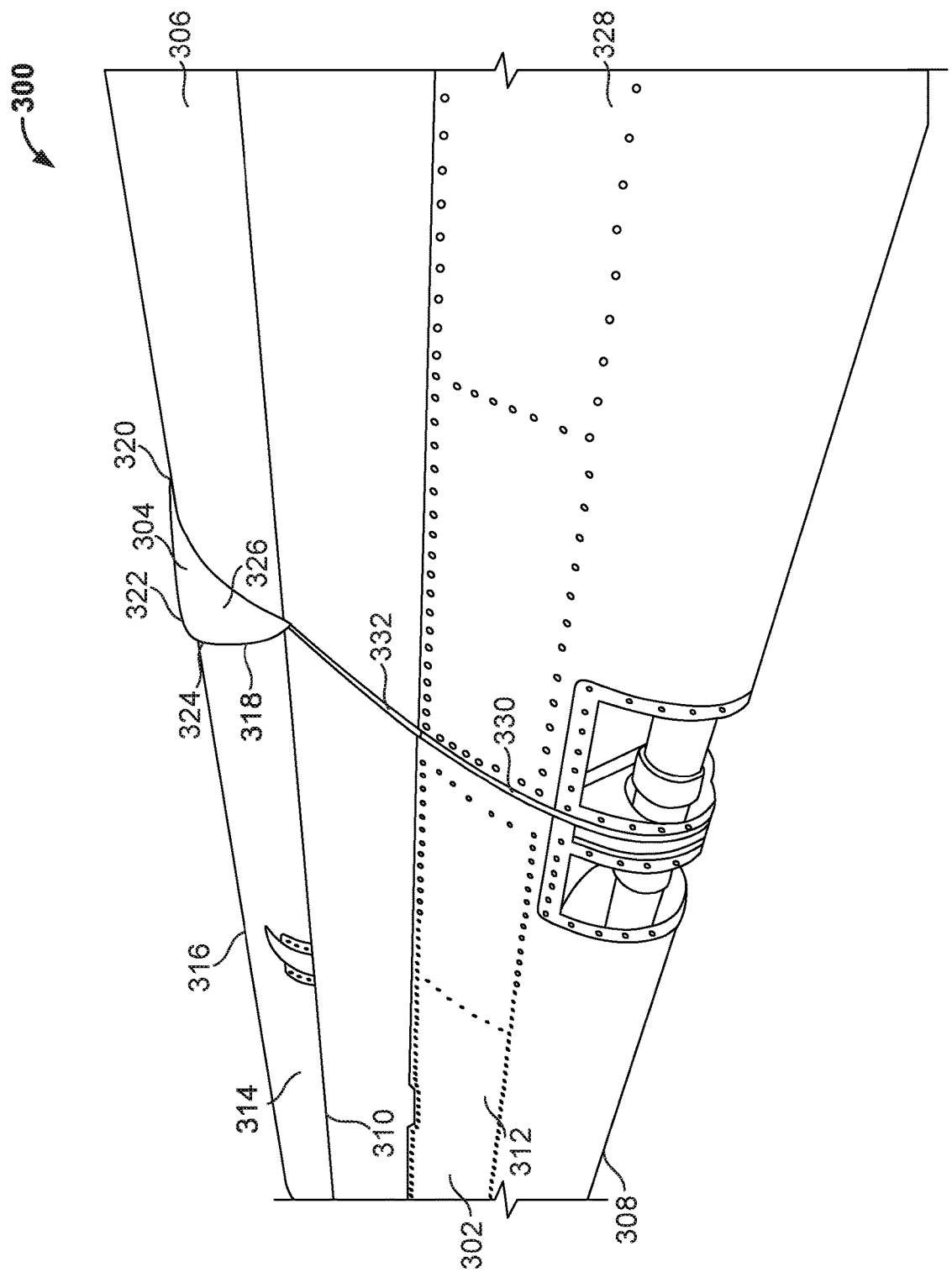
FIG. 3 is a perspective view of an example slat in a first example deployed position relative to an example chine of an example airfoil.
Figure 4:
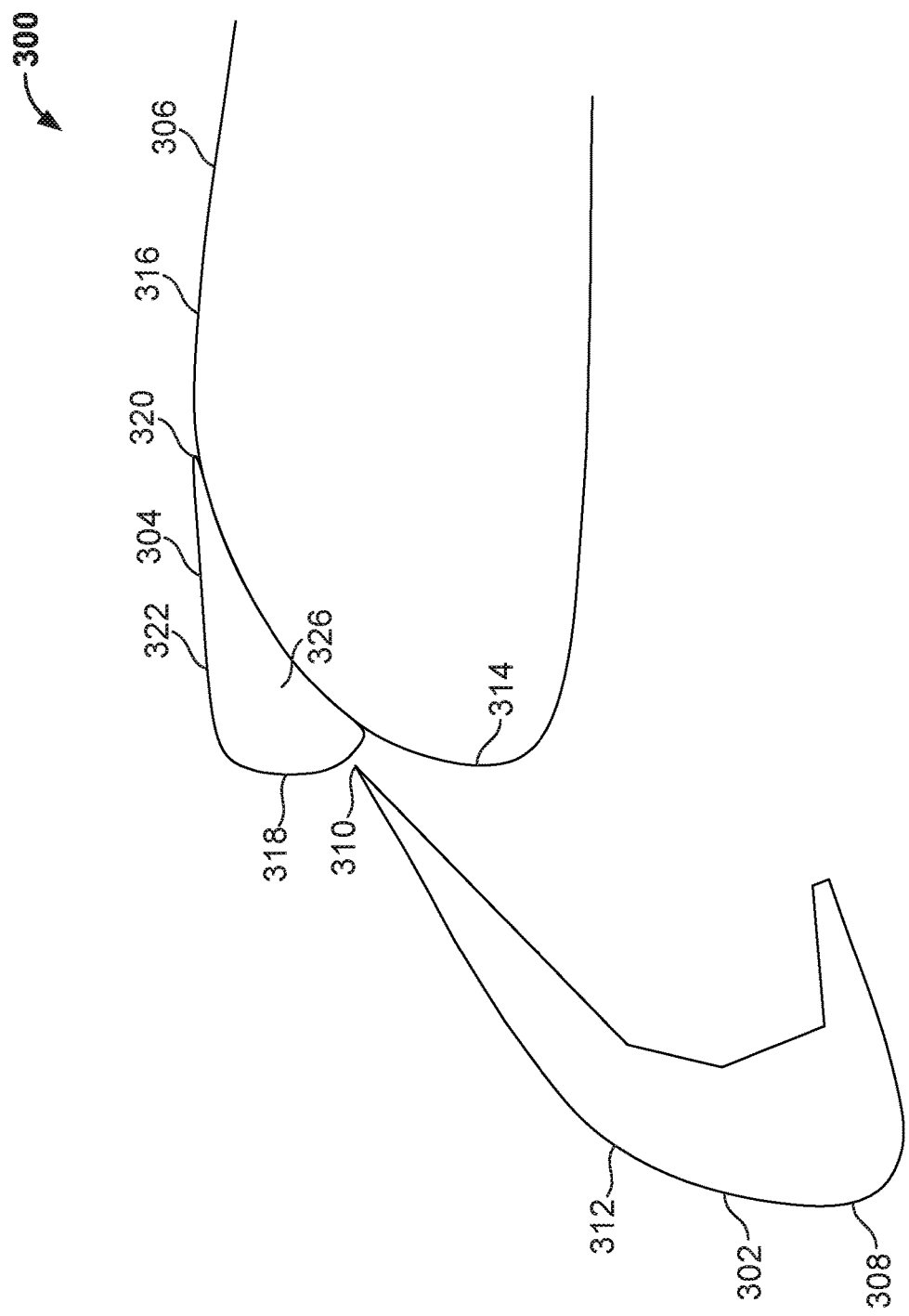
FIG. 4 is a cross-sectional view of the example slat of FIG. 3 in the first example deployed position of FIG. 3.
Figure 5:
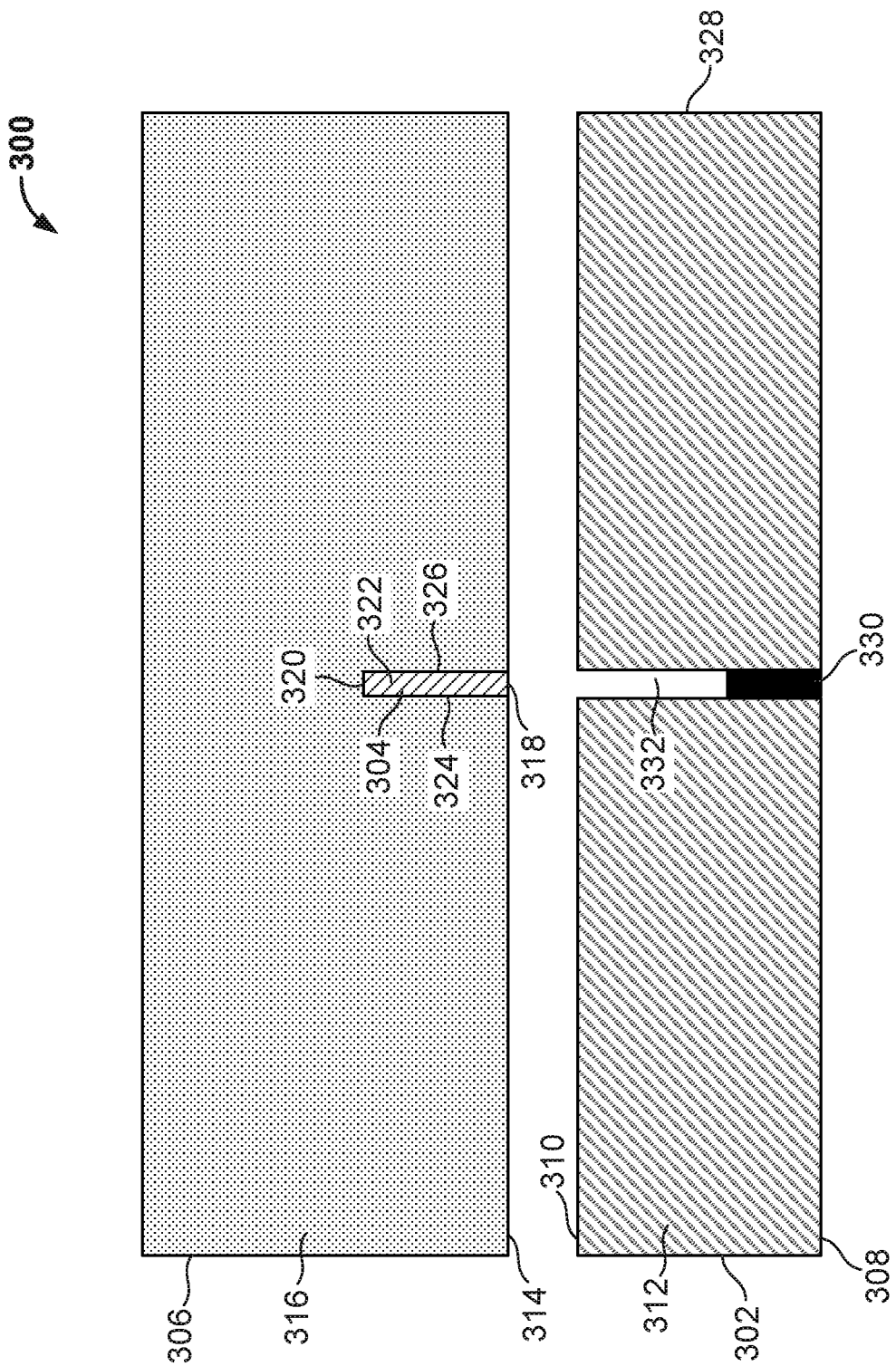
FIG. 5 is a topside view of the example slat of FIGS. 3 and 4 in the first example deployed position of FIGS. 3 and 4.
Figure 6:
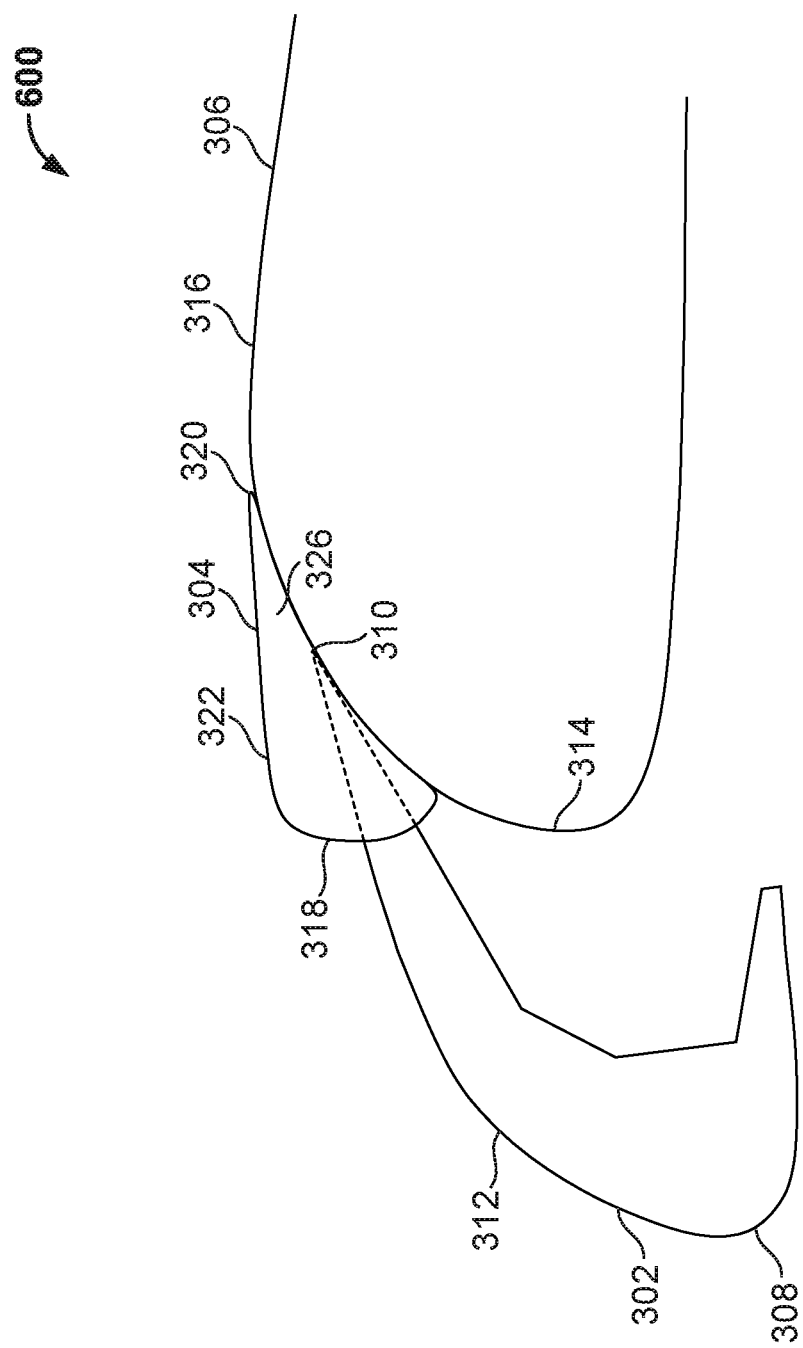
FIG. 6 is a cross-sectional view of the example slat of FIGS. 3-5 in a second example deployed position relative to the example chine of the example airfoil of FIGS. 3-5.
Figure 7:
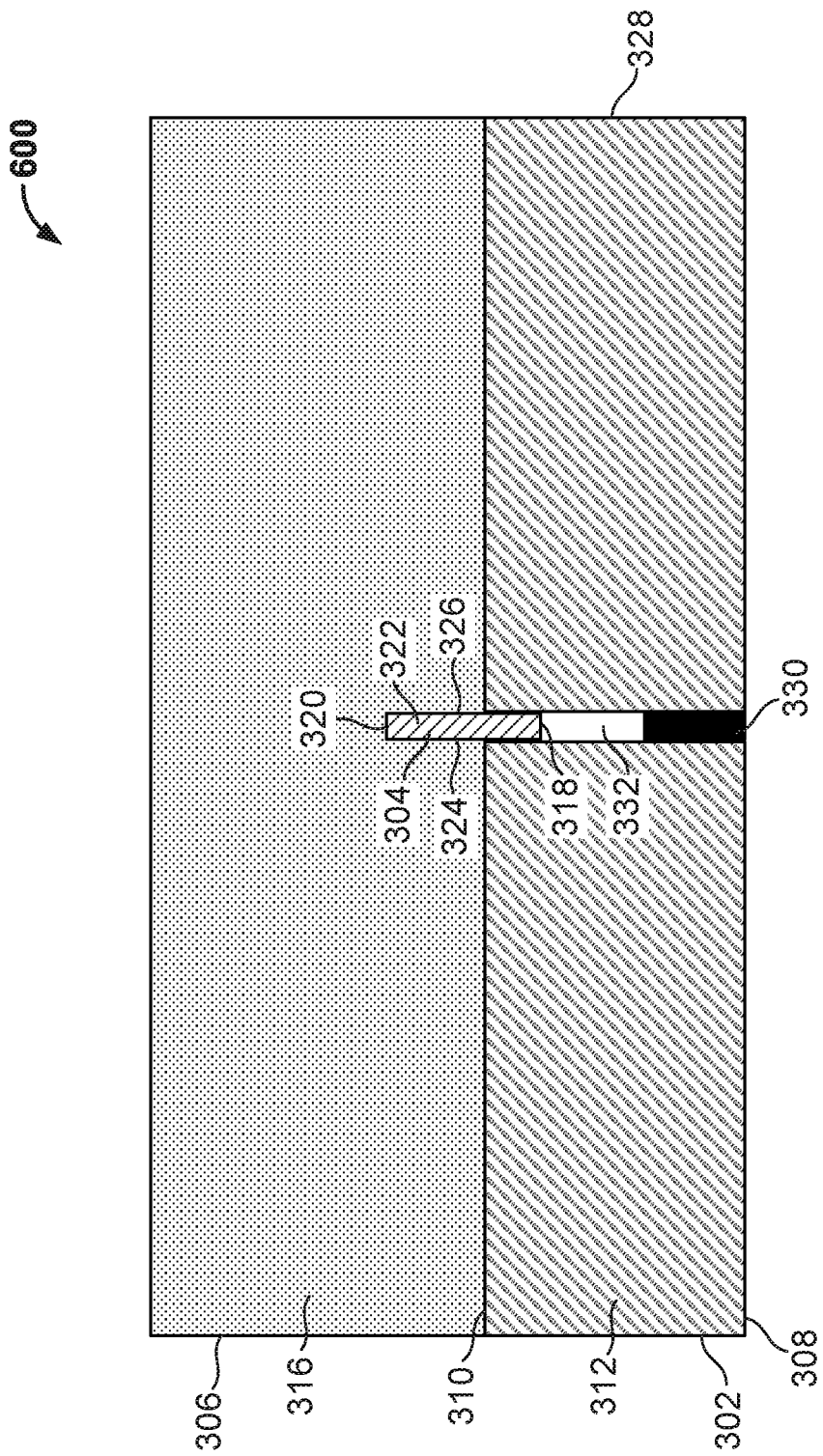
FIG. 7 is a topside view of the example slat of FIGS. 3-6 in the second example deployed position of FIG. 6.
Figure 8:
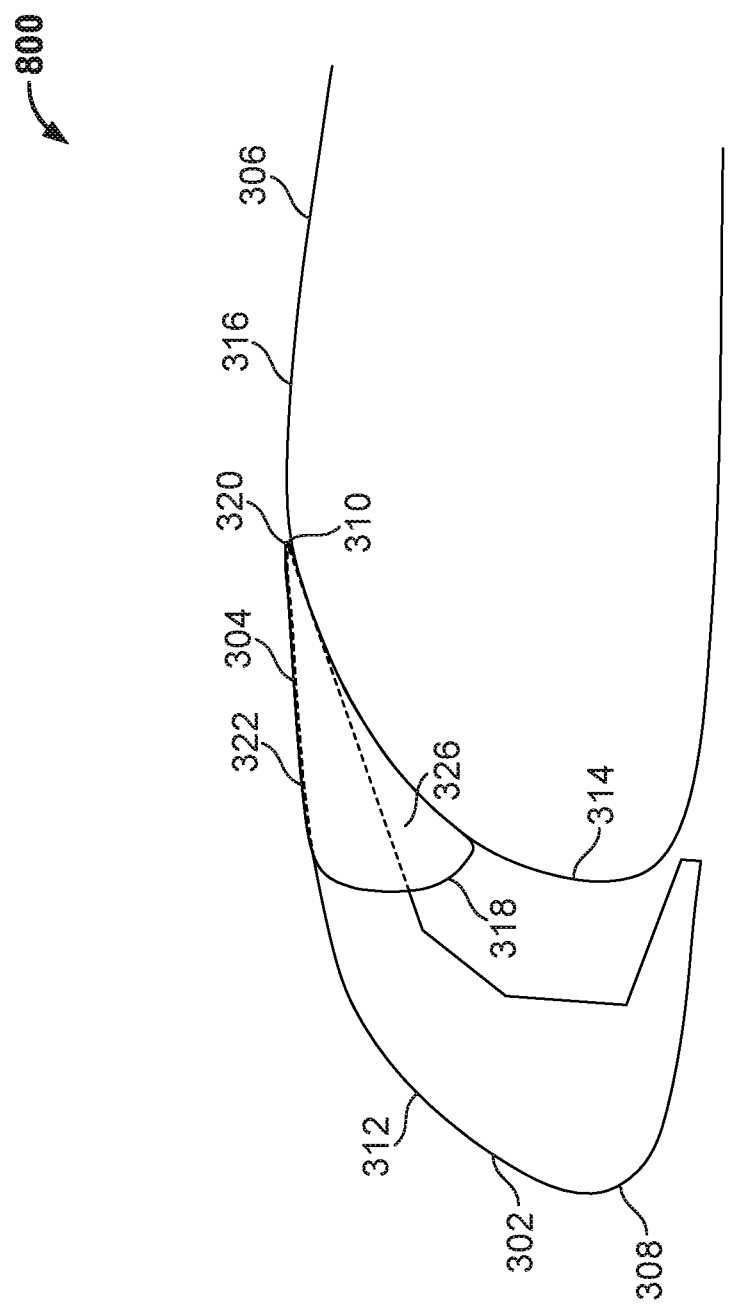
FIG. 8 is a cross-sectional view of the example slat of FIGS. 3-7 in an example stowed position relative to the example chine of the example airfoil of FIGS. 3-7.
Figure 9:
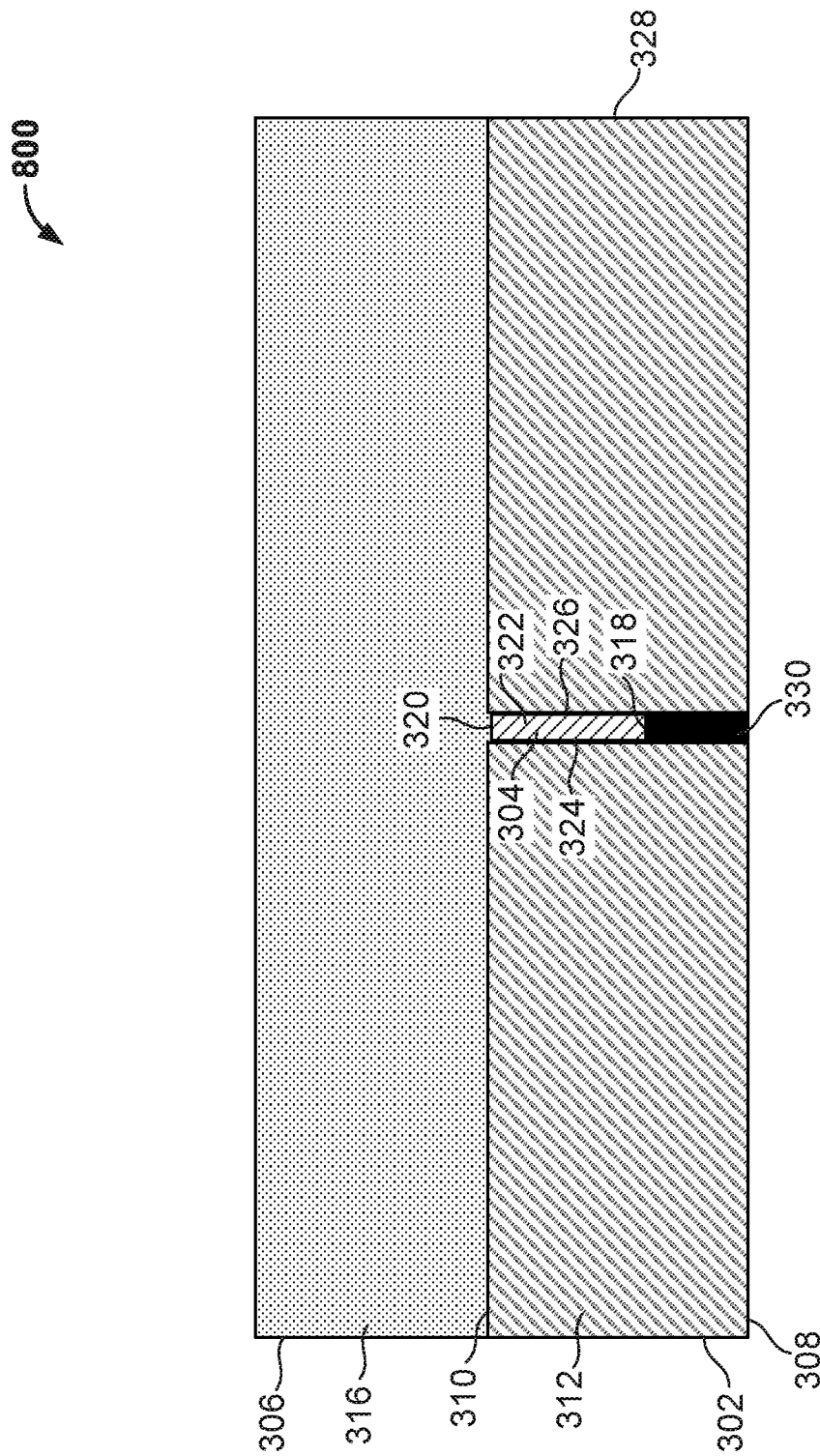
FIG. 9 is a topside view of the example slat of FIGS. 3-8 in the example stowed position of FIG. 8.

FIG. 3 is a perspective view of an example slat 302 in a first example deployed position 300 relative to an example chine 304 of an example airfoil 306. FIG. 4 is a cross-sectional view of the example slat 302 of FIG. 3 in the first example deployed position 300 of FIG. 3. FIG. 5 is a topside view of the example slat 302 of FIGS. 3 and 4 in the first example deployed position 300 of FIGS. 3 and 4. FIG. 6 is a cross-sectional view of the example slat 302 of FIGS. 3-5 in a second example deployed position 600 relative to the example chine 304 of the example airfoil 306 of FIGS. 3-5. FIG. 7 is a topside view of the example slat 302 of FIGS. 3-6 in the second example deployed position 600 of FIG. 6. FIG. 8 is a cross-sectional view of the example slat 302 of FIGS. 3-7 in an example stowed position 800 relative to the example chine 304 of the example airfoil 306 of FIGS. 3-7. FIG. 9 is a topside view of the example slat 302 of FIGS. 3-8 in the example stowed position 800 of FIG. 8.

In some examples, the slat 302 of FIGS. 3-9 may be positioned in the first deployed position 300 of FIGS. 3-5 during a landing operation of a flight of an aircraft (e.g., the aircraft 100 of FIG. 1) implementing the slat 302 and the chine 304 of FIGS. 3-9. In some examples, the slat 302 of FIGS. 3-9 may be positioned in the second deployed position 600 of FIGS. 6 and 7 during a takeoff operation and/or during a descent operation of a flight of an aircraft (e.g., the aircraft 100 of FIG. 1) implementing the slat 302 and the chine 304 of FIGS. 3-9. In some examples, the slat 302 of FIGS. 3-9 may be positioned in the first deployed position 300 of FIGS. 3-5 or the second deployed position 600 of FIGS. 6 and 7 when an aircraft (e.g., the aircraft 100 of FIG. 1) implementing the slat 302 and the chine 304 of FIGS. 3-9 is traveling at a speed of approximately Mach 0.4 or less. In some examples, the slat 302 of FIGS. 3-9 may be positioned in the stowed position 800 of FIGS. 8 and 9 during a cruise operation of a flight of an aircraft (e.g., the aircraft 100 of FIG. 1) implementing the slat 302 and the chine 304 of FIGS. 3-9, and/or when the aircraft implementing the slat 302 and the chine 304 is grounded and/or not in operation. In some examples, the slat 302 of FIGS. 3-9 may be positioned in the stowed position 800 of FIGS. 8 and 9 when an aircraft (e.g., the aircraft 100 of FIG. 1) implementing the slat 302 and the chine 304 is traveling at a speed greater than Mach 0.4.

In the illustrated examples of FIGS. 3-9, the slat 302 includes an example leading edge 308, an example trailing edge 310 located opposite the leading edge 308, and an example outer mold line 312 located and/or extending between the leading edge 308 and the trailing edge 310. The slat 302 of FIGS. 3-9 is located at and/or arranged along an example leading edge 314 of the airfoil 306 and/or an example topside 316 of the airfoil 306 of FIGS. 3-9. In some examples, the slat 302 of FIGS. 3-9 may be located outboard of a nacelle coupled to the airfoil 306 of FIGS. 3-9. In other examples, the slat 302 of FIGS. 3-9 may be located inboard of a nacelle coupled to the airfoil 306 of FIGS. 3-9.

When the slat 302 is positioned in the first deployed position 300 shown in FIGS. 3-5, the leading edge 308 of the slat 302 is located forward of the leading edge 314 of the airfoil 306, and the trailing edge 310 of the slat 302 is also located forward of the leading edge 314 of the airfoil 306. As shown in FIGS. 3-5, the slat 302 is arranged in an example gapped position and/or an example gapped configuration. In other example gapped positions and/or gapped configurations, the trailing edge 310 of the slat 302 may alternatively be located rearward of the leading edge 314 of the airfoil 306. When the slat 302 is positioned in the second deployed position 600 shown in FIGS. 6 and 7, the leading edge 308 of the slat 302 is located forward of the leading edge 314 of the airfoil 306, and the trailing edge 310 of the slat 302 is located rearward of the leading edge 314 of the airfoil 306. As shown in FIGS. 6 and 7, the slat 302 is arranged in an example sealed position and/or an example sealed configuration.

The slat 302 of FIGS. 3-9 is coupled to the airfoil 306 of FIGS. 3-9 and is movable relative to the airfoil 306 and/or the chine 304 of FIGS. 3-9. In some examples, the slat 302 may be coupled to the airfoil 306 via a deployment assembly (e.g., a roller track assembly) as is conventionally known in the art. In some examples, the deployment assembly may enable movement of the slat 302 relative to the airfoil 306, and/or relative to the chine 304, between a deployed position and a stowed position. For example, the deployment assembly may enable movement of the slat 302 relative to the airfoil 306, and/or relative to the chine 304, between the first deployed position 300 shown in FIGS. 3-5 and the stowed position 800 shown in FIGS. 8 and 9. As another example, the deployment assembly may enable movement of the slat 302 relative to the airfoil 306, and/or relative to the chine 304, between the second deployed position 600 shown in FIGS. 6 and 7 and the stowed position 800 shown in FIGS. 8 and 9. In some examples, the deployment assembly may also enable movement of the slat 302 relative to the airfoil 306, and/or relative to the chine 304, between one deployed position and another deployed position. For example, the deployment assembly may enable movement of the slat 302 relative to the airfoil 306, and/or relative to the chine 304, from the second deployed position 600 shown in FIGS. 6 and 7 (e.g., an example descent deployment position) to the first deployed position 300 shown in FIGS. 3-5 (e.g., an example landing deployment position). In some examples, movement of the deployment assembly occurs via an actuator coupled to the deployment assembly and controlled via a controller coupled to the actuator.

In the illustrated examples of FIGS. 3-9, the chine 304 includes an example leading edge 318, an example trailing edge 320 located opposite the leading edge 318, and an example outer mold line 322 located and/or extending between the leading edge 318 and the trailing edge 320. The chine 304 of FIGS. 3-9 further includes a first example lateral surface 324 and a second example lateral surface 326 located opposite the first lateral surface 324. Respective ones of the first lateral surface 324 and the second lateral surface 326 extend between the leading edge 318 of the chine 304 and the trailing edge 320 of the chine 304, and are defined in part by the outer mold line 322 of the chine 304.

The size and/or shape (e.g., the height, the length, the thickness, etc.) of the chine 304 is/are defined in part by the outer mold line 322 of the chine 304 and by the leading edge 314 of the airfoil 306 to which the chine 304 is coupled. In the illustrated examples of FIGS. 3-9, the chine 304 has a cross-sectional profile (e.g., as shown in FIGS. 4, 6 and 8) that resembles the shape of a crescent or a bean. In other examples, the size and/or shape (e.g., the height, the length, the thickness, etc.) of the chine 304 may differ from the size and/or shape of the chine as shown in FIGS. 3-9. In some examples, the outer mold line 322 of the chine 304 may be configured such that a portion of the outer mold line 322 of the chine 304 aligns with (e.g., is flush with) a portion of the outer mold line 312 of the slat 302 when the slat 302 is in the stowed position 800 of FIGS. 8 and 9. In some examples, the outer mold line 322 of the chine 304 may have a shape and/or profile that is aerodynamically contoured. For example, the chine 304 may be formed as an aerodynamically-contoured (e.g., smooth) fairing having a rounded and/or curved shape and/or profile. In other examples, the outer mold line 322 of the chine 304 may have a shape and/or profile that is significantly more angular (e.g., sharply contoured) relative to the shape and/or profile of the outer mold line 322 of the chine 304 as shown in FIGS. 3-9.

The chine 304 of FIGS. 3-9 is coupled to and/or integrated with the airfoil 306 such that the chine 304 is located at and/or arranged at a fixed position along the leading edge 314 of the airfoil 306 and/or the topside 316 of the airfoil 306. In some examples, the chine 304 includes one or more flange(s) and/or base plate(s) via which the chine 304 may be coupled to the airfoil 306. In the illustrated examples of FIGS. 3-9, the chine 304 extends orthogonally from the leading edge 314 of the airfoil 306. For example, the chine 304 of FIGS. 3-9 extends orthogonally from the leading edge 314 of the airfoil 306 in a direction that is parallel to a direction of deployment of the slat 302 of FIGS. 3-9 relative to the airfoil 306.

In the illustrated examples of FIGS. 3-9, the chine 304 is located at and/or arranged along the leading edge 314 of the airfoil 306 and/or the topside 316 of the airfoil 306 of FIGS. 3-9 adjacent the slat 302 of FIGS. 3-9. In some examples, the chine 304 of FIGS. 3-9, in addition to being located adjacent the slat 302 of FIGS. 3-9 (e.g., the slat 302 being a first slat), may also be located adjacent a second example slat 328, as shown in FIGS. 3, 5, 7 and 9. For example, the chine 304 may be positioned and/or located between the first slat 302 and the second slat 328 such that the first slat 302 is located adjacent the first lateral surface 324 of the chine 304, and the second slat 328 is located adjacent the second lateral surface 326 of the chine 304 of FIGS. 3-9. In some examples, an example seal 330 may extend across a portion of an example gap 332 existing between the first slat 302 and the second slat 328. In some such examples, the seal 330 may be located over an area of the gap 332 that is not to be occupied by the chine 304 when the first slat 302 and the second slat 328 are stowed. In some examples, the chine 304 of FIGS. 3-9 may be located outboard of a nacelle coupled to the airfoil 306 of FIGS. 3-9. In other examples, the chine 304 of FIGS. 3-9 may be located inboard of a nacelle coupled to the airfoil 306 of FIGS. 3-9.

When the slat 302 of FIGS. 3-9 is positioned in the first deployed position 300 shown in FIGS. 3-5, the leading edge 308 of the slat 302 is located forward of the leading edge 318 of the chine 304, and the trailing edge 310 of the slat 302 is located forward of the leading edge 318 of the chine 304. When the slat 302 of FIGS. 3-9 is positioned in the second deployed position 600 shown in FIGS. 6 and 7, the leading edge 308 of the slat 302 is located forward of the leading edge 318 of the chine 304, and the trailing edge 310 of the slat 302 is located rearward of the leading edge 318 of the chine 304 and forward of the trailing edge 320 of the chine 304. When the slat 302 of FIGS. 3-9 is positioned in the stowed position 800 shown in FIGS. 8 and 9, the leading edge 308 of the slat 302 is located forward of the leading edge 318 of the chine 304, and the trailing edge 310 of the slat 302 is located proximate (e.g., aligned and/or coincident with) the trailing edge 320 of the chine 304. As shown in FIGS. 8 and 9, a portion of the outer mold line 312 of the slat 302 is aligned with (e.g., is flush with) a portion of the outer mold line 322 of the chine 304 when the slat 302 is in the stowed position 800.

In the illustrated examples of FIGS. 3-9, the first slat 302 and the second slat 328 cover respective ones of the first lateral surface 324 and the second lateral surface 326 of the chine 304 when the first slat 302 and the second slat 328 are in the stowed position 800 shown in FIGS. 8 and 9. The first slat 302 and the second slat 328 expose the respective ones of the first lateral surface 324 and the second lateral surface 326 of the chine 304 when the first slat 302 and the second slat 328 are in the first deployed position 300 of FIGS. 3-5 and/or the second deployed position 600 of FIGS. 6 and 7. For example, the first slat 302 covers the first lateral surface 324 of the chine 304 when the slat 302 is in the stowed position 800 of FIGS. 8 and 9, and exposes the first lateral surface 324 of the chine 304 when the slat 302 is in the first deployed position 300 of FIGS. 3-5 and/or the second deployed position 600 of FIGS. 6 and 7. As another example, the second slat 328 covers the second lateral surface 326 of the chine 304 when the slat 302 is in the stowed position 800 of FIGS. 8 and 9, and exposes the second lateral surface 326 of the chine 304 when the slat 302 is in the first deployed position 300 of FIGS. 3-5 and/or the second deployed position 600 of FIGS. 6 and 7.

When the first lateral surface 324 and/or the second lateral surface 326 of the chine 304 is/are exposed (e.g., in response to the slat 302 being moved from the stowed position 800 of FIGS. 8 and 9 to the first deployed position 300 of FIGS. 3-5 and/or the second deployed position 600 of FIGS. 6 and 7), the chine 304 generates a vortex. For example, the exposed first lateral surface 324 and/or the exposed second lateral surface 326 of the chine 304 shown in FIGS. 3-7 may generate a vortex in response to an airflow presented at the slat 302 and/or at the chine 304. In some examples, the vortex generated by the chine 304 energizes and/or re-energizes a boundary layer located at the topside 316 of the airfoil 306. Thus, the chine 304 provides a positive aerodynamic impact in response to an airflow presented at the slat 302 and/or at the chine 304 when the slat 302 is in the first deployed position 300 of FIGS. 3-5 and/or the second deployed position 600 of FIGS. 6 and 7.

When the first lateral surface 324 and the second lateral surface 326 of the chine 304 are covered (e.g., in response to the slat 302 being moved into the stowed position 800 of FIGS. 8 and 9), the chine 304 does not generate a vortex. For example, the covered first lateral surface 324 and the covered second lateral surface 326 of the chine 304 shown in FIGS. 8 and 9 are unable to generate a vortex in response to an airflow presented at the slat 302. Thus, the chine 304 has no impact on an airflow presented at and/or along the slat 302 when the slat 302 is positioned in the stowed position 800 of FIGS. 8 and 9.

Figure 10:
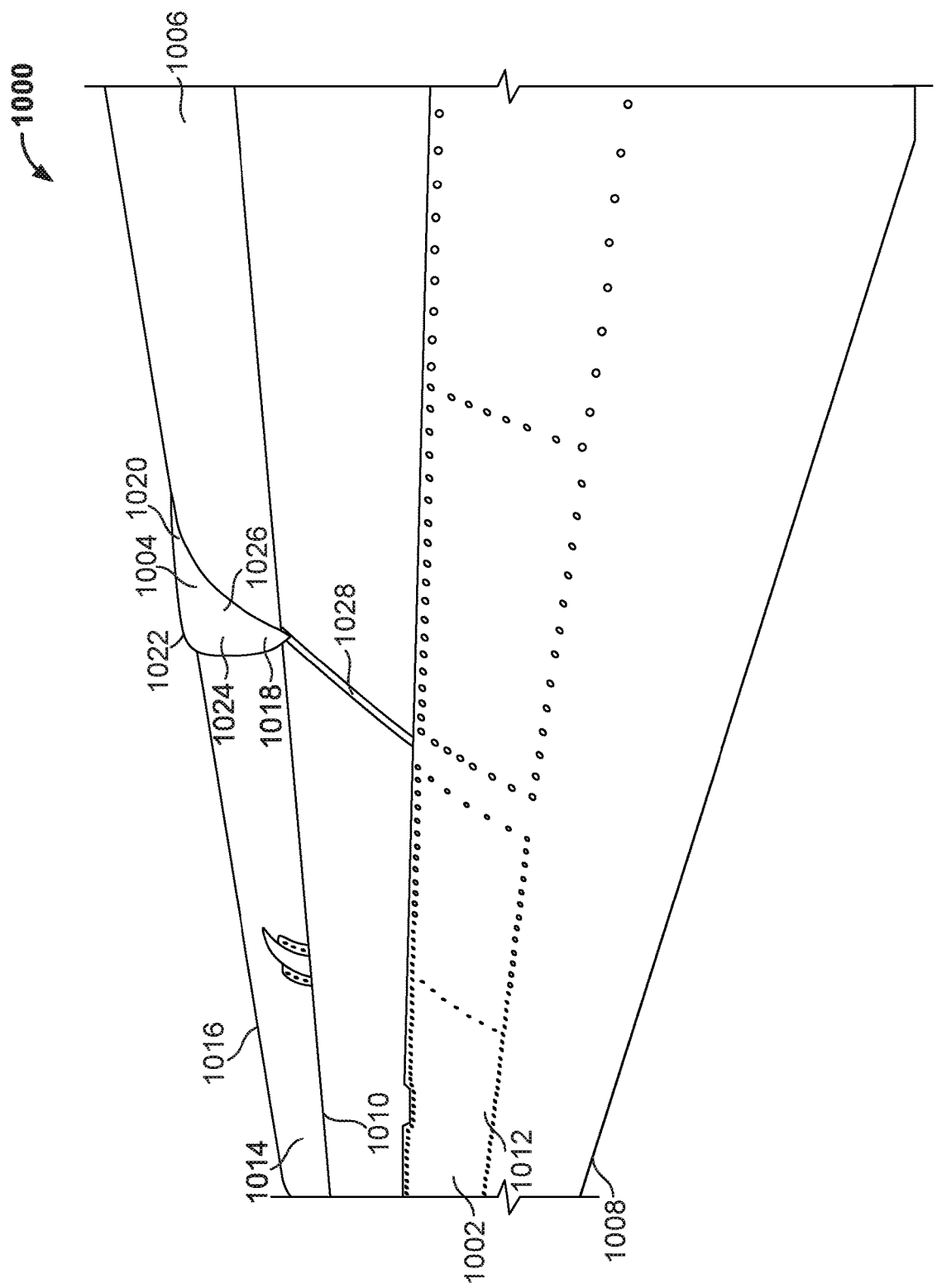
FIG. 10 is a perspective view of an example slat in a first example deployed position relative to an example chine of an example airfoil.
Figure 11:
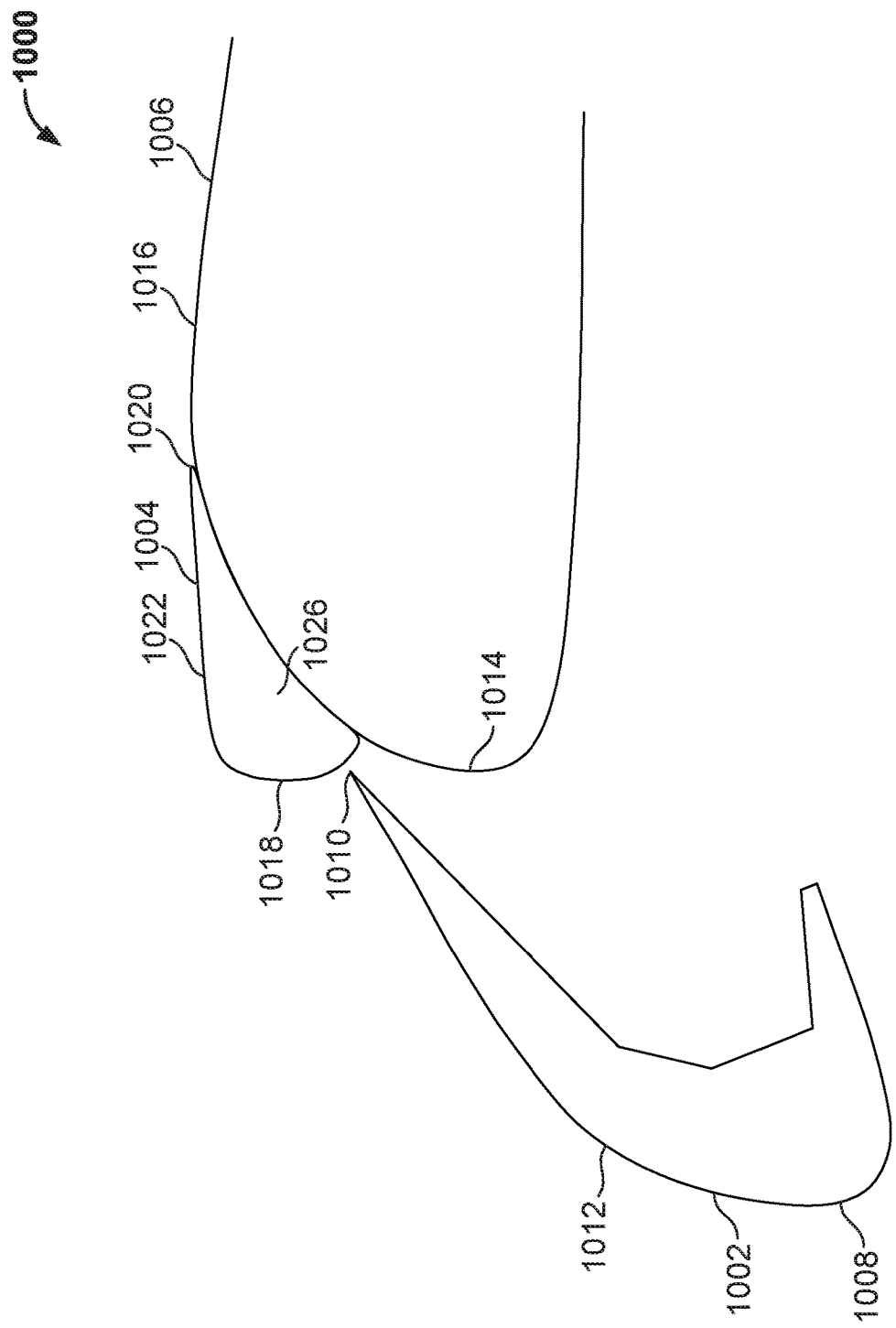
FIG. 11 is a cross-sectional view of the example slat of FIG. 10 in the first example deployed position of FIG. 10.
Figure 12:
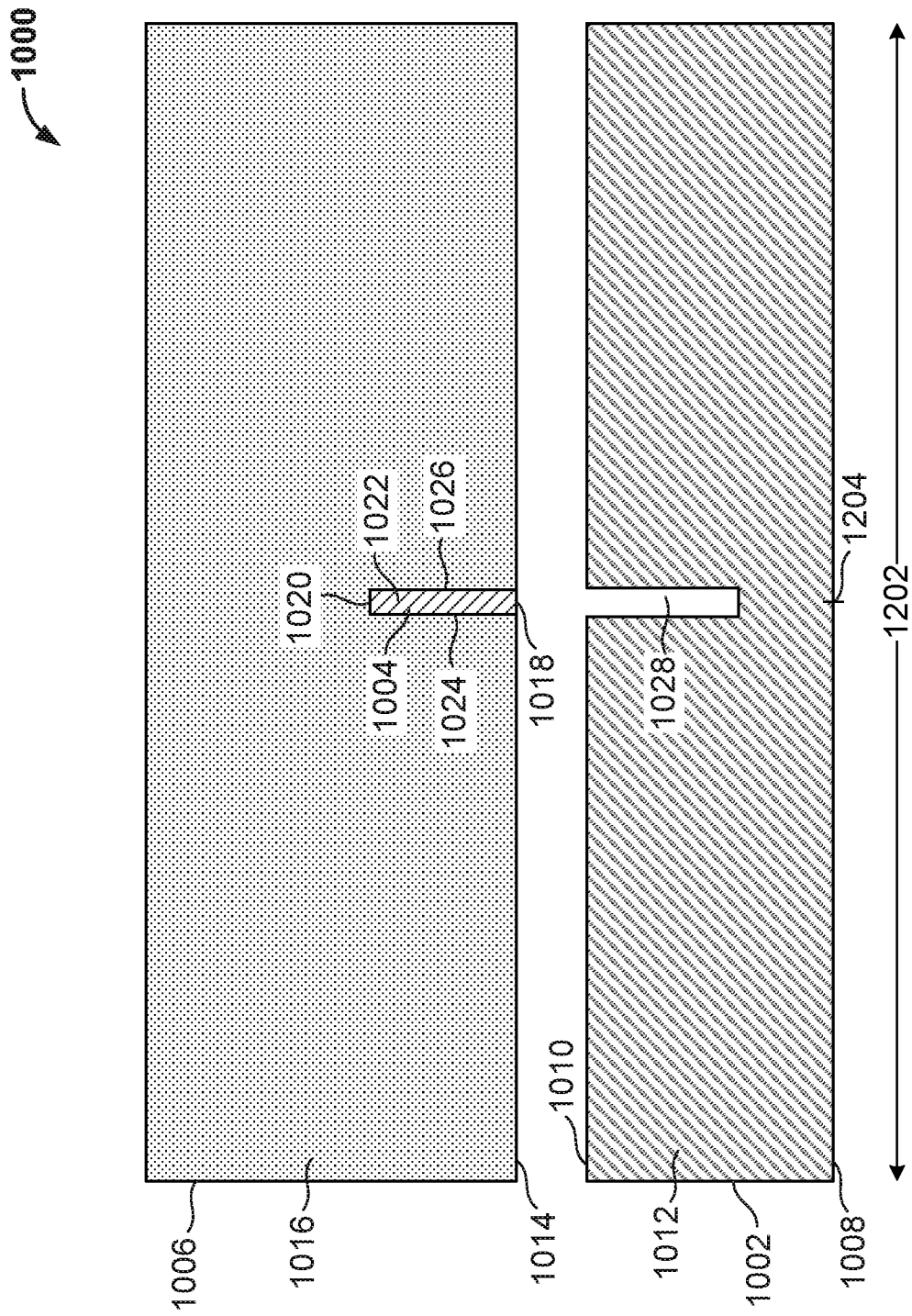
FIG. 12 is a topside view of the example slat of FIGS. 10 and 11 in the first example deployed position of FIGS. 10 and 11.
Figure 13:
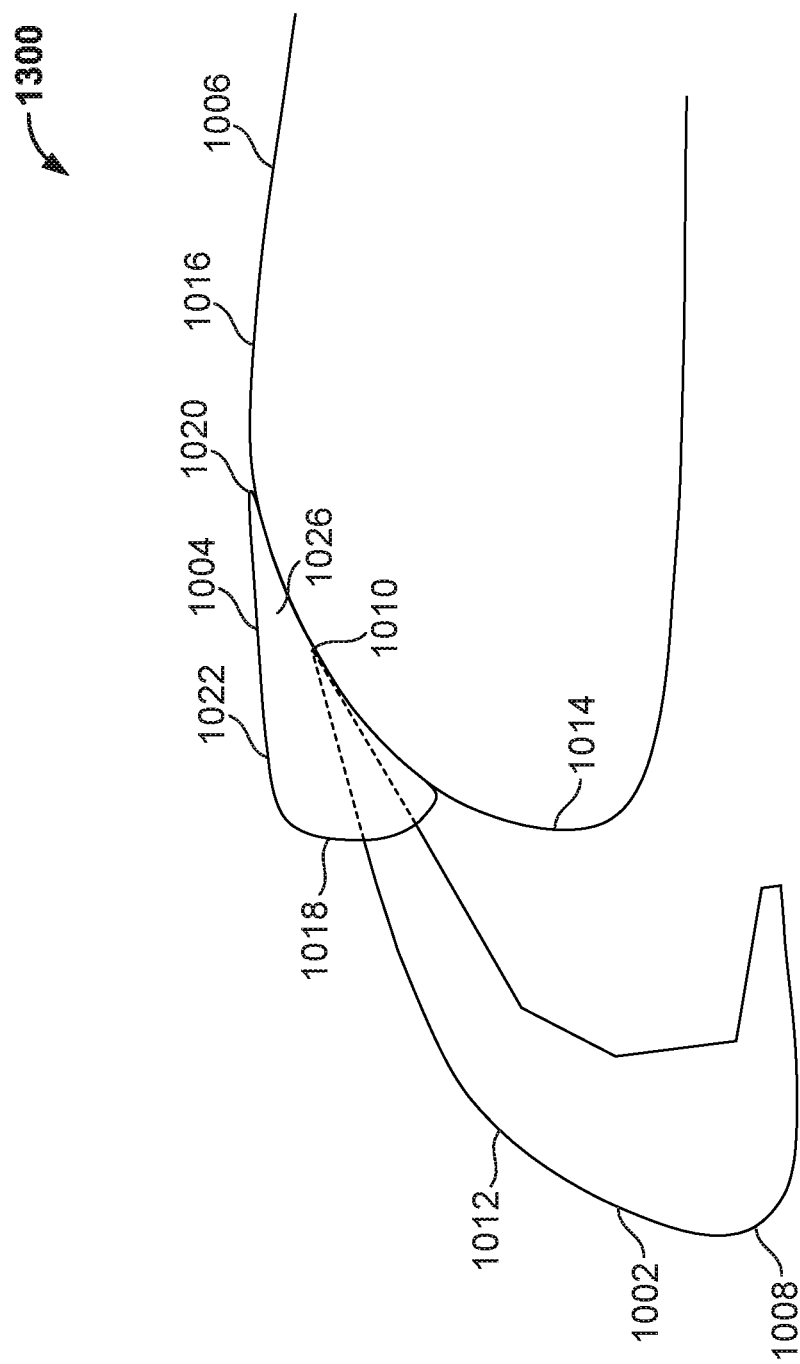
FIG. 13 is a cross-sectional view of the example slat of FIGS. 10-12 in a second example deployed position relative to the example chine of the example airfoil of FIGS. 10-12.
Figure 14:
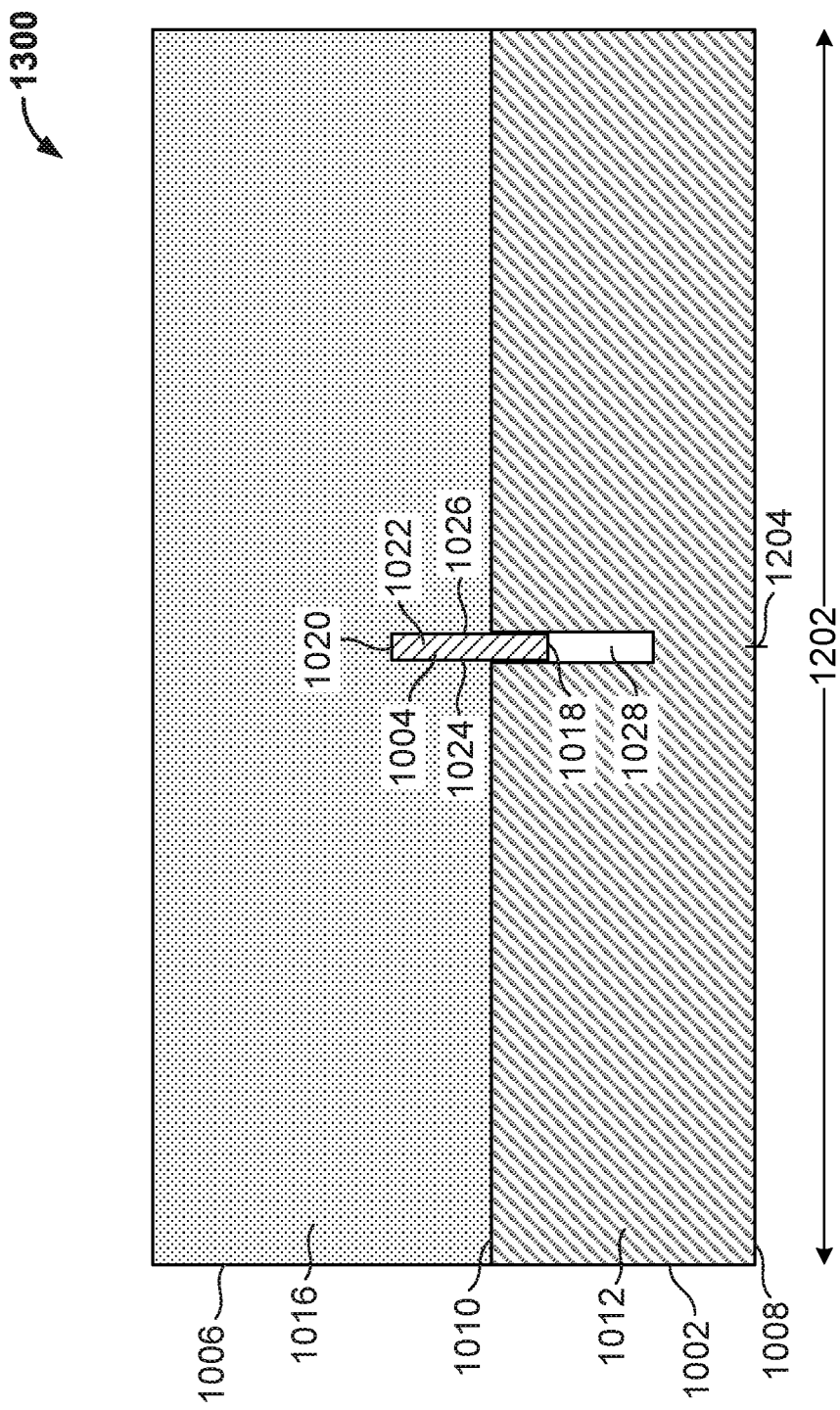
FIG. 14 is a topside view of the example slat of FIGS. 10-13 in the second example deployed position of FIG. 13.
Figure 15:
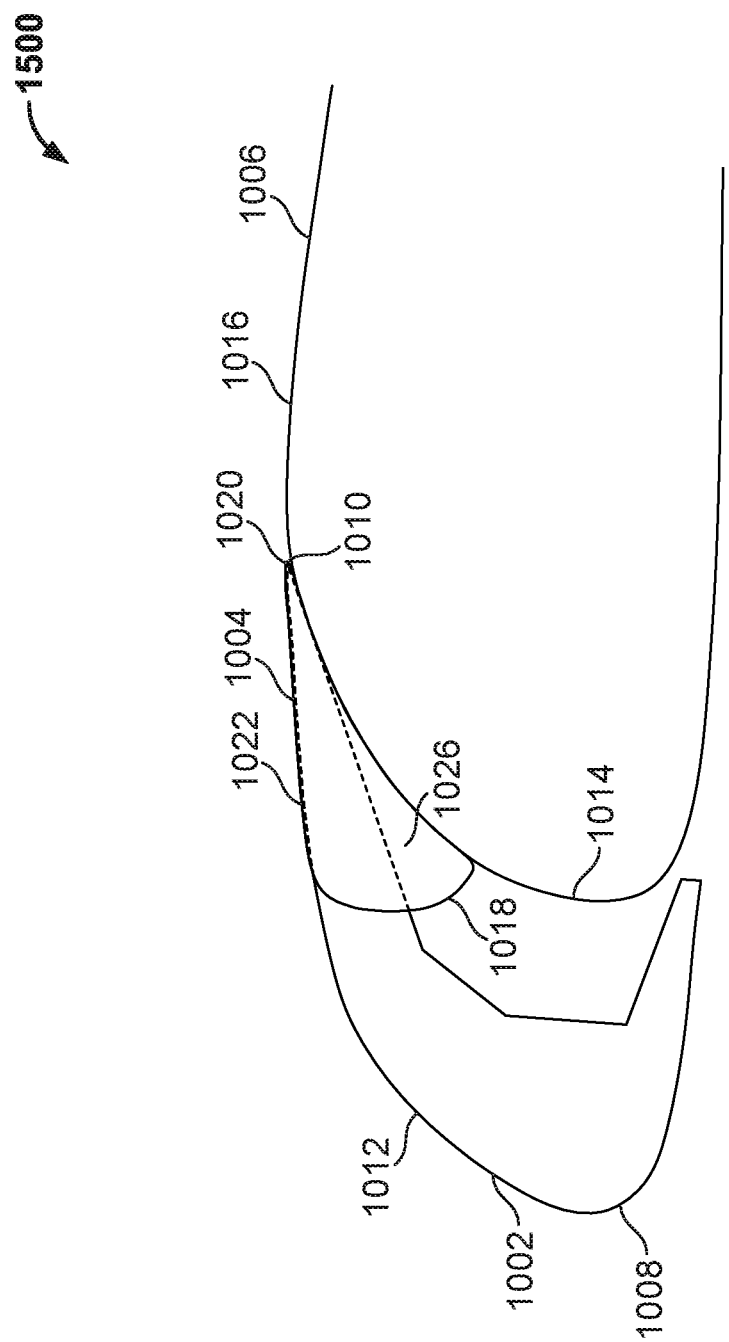
FIG. 15 is a cross-sectional view of the example slat of FIGS. 10-14 in an example stowed position relative to the example chine of the example airfoil of FIGS. 10-14.
Figure 16:
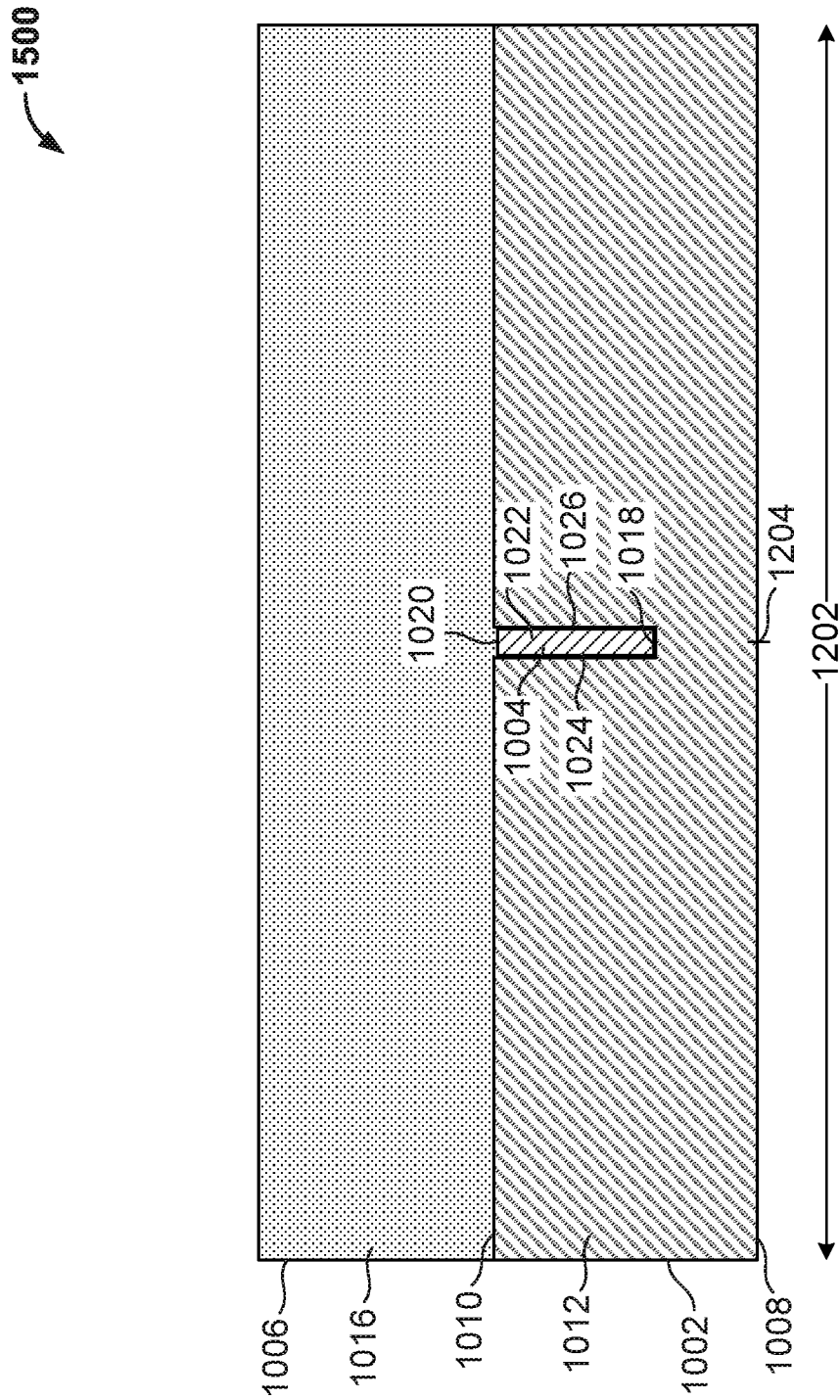
FIG. 16 is a topside view of the example slat of FIGS. 10-15 in the example stowed position of FIG. 15.

FIG. 10 is a perspective view of an example slat 1002 in a first example deployed position 1000 relative to an example chine 1004 of an example airfoil 1006. FIG. 11 is a cross-sectional view of the example slat 1002 of FIG. 10 in the first example deployed position 1000 of FIG. 10. FIG. 12 is a topside view of the example slat 1002 of FIGS. 10 and 11 in the first example deployed position 1000 of FIGS. 10 and 11. FIG. 13 is a cross-sectional view of the example slat 1002 of FIGS. 10-12 in a second example deployed position 1300 relative to the example chine 1004 of the example airfoil 1006 of FIGS. 10-12. FIG. 14 is a topside view of the example slat 1002 of FIGS. 10-13 in the second example deployed position 1300 of FIG. 13. FIG. 15 is a cross-sectional view of the example slat 1002 of FIGS. 10-14 in an example stowed position 1500 relative to the example chine 1004 of the example airfoil 1006 of FIGS. 10-14. FIG. 16 is a topside view of the example slat 1002 of FIGS. 10-15 in the example stowed position 1500 of FIG. 15.

In some examples, the slat 1002 of FIGS. 10-16 may be positioned in the first deployed position 1000 of FIGS. 10-12 during a landing operation of a flight of an aircraft (e.g., the aircraft 100 of FIG. 1) implementing the slat 1002 and the chine 1004 of FIGS. 10-16. In some examples, the slat 1002 of FIGS. 10-16 may be positioned in the second deployed position 1300 of FIGS. 13 and 14 during a takeoff operation and/or during a descent operation of a flight of an aircraft (e.g., the aircraft 100 of FIG. 1) implementing the slat 1002 and the chine 1004 of FIGS. 10-16. In some examples, the slat 1002 of FIGS. 10-16 may be positioned in the first deployed position 1000 of FIGS. 10-12 or the second deployed position 1300 of FIGS. 13 and 14 when an aircraft (e.g., the aircraft 100 of FIG. 1) implementing the slat 1002 and the chine 1004 of FIGS. 10-16 is traveling at a speed of approximately Mach 0.4 or less. In some examples, the slat 1002 of FIGS. 10-16 may be positioned in the stowed position 1500 of FIGS. 15 and 16 during a cruise operation of a flight of an aircraft (e.g., the aircraft 100 of FIG. 1) implementing the slat 1002 and the chine 1004 of FIGS. 10-16, and/or when the aircraft implementing the slat 1002 and the chine 1004 is grounded and/or not in operation. In some examples, the slat 1002 of FIGS. 10-16 may be positioned in the stowed position 1500 of FIGS. 15 and 16 when an aircraft (e.g., the aircraft 100 of FIG. 1) implementing the slat 1002 and the chine 1004 is traveling at a speed greater than Mach 0.4.

In the illustrated examples of FIGS. 10-16, the slat 1002 includes an example leading edge 1008, an example trailing edge 1010 located opposite the leading edge 1008, and an example outer mold line 1012 located and/or extending between the leading edge 1008 and the trailing edge 1010. The slat 1002 of FIGS. 10-16 has an example lateral extent 1202 defined by the degree to which leading edge 1008 and/or the trailing edge 1010 of the slat 1002 extend(s) in a spanwise direction measured along the airfoil 1006 (e.g., the length of the second slat 114 measured along the first spanwise direction 130 of the first wing 104 of FIG. 1). The slat 1002 of FIGS. 10-16 is located at and/or arranged along an example leading edge 1014 of the airfoil 1006 and/or an example topside 1016 of the airfoil 1006 of FIGS. 10-16. In some examples, the slat 1002 of FIGS. 10-16 may be located outboard of a nacelle coupled to the airfoil 1006 of FIGS. 10-16. In other examples, the slat 1002 of FIGS. 10-16 may be located inboard of a nacelle coupled to the airfoil 1006 of FIGS. 10-16.

When the slat 1002 is positioned in the first deployed position 1000 shown in FIGS. 10-12, the leading edge 1008 of the slat 1002 is located forward of the leading edge 1014 of the airfoil 1006, and the trailing edge 1010 of the slat 1002 is also located forward of the leading edge 1014 of the airfoil 1006. As shown in FIGS. 10-12, the slat 1002 is arranged in an example gapped position and/or an example gapped configuration. In other example gapped positions and/or gapped configurations, the trailing edge 1010 of the slat 1002 may alternatively be located rearward of the leading edge 1014 of the airfoil 1006. When the slat 1002 is positioned in the second deployed position 1300 shown in FIGS. 13 and 14, the leading edge 1008 of the slat 1002 is located forward of the leading edge 1014 of the airfoil 1006, and the trailing edge 1010 of the slat 1002 is located rearward of the leading edge 1014 of the airfoil 1006. As shown in FIGS. 13 and 14, the slat 1002 is arranged in an example sealed position and/or an example sealed configuration.

The slat 1002 of FIGS. 10-16 is coupled to the airfoil 1006 of FIGS. 10-16 and is movable relative to the airfoil 1006 and/or the chine 1004 of FIGS. 10-16. In some examples, the slat 1002 may be coupled to the airfoil 1006 via a deployment assembly (e.g., a roller track assembly) as is conventionally known in the art. In some examples, the deployment assembly may enable movement of the slat 1002 relative to the airfoil 1006, and/or relative to the chine 1004, between a deployed position and a stowed position. For example, the deployment assembly may enable movement of the slat 1002 relative to the airfoil 1006, and/or relative to the chine 1004, between the first deployed position 1000 shown in FIGS. 10-12 and the stowed position 1500 shown in FIGS. 15 and 16. As another example, the deployment assembly may enable movement of the slat 1002 relative to the airfoil 1006, and/or relative to the chine 1004, between the second deployed position 1300 shown in FIGS. 13 and 14 and the stowed position 1500 shown in FIGS. 15 and 16. In some examples, the deployment assembly may also enable movement of the slat 1002 relative to the airfoil 1006, and/or relative to the chine 1004, between one deployment position and another deployment position. For example, the deployment assembly may enable movement of the slat 1002 relative to the airfoil 1006, and/or relative to the chine 1004, from the second deployed position 1300 shown in FIGS. 13 and 14 (e.g., an example descent deployment position) to the first deployed position 1000 of FIGS. 10-12 (an example landing deployment position). In some examples, movement of the deployment assembly occurs via an actuator coupled to the deployment assembly and controlled via a controller coupled to the actuator.

In the illustrated examples of FIGS. 10-16, the chine 1004 includes an example leading edge 1018, an example trailing edge 1020 located opposite the leading edge 1018, and an example outer mold line 1022 located and/or extending between the leading edge 1018 and the trailing edge 1020. The chine 1004 of FIGS. 10-16 further includes a first example lateral surface 1024 and a second example lateral surface 1026 located opposite the first lateral surface 1024. Respective ones of the first lateral surface 1024 and the second lateral surface 1026 extend between the leading edge 1018 of the chine 1004 and the trailing edge 1020 of the chine 1004, and are defined in part by the outer mold line 1022 of the chine 1004.

The size and/or shape (e.g., the height, the length, the thickness, etc.) of the chine 1004 is/are defined in part by the outer mold line 1022 of the chine 1004 and by the leading edge 1014 of the airfoil 1006 to which the chine 1004 is coupled. In the illustrated examples of FIGS. 10-16, the chine 1004 has a cross-sectional profile (e.g., as shown in FIGS. 11, 13 and 15) that resembles the shape of a crescent or a bean. In other examples, the size and/or shape (e.g., the height, the length, the thickness, etc.) of the chine 1004 may differ from the size and/or shape of the chine as shown in FIGS. 10-16. In some examples, the outer mold line 1022 of the chine 1004 may be configured such that a portion of the outer mold line 1022 of the chine 1004 aligns with (e.g., is flush with) a portion of the outer mold line 1012 of the slat 1002 when the slat 1002 is in the stowed position 1500 of FIGS. 15 and 16. In some examples, the outer mold line 1022 of the chine 1004 may have a shape and/or profile that is aerodynamically contoured. For example, the chine 1004 may be formed as an aerodynamically-contoured (e.g., smooth) fairing having a rounded and/or curved shape and/or profile. In other examples, the outer mold line 1022 of the chine 1004 may have a shape and/or profile that is significantly more angular (e.g., sharply contoured) relative to the shape and/or profile of the outer mold line 1022 of the chine 1004 as shown in FIGS. 10-16.

The chine 1004 of FIGS. 10-16 is coupled to and/or integrated with the airfoil 1006 such that the chine 1004 is located at and/or arranged at a fixed position along the leading edge 1014 of the airfoil 1006 and/or the topside 1016 of the airfoil 1006 within the lateral extent 1202 of the slat 1002. In some examples, the chine 1004 includes one or more flange(s) and/or base plate(s) via which the chine 1004 may be coupled to the airfoil 1006. In the illustrated examples of FIGS. 10-16, the chine 1004 extends orthogonally from the leading edge 1014 of the airfoil 1006. For example, the chine 1004 of FIGS. 10-16 extends orthogonally from the leading edge 1014 of the airfoil 1006 in a direction that is parallel to a direction of deployment of the slat 1002 of FIGS. 10-16 relative to the airfoil 1006.

In the illustrated examples of FIGS. 10-16, the chine 1004 is located at and/or arranged along the leading edge 1014 of the airfoil 1006 and/or the topside 1016 of the airfoil 1006 of FIGS. 10-16 proximate an example midpoint 1204 of the lateral extent 1202 of the slat 1002 of FIGS. 10-16. In other examples, the chine 1004 may be located at and/or arranged along the leading edge 1014 of the airfoil 1006 and/or the topside 1016 of the airfoil 1006 at a location that differs from the midpoint 1204 of the lateral extent 1202 of the slat 1002 (e.g., a location within the lateral extent 1202 of the slat 1002 that is further inboard or further outboard relative to the midpoint 1204 of the lateral extent 1202 of the slat 1002). In the illustrated examples of FIGS. 10-16, the chine 1004 is located and/or arranged along the leading edge 1014 of the airfoil 1006 and/or the topside 1016 of the airfoil 1006 such that the first lateral surface 1024 and the second lateral surface 1026 of the chine 1004 align with an example gap and/or notch 1028 formed in the slat 1002. As shown in FIGS. 10, 12 and 14, the notch 1028 of the slat 1002 extends from the trailing edge 1010 of the slat forward toward the leading edge 1008 of the slat 1002. In some examples, the chine 1004 of FIGS. 10-16 may be located outboard of a nacelle coupled to the airfoil 1006 of FIGS. 10-16. In other examples, the chine 1004 of FIGS. 10-16 may be located inboard of a nacelle coupled to the airfoil 1006 of FIGS. 10-16.

When the slat 1002 of FIGS. 10-16 is positioned in the first deployed position 1000 shown in FIGS. 10-12, the leading edge 1008 of the slat 1002 is located forward of the leading edge 1018 of the chine 1004, and the trailing edge 1010 of the slat 1002 is located forward of the leading edge 1018 of the chine 1004. When the slat 1002 of FIGS. 10-16 is positioned in the second deployed position 1300 shown in FIGS. 13 and 14, the leading edge 1008 of the slat 1002 is located forward of the leading edge 1018 of the chine 1004, and the trailing edge 1010 of the slat 1002 is located rearward of the leading edge 1018 of the chine 1004 and forward of the trailing edge 1020 of the chine 1004. When the slat 1002 of FIGS. 10-16 is positioned in the stowed position 1500 shown in FIGS. 15 and 16, the leading edge 1008 of the slat 1002 is located forward of the leading edge 1018 of the chine 1004, and the trailing edge 1010 of the slat 1002 is located proximate (e.g., aligned and/or coincident with) the trailing edge 1020 of the chine 1004. As shown in FIGS. 15 and 16, a portion of the outer mold line 1012 of the slat 1002 is aligned with (e.g., is flush with) a portion of the outer mold line 1022 of the chine 1004 when the slat 1002 is in the stowed position 1500.

In the illustrated examples of FIGS. 10-16, the slat 1002 covers the first lateral surface 1024 and the second lateral surface 1026 of the chine 1004 when the slat 1002 is in the stowed position 1500 shown in FIGS. 15 and 16. The slat 1002 exposes the first lateral surface 1024 and the second lateral surface 1026 of the chine 1004 when the slat 1002 is in the first deployed position 1000 of FIGS. 10-12 and/or the second deployed position 1300 of FIGS. 13 and 14.

When the first lateral surface 1024 and the second lateral surface 1026 of the chine 1004 are exposed (e.g., in response to the slat 1002 being moved from the stowed position 1500 of FIGS. 15 and 16 to the first deployed position 1000 of FIGS. 10-12 and/or the second deployed position 1300 of FIGS. 13 and 14), the chine 1004 generates a vortex. For example, the exposed first lateral surface 1024 and/or the exposed second lateral surface 1026 of the chine 1004 shown in FIGS. 10-14 may generate a vortex in response to an airflow presented at the slat 1002 and/or at the chine 1004. In some examples, the vortex generated by the chine 1004 energizes and/or re-energizes a boundary layer located at the topside 1016 of the airfoil 1006. Thus, the chine 1004 provides a positive aerodynamic impact in response to an airflow presented at the slat 1002 and/or at the chine 1004 when the slat 1002 is in the first deployed position 1000 of FIGS. 10-12 and/or the second deployed position 1300 of FIGS. 13 and 14.

When the first lateral surface 1024 and the second lateral surface 1026 of the chine 1004 are covered (e.g., in response to the slat 1002 being moved into the stowed position 1500 of FIGS. 15 and 16), the chine 1004 does not generate a vortex. For example, the covered first lateral surface 1024 and the covered second lateral surface 1026 of the chine 1004 shown in FIGS. 15 and 16 are unable to generate a vortex in response to an airflow presented at the slat 1002. Thus, the chine 1004 has no impact on an airflow presented at and/or along the slat 1002 when the slat 1002 is positioned in the stowed position 1500 of FIGS. 15 and 16.

Figure 17:
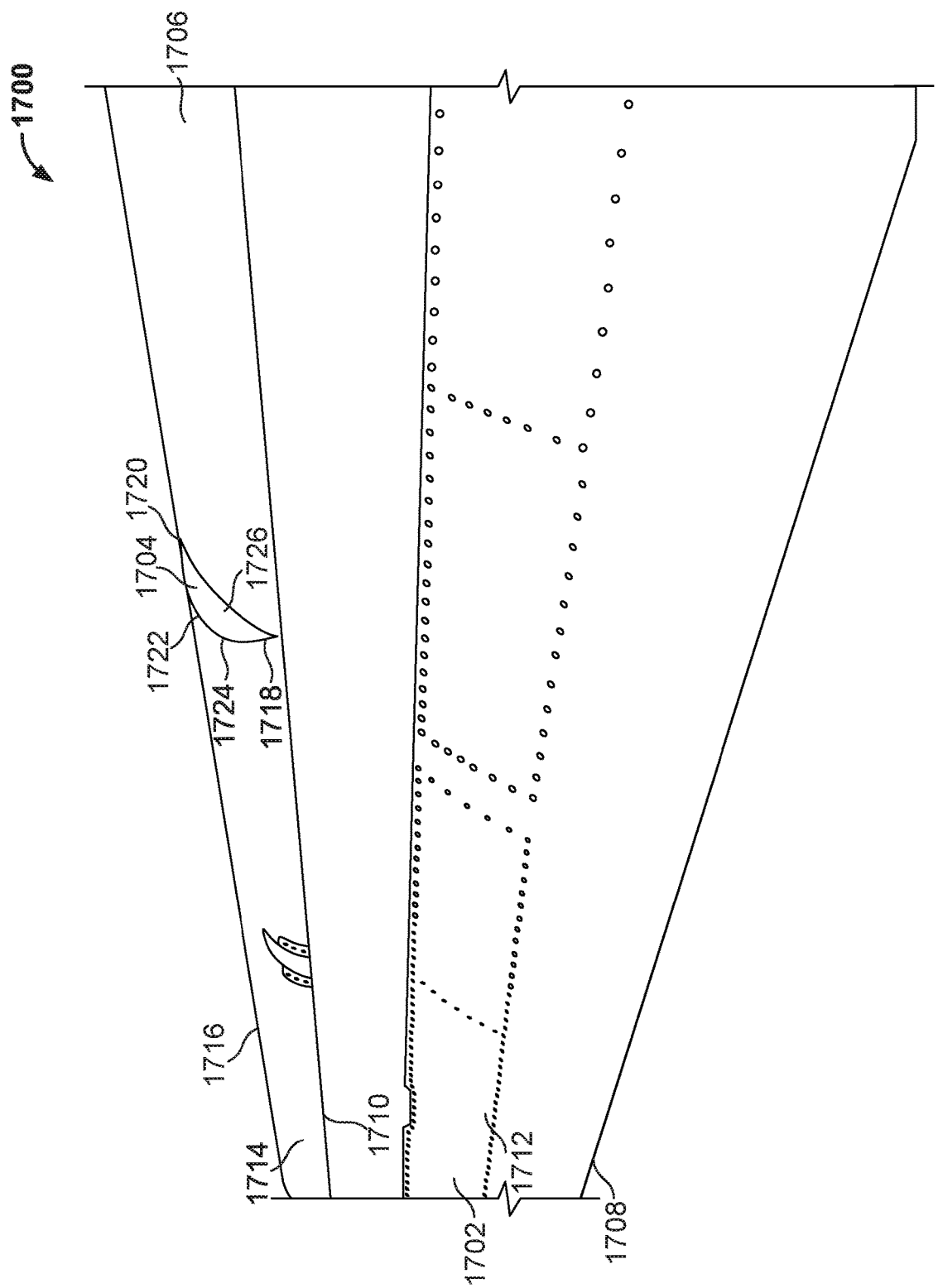
FIG. 17 is a perspective view of an example slat in a first example deployed position relative to an example chine of an example airfoil.
Figure 18:
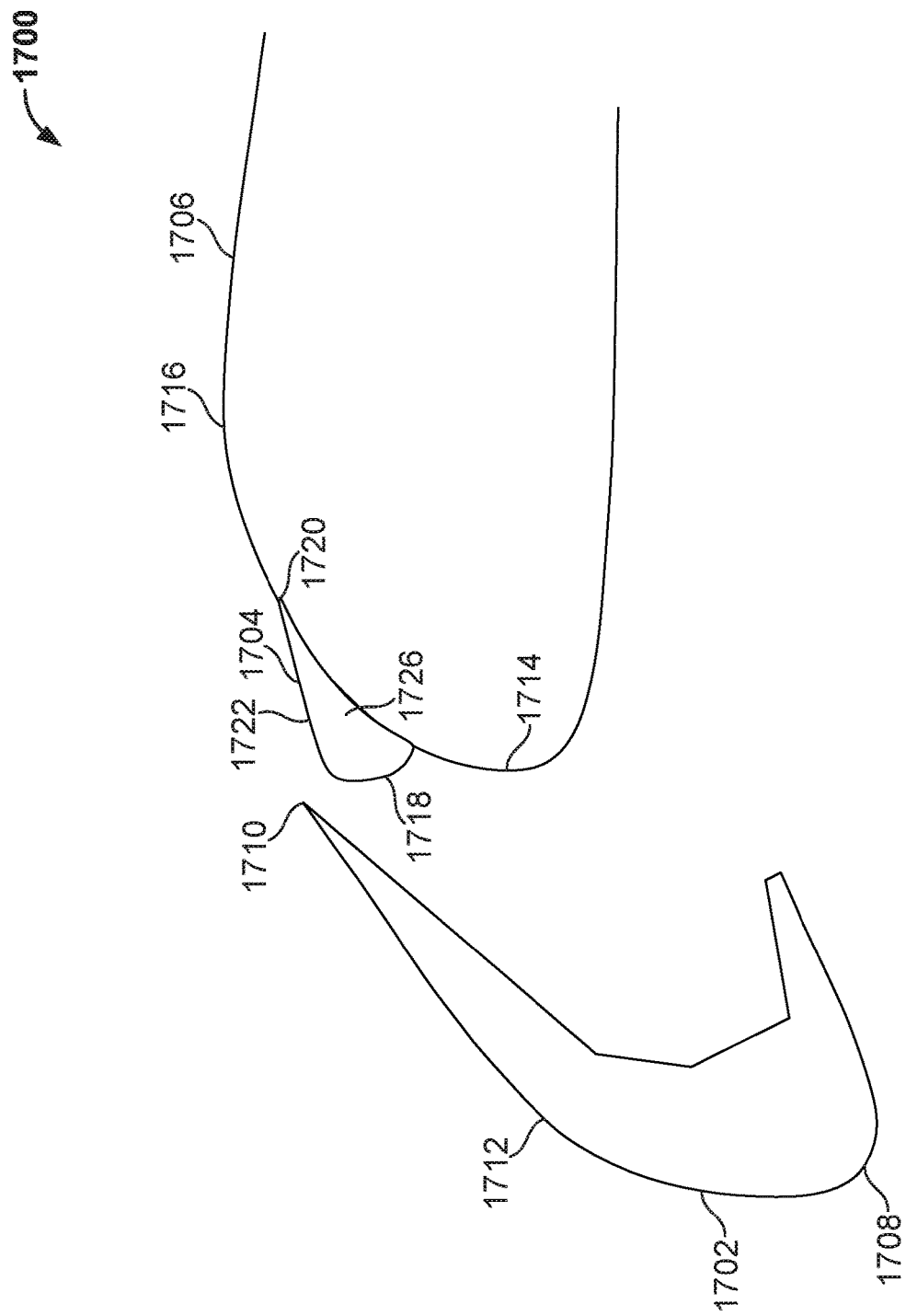
FIG. 18 is a cross-sectional view of the example slat of FIG. 17 in the first example deployed position of FIG. 17.
Figure 19:
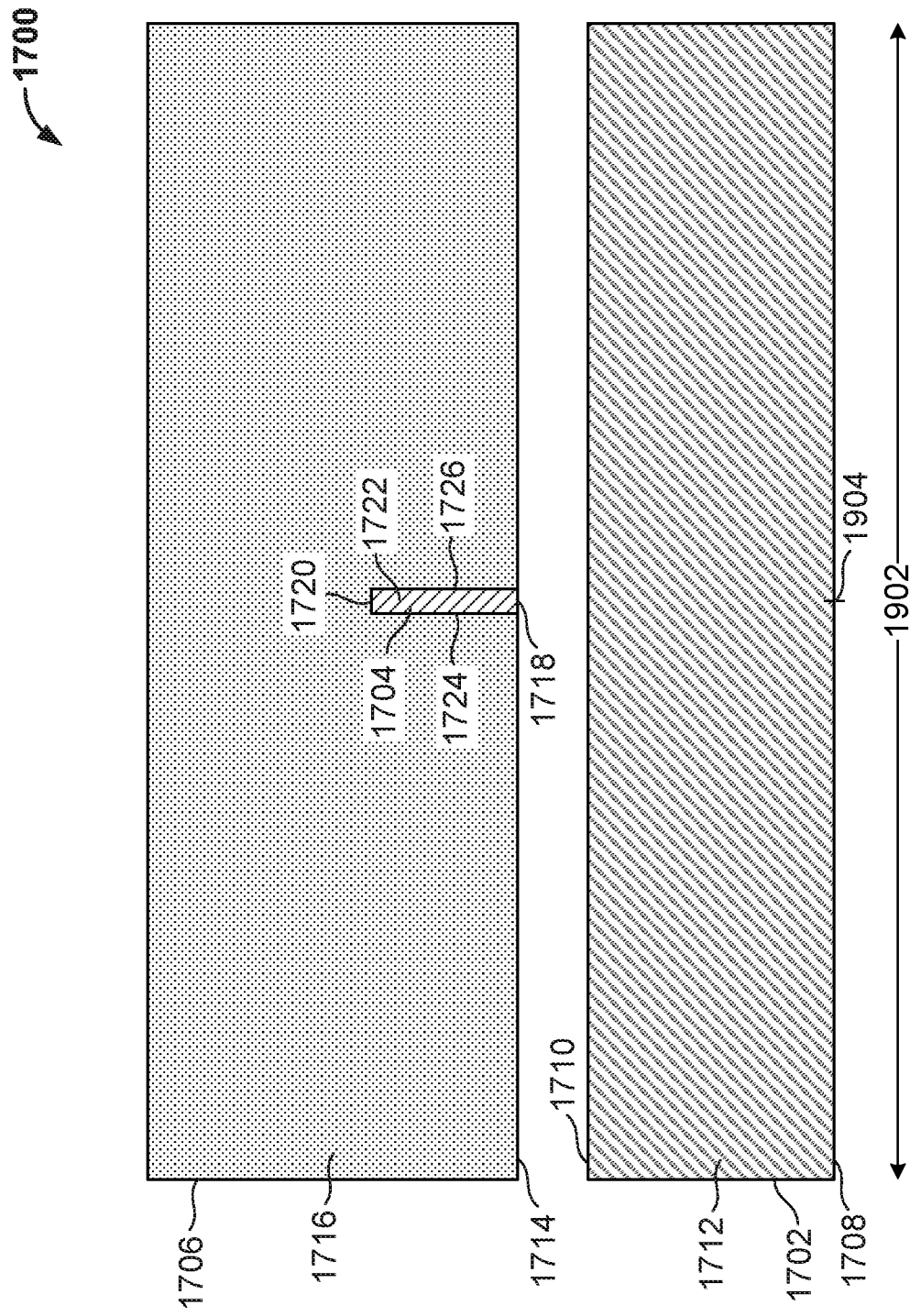
FIG. 19 is a topside view of the example slat of FIGS. 17 and 18 in the first example deployed position of FIGS. 17 and 18.
Figure 20:
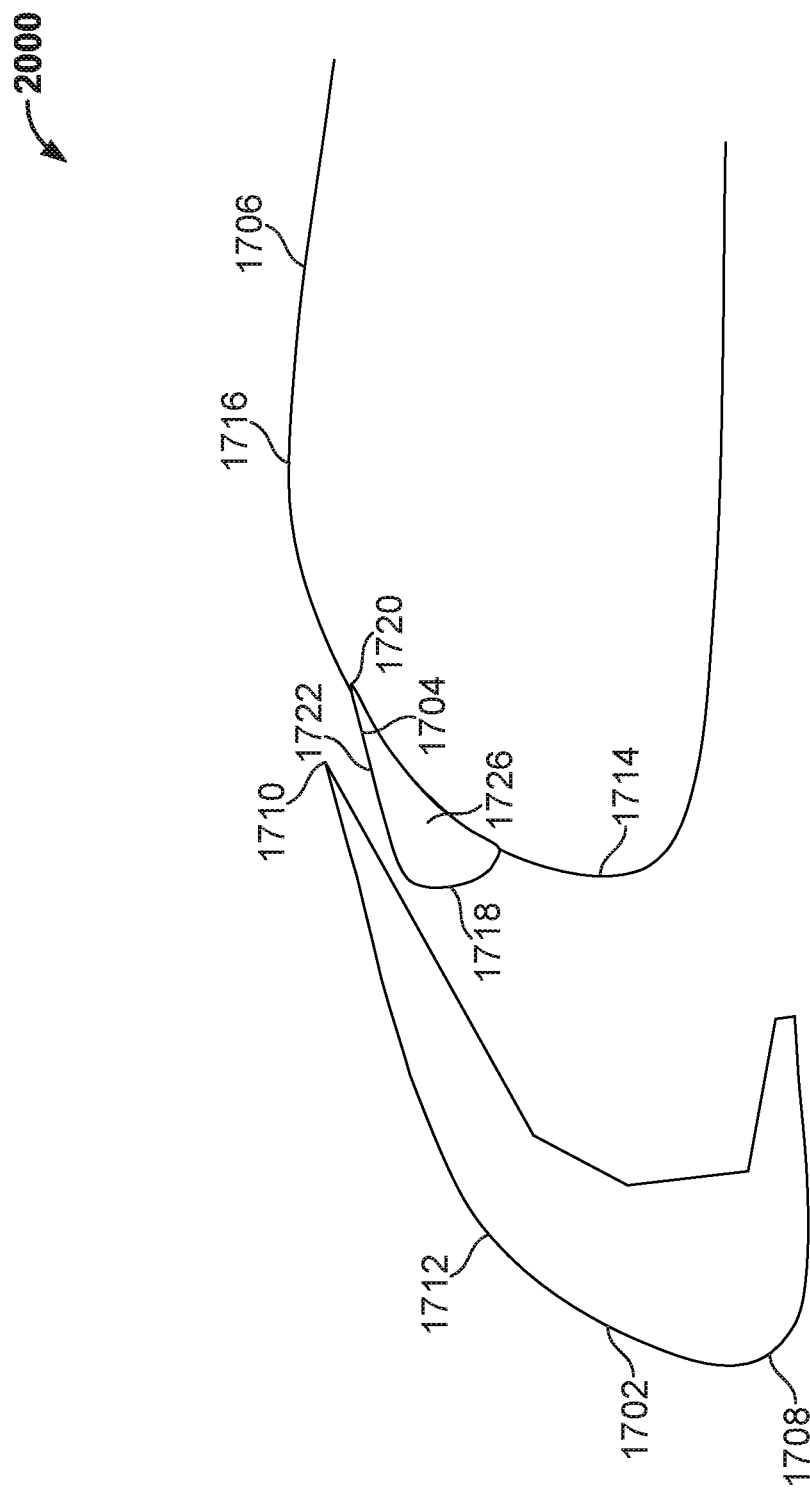
FIG. 20 is a cross-sectional view of the example slat of FIGS. 17-19 in a second example deployed position relative to the example chine of the example airfoil of FIGS. 17-19.
Figure 21:
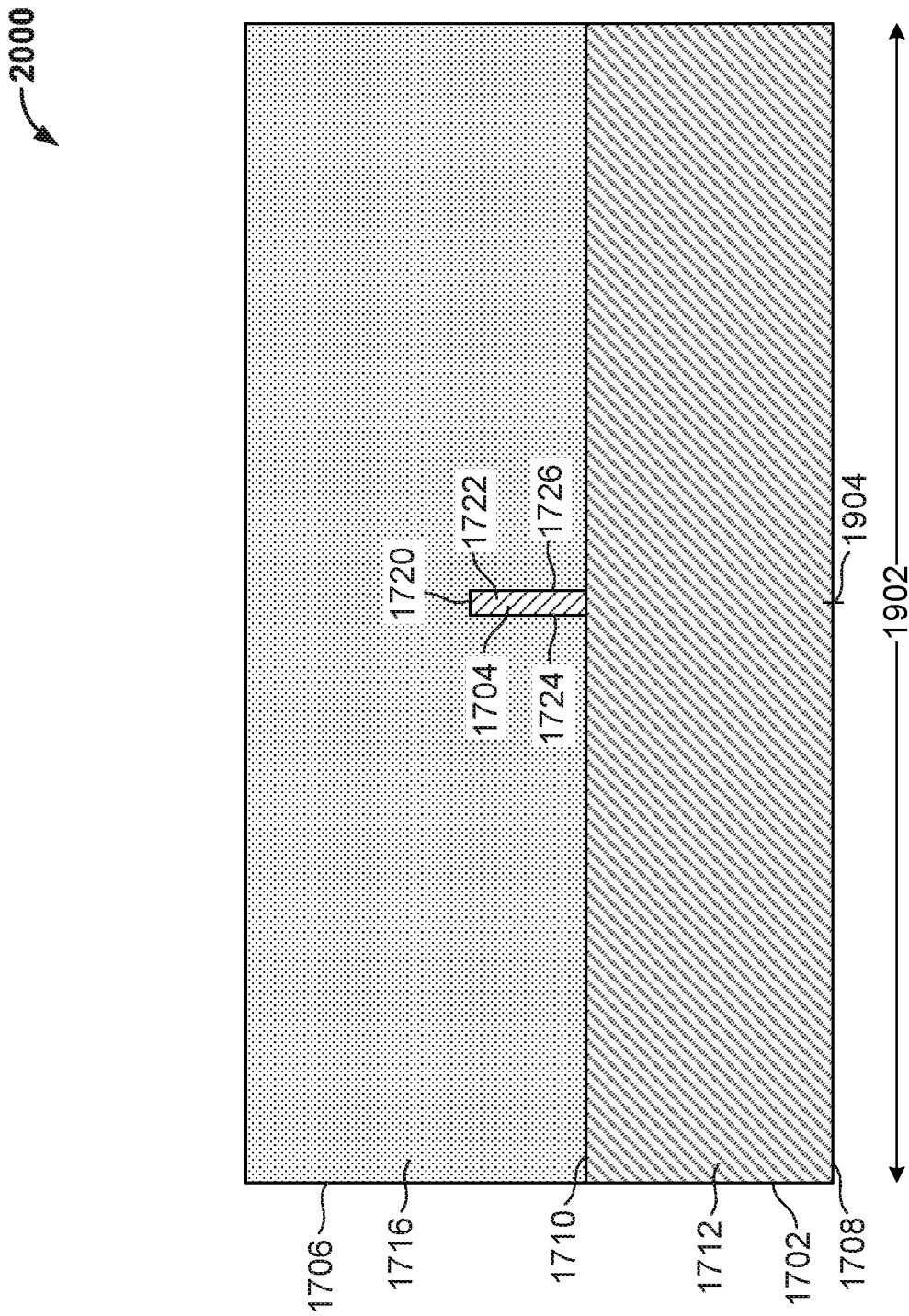
FIG. 21 is a topside view of the example slat of FIGS. 17-20 in the second example deployed position of FIG. 20.
Figure 22:
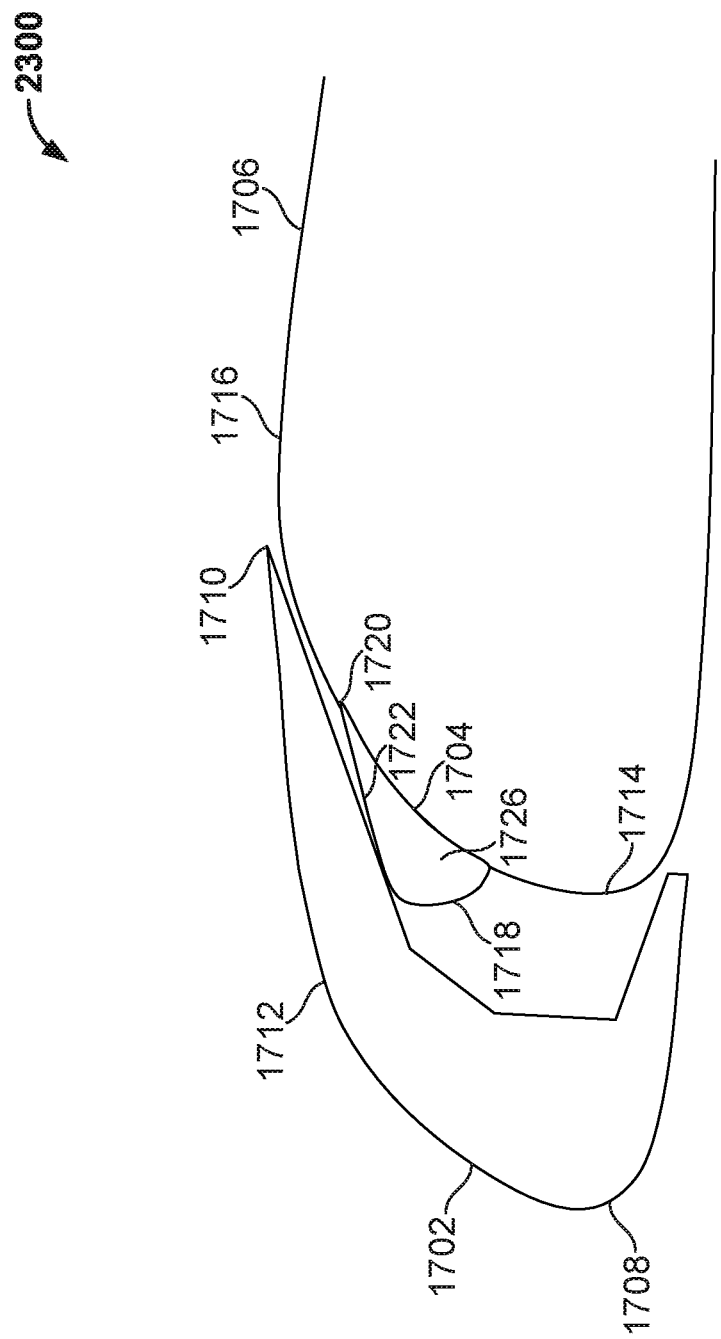
FIG. 22 is a cross-sectional view of the example slat of FIGS. 17-21 in an example stowed position relative to the example chine of the example airfoil of FIGS. 17-21.
Figure 23:
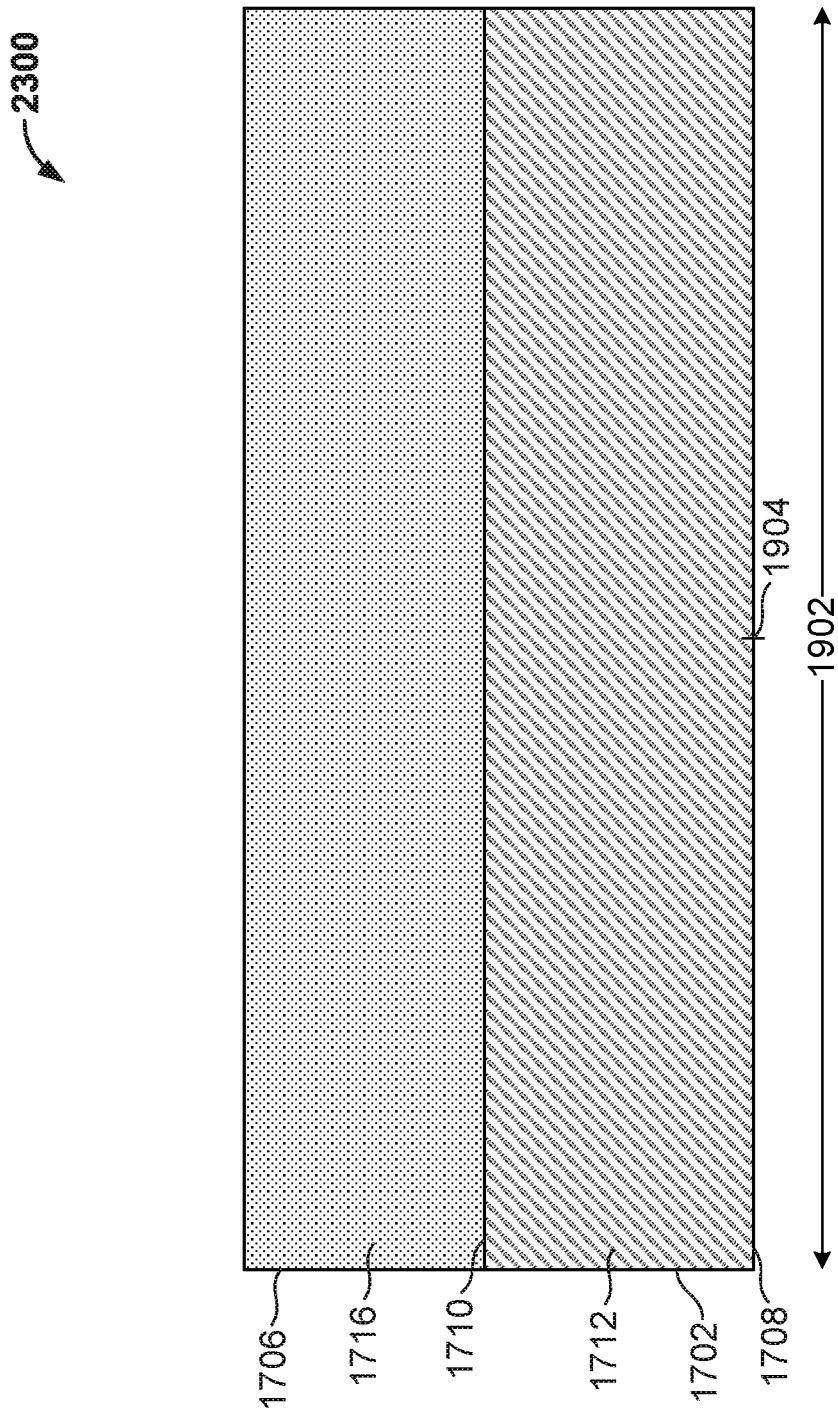
FIG. 23 is a topside view of the example slat of FIGS. 17-22 in the example stowed position of FIG. 22.

FIG. 17 is a perspective view of an example slat 1702 in a first example deployed position 1700 relative to an example chine 1704 of an example airfoil 1706. FIG. 18 is a cross-sectional view of the example slat 1702 of FIG. 17 in the first example deployed position 1700 of FIG. 17. FIG. 19 is a topside view of the example slat 1702 of FIGS. 17 and 18 in the first example deployed position 1700 of FIGS. 17 and 18. FIG. 20 is a cross-sectional view of the example slat 1702 of FIGS. 17-19 in a second example deployed position 2000 relative to the example chine 1704 of the example airfoil 1706 of FIGS. 17-19. FIG. 21 is a topside view of the example slat 1702 of FIGS. 17-20 in the second example deployed position 2000 of FIG. 20. FIG. 22 is a cross-sectional view of the example slat 1702 of FIGS. 17-21 in an example stowed position 2200 relative to the example chine 1704 of the example airfoil 1706 of FIGS. 17-21. FIG. 23 is a topside view of the example slat 1702 of FIGS. 17-22 in the example stowed position 2200 of FIG. 22.

In some examples, the slat 1702 of FIGS. 17-23 may be positioned in the first deployed position 1700 of FIGS. 17-19 during a landing operation of a flight of an aircraft (e.g., the aircraft 100 of FIG. 1) implementing the slat 1702 and the chine 1704 of FIGS. 17-23. In some examples, the slat 1702 of FIGS. 17-23 may be positioned in the second deployed position 2000 of FIGS. 20 and 21 during a takeoff operation and/or during a descent operation of a flight of an aircraft (e.g., the aircraft 100 of FIG. 1) implementing the slat 1702 and the chine 1704 of FIGS. 17-23. In some examples, the slat 1702 of FIGS. 17-23 may be positioned in the first deployed position 1700 of FIGS. 17-19 or the second deployed position 2000 of FIGS. 20 and 21 when an aircraft (e.g., the aircraft 100 of FIG. 1) implementing the slat 1702 and the chine 1704 of FIGS. 17-23 is traveling at a speed of approximately Mach 0.4 or less. In some examples, the slat 1702 of FIGS. 17-23 may be positioned in the stowed position 2200 of FIGS. 22 and 23 during a cruise operation of a flight of an aircraft (e.g., the aircraft 100 of FIG. 1) implementing the slat 1702 and the chine 1704 of FIGS. 17-23, and/or when the aircraft implementing the slat 1702 and the chine 1704 is grounded and/or not in operation. In some examples, the slat 1702 of FIGS. 17-23 may be positioned in the stowed position 2200 of FIGS. 22 and 23 when an aircraft (e.g., the aircraft 100 of FIG. 1) implementing the slat 1702 and the chine 1704 is traveling at a speed greater than Mach 0.4.

In the illustrated examples of FIGS. 17-23, the slat 1702 includes an example leading edge 1708, an example trailing edge 1710 located opposite the leading edge 1708, and an example outer mold line 1712 located and/or extending between the leading edge 1708 and the trailing edge 1710. The slat 1702 of FIGS. 17-23 has an example lateral extent 1902 defined by the degree to which leading edge 1708 and/or the trailing edge 1710 of the slat 1702 extend(s) in a spanwise direction measured along the airfoil 1706 (e.g., the length of the second slat 114 measured along the first spanwise direction 130 of the first wing 104 of FIG. 1). The slat 1702 of FIGS. 17-23 is located at and/or arranged along an example leading edge 1714 of the airfoil 1706 and/or an example topside 1716 of the airfoil 1706 of FIGS. 17-23. In some examples, the slat 1702 of FIGS. 17-23 may be located outboard of a nacelle coupled to the airfoil 1706 of FIGS. 17-23. In other examples, the slat 1702 of FIGS. 17-23 may be located inboard of a nacelle coupled to the airfoil 1706 of FIGS. 17-23.

When the slat 1702 is positioned in the first deployed position 1700 shown in FIGS. 17-19, the leading edge 1708 of the slat 1702 is located forward of the leading edge 1714 of the airfoil 1706, and the trailing edge 1710 of the slat 1702 is also located forward of the leading edge 1714 of the airfoil 1706. In other example deployed positions of the slat 1702, the trailing edge 1710 of the slat 1702 may alternatively be located rearward of the leading edge 1714 of the airfoil 1706. For example, when the slat 1702 is positioned in the second deployed position 2000 shown in FIGS. 20 and 21, the leading edge 1708 of the slat 1702 is located forward of the leading edge 1714 of the airfoil 1706, and the trailing edge 1710 of the slat 1702 is located rearward of the leading edge 1714 of the airfoil 1706.

The slat 1702 of FIGS. 17-23 is coupled to the airfoil 1706 of FIGS. 17-23 and is movable relative to the airfoil 1706 and/or the chine 1704 of FIGS. 17-23. In some examples, the slat 1702 may be coupled to the airfoil 1706 via a deployment assembly (e.g., a roller track assembly) as is conventionally known in the art. In some examples, the deployment assembly may enable movement of the slat 1702 relative to the airfoil 1706, and/or relative to the chine 1704, between a deployed position and a stowed position. For example, the deployment assembly may enable movement of the slat 1702 relative to the airfoil 1706, and/or relative to the chine 1704, between the first deployed position 1700 shown in FIGS. 17-19 and the stowed position 2200 shown in FIGS. 22 and 23. As another example, the deployment assembly may enable movement of the slat 1702 relative to the airfoil 1706, and/or relative to the chine 1704, between the second deployed position 2000 shown in FIGS. 20 and 21 and the stowed position 2200 shown in FIGS. 22 and 23. In some examples, the deployment assembly may also enable movement of the slat 1702 relative to the airfoil 1706, and/or relative to the chine 1704, between one deployed position and another deployed position. For example, the deployment assembly may enable movement of the slat 1702 relative to the airfoil 1706, and/or relative to the chine 1704, from the second deployed position 2000 shown in FIGS. 20 and 21 (e.g., an example descent deployment position) to the first deployed position 1700 of FIGS. 17-19 (e.g., an example landing deployment position). In some examples, movement of the deployment assembly occurs via an actuator coupled to the deployment assembly and controlled via a controller coupled to the actuator.

In the illustrated examples of FIGS. 17-23, the chine 1704 includes an example leading edge 1718, an example trailing edge 1720 located opposite the leading edge 1718, and an example outer mold line 1722 located and/or extending between the leading edge 1718 and the trailing edge 1720. The chine 1704 of FIGS. 17-23 further includes a first example lateral surface 1724 and a second example lateral surface 1726 located opposite the first lateral surface 1724. Respective ones of the first lateral surface 1724 and the second lateral surface 1726 extend between the leading edge 1718 of the chine 1704 and the trailing edge 1720 of the chine 1704, and are defined in part by the outer mold line 1722 of the chine 1704.

The size and/or shape (e.g., the height, the length, the thickness, etc.) of the chine 1704 is/are defined in part by the outer mold line 1722 of the chine 1704 and by the leading edge 1714 of the airfoil 1706 to which the chine 1704 is coupled. In the illustrated examples of FIGS. 17-23, the chine 1704 has a cross-sectional profile (e.g., as shown in FIGS. 18, 20 and 22) that resembles the shape of a crescent or a bean. In other examples, the size and/or shape (e.g., the height, the length, the thickness, etc.) of the chine 1704 may differ from the size and/or shape of the chine as shown in FIGS. 17-23. In some examples, the outer mold line 1722 of the chine 1704 may be configured such that the outer mold line 1722 of the chine 1704 may be positioned within and/or covered by the outer mold line 1712 of the slat 1702 when the slat 1702 is in the stowed position 2200 of FIGS. 22 and 23. In some examples, the outer mold line 1722 of the chine 1704 may have a shape and/or profile that is aerodynamically contoured. For example, the chine 1704 may be formed as an aerodynamically-contoured (e.g., smooth) fairing having a rounded and/or curved shape and/or profile. In other examples, the outer mold line 1722 of the chine 1704 may have a shape and/or profile that is significantly more angular (e.g., sharply contoured) relative to the shape and/or profile of the outer mold line 1722 of the chine 1704 as shown in FIGS. 17-23.

The chine 1704 of FIGS. 17-23 is coupled to and/or integrated with the airfoil 1706 such that the chine 1704 is located at and/or arranged at a fixed position along the leading edge 1714 of the airfoil 1706 and/or the topside 1716 of the airfoil 1706 within the lateral extent 1902 of the slat 1702. In some examples, the chine 1704 includes one or more flange(s) and/or base plate(s) via which the chine 1704 may be coupled to the airfoil 1706. In the illustrated examples of FIGS. 17-23, the chine 1704 extends orthogonally from the leading edge 1714 of the airfoil 1706. For example, the chine 1704 of FIGS. 17-23 extends orthogonally from the leading edge 1714 of the airfoil 1706 in a direction that is parallel to a direction of deployment of the slat 1702 of FIGS. 17-23 relative to the airfoil 1706. In other examples, the chine 1704 may extend from the leading edge 1714 of the airfoil 1706 at an angle that is not orthogonal relative to the leading edge 1714. For example, the chine 1704 of FIGS. 17-23 may extend from the leading edge 1714 of the airfoil 1706 in a direction that is offset from and/or at an angle to a direction of deployment of the slat 1702 of FIGS. 17-23 relative to the airfoil 1706. In some such examples, the angle at which the chine 1704 extends from the leading edge 1714 of the airfoil 1706 may be approximately fifteen degrees inboard relative to the direction of deployment of the slat 1702.

In the illustrated examples of FIGS. 17-23, the chine 1704 is located at and/or arranged along the leading edge 1714 of the airfoil 1706 and/or the topside 1716 of the airfoil 1706 of FIGS. 17-23 proximate an example midpoint 1904 of the lateral extent 1902 of the slat 1702 of FIGS. 17-23. In other examples, the chine 1704 may be located at and/or arranged along the leading edge 1714 of the airfoil 1706 and/or the topside 1716 of the airfoil 1706 at a location that differs from the midpoint 1904 of the lateral extent 1902 of the slat 1702 (e.g., a location within the lateral extent 1902 of the slat 1702 that is further inboard or further outboard relative to the midpoint 1904 of the lateral extent 1902 of the slat 1702). In some examples, the chine 1704 of FIGS. 17-23 may be located outboard of a nacelle coupled to the airfoil 1706 of FIGS. 17-23. In other examples, the chine 1704 of FIGS. 17-23 may be located inboard of a nacelle coupled to the airfoil 1706 of FIGS. 17-23.

When the slat 1702 of FIGS. 17-23 is positioned in the first deployed position 1700 shown in FIGS. 17-19, the leading edge 1708 of the slat 1702 is located forward of the leading edge 1718 of the chine 1704, and the trailing edge 1710 of the slat 1702 is located forward of the leading edge 1718 of the chine 1704. When the slat 1702 of FIGS. 17-23 is positioned in the second deployed position 2000 shown in FIGS. 20 and 21, the leading edge 1708 of the slat 1702 is located forward of the leading edge 1718 of the chine 1704, and the trailing edge 1710 of the slat 1702 is located rearward of the leading edge 1718 of the chine 1704 and forward of the trailing edge 1720 of the chine 1704. When the slat 1702 of FIGS. 17-23 is positioned in the stowed position 2200 shown in FIGS. 22 and 23, the leading edge 1708 of the slat 1702 is located forward of the leading edge 1718 of the chine 1704, and the trailing edge 1710 of the slat 1702 is located rearward of the trailing edge 1720 of the chine 1704. As shown in FIGS. 22 and 23, the outer mold line 1712 of the slat 1702 covers the outer mold line 1722 of the chine 1704 when the slat 1702 is in the stowed position 2200.

In the illustrated examples of FIGS. 17-23, the slat 1702 covers the outer mold line 1722, the first lateral surface 1724, and the second lateral surface 1726 of the chine 1704 when the slat 1702 is in the stowed position 2200 shown in FIGS. 22 and 23. The slat 1702 exposes the outer mold line 1722, the first lateral surface 1724, and the second lateral surface 1726 of the chine 1704 when the slat 1702 is in the first deployed position 1700 of FIGS. 17-19 and/or the second deployed position 2000 of FIGS. 20 and 21.

When the outer mold line 1722, the first lateral surface 1724, and the second lateral surface 1726 of the chine 1704 are exposed (e.g., in response to the slat 1702 being moved from the stowed position 2200 of FIGS. 22 and 23 to the first deployed position 1700 of FIGS. 17-19 and/or the second deployed position 2000 of FIGS. 20 and 21), the chine 1704 generates a vortex. For example, the exposed first lateral surface 1724 and/or the exposed second lateral surface 1726 of the chine 1704 shown in FIGS. 17-21 may generate a vortex in response to an airflow presented at the slat 1702 and/or at the chine 1704. In some examples, the vortex generated by the chine 1704 energizes and/or re-energizes a boundary layer located at the topside 1716 of the airfoil 1706. Thus, the chine 1704 provides a positive aerodynamic impact in response to an airflow presented at the slat 1702 and/or at the chine 1704 when the slat 1702 is in the first deployed position 1700 of FIGS. 17-19 and/or the second deployed position 2000 of FIGS. 20 and 21.

When the outer mold line 1722, the first lateral surface 1724, and the second lateral surface 1726 of the chine 1704 are covered (e.g., in response to the slat 1702 being moved into the stowed position 2200 of FIGS. 22 and 23), the chine 1704 does not generate a vortex. For example, the covered outer mold line 1722, the covered first lateral surface 1724, and the covered second lateral surface 1726 of the chine 1704 shown in FIGS. 22 and 23 are unable to generate a vortex in response to an airflow presented at the slat 1702.

Thus, the chine 1704 has no impact on an airflow presented at and/or along the slat 1702 when the slat 1702 is positioned in the stowed position 2200 of FIGS. 22 and 23.

Figure 24:
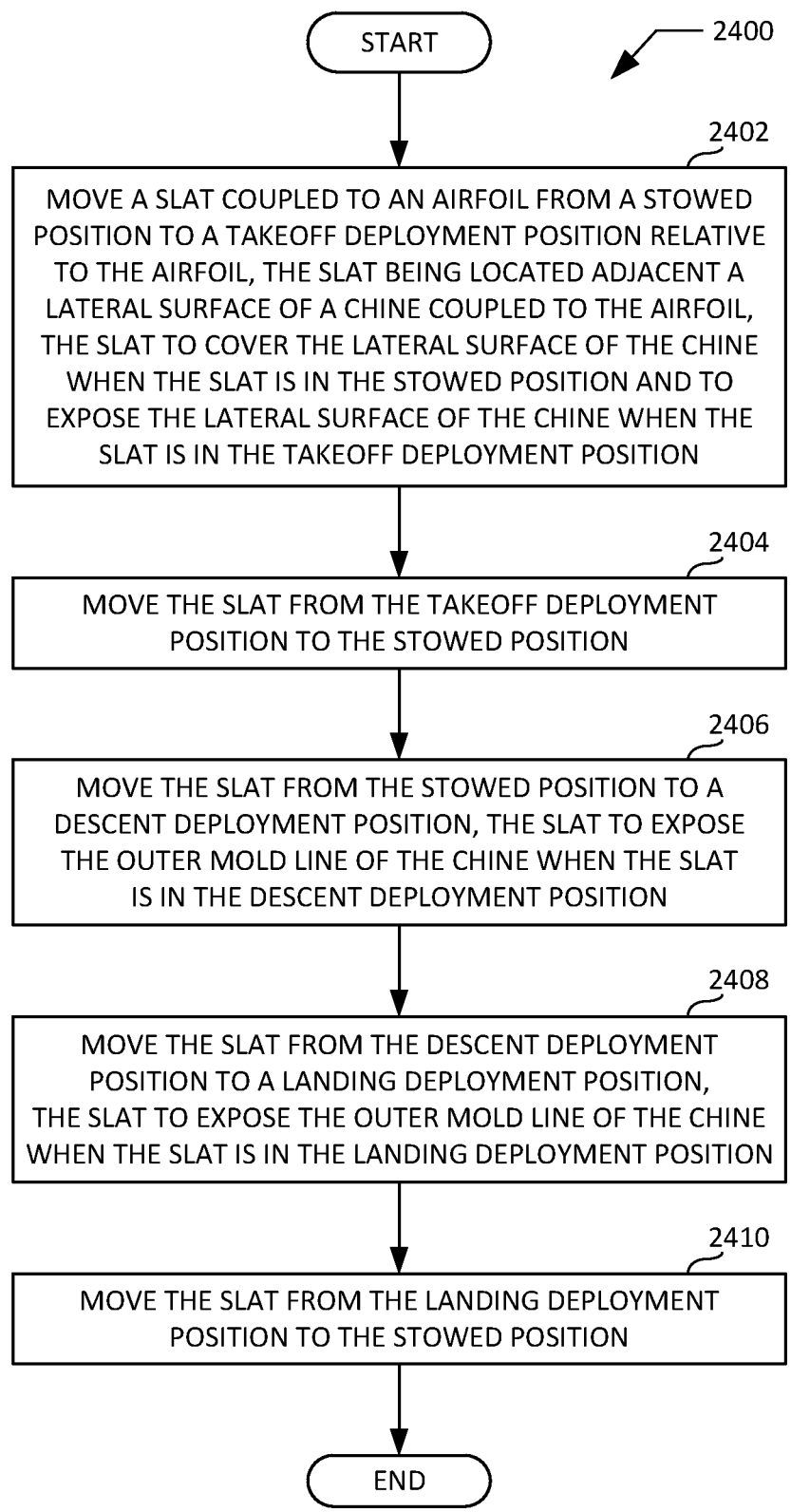
FIG. 24 is a flowchart representative of an example method for positioning the example slat of FIGS. 3-9 relative to the example chine of the example airfoil of FIGS. 3-9.

FIG. 24 is a flowchart representative of an example method 2400 for positioning the example slat 302 of FIGS. 3-9 relative to the example chine 304 of the example airfoil 306 of FIGS. 3-9. In some examples, the method 2400 of FIG. 24 is applicable to a flight sequence that includes a ground departure and/or pre-takeoff operation, a takeoff and/or climb operation, a cruise operation, a descent operation, a landing operation, and a ground arrival and/or post-landing operation. In some examples, one or more of the movement(s) of the slat 302 of FIGS. 3-9 relative to the chine 304 of the airfoil 306 of FIGS. 3-9 as described herein in connection with the method 2400 of FIG. 24 may occur via a deployment assembly (e.g., a roller track assembly) that couples the slat 302 to the airfoil 306. In some examples, one or more movement(s) of the deployment assembly corresponding to one or more movement(s) of the slat 302 relative to the chine 304 of the airfoil 306 occur(s) via an actuator coupled to the deployment assembly and controlled via a controller coupled to the actuator.

The method 2400 of FIG. 24 pertains to moving a slat located adjacent a lateral surface of a chine, where the slat covers the lateral surface of the chine when the slat is in a stowed position. For example, the method 2400 of FIG. 24 may involve moving the slat 302 of FIGS. 3-9 located adjacent the first lateral surface 324 of the chine 304 of FIGS. 3-9, where the slat 302 covers the first lateral surface 324 of the chine 304 when the slat 302 is in a stowed position (e.g., the stowed position 800 of FIGS. 8 and 9), as described above in connection with the examples of FIGS. 3-9.

The method 2400 of FIG. 24 begins with and/or otherwise includes moving a slat coupled to an airfoil from a stowed position to a takeoff deployment position relative to the airfoil (block 2402). For example, in connection with block 2402 of FIG. 24, the slat 302 of FIGS. 3-9 may be moved relative to the airfoil 306 of FIGS. 3-9 from the stowed position 800 of FIGS. 8 and 9 to the second deployed position 600 of FIGS. 6 and 7 (e.g., an example takeoff deployment position). In some examples in connection with block 2402 of FIG. 24, an aircraft (e.g., the aircraft 100 of FIGS. 1 and 2) implementing the slat 302 and the chine 304 of FIGS. 3-9 may be performing a ground departure and/or pre-takeoff operation (e.g., taxiing from a terminal to a runway) when the slat 302 is in the stowed position, and may be performing a takeoff and/or climb operation when the slat 302 is in the takeoff deployment position. In some examples in connection with block 2402 of FIG. 24, an aircraft (e.g., the aircraft 100 of FIGS. 1 and 2) implementing the slat 302 and the chine 304 of FIGS. 3-9 may be traveling at a speed of approximately Mach 0.4 or less when the slat 302 is in the takeoff deployment position.

When the slat is positioned in the takeoff deployment position in connection with block 2402 of FIG. 24, a first lateral surface of the chine and a second lateral surface of the chine located opposite the first lateral surface are exposed (e.g., exposed to an airflow). For example, when the slat 302 of FIGS. 3-9 is positioned in the second deployed position 600 of FIGS. 6 and 7, the first lateral surface 324 and the second lateral surface 326 of the chine 304 are exposed to an airflow presented at and/or along the slat 302 and/or the chine 304. In response to the first lateral surface 324 and the second lateral surface 326 of the chine 304 being exposed to such airflow, the chine 304 generates a vortex to energize and/or re-energize a boundary layer located at the topside 316 of the airfoil 306. Thus, the chine 304 provides a positive aerodynamic impact in response to an airflow presented at and/or along the slat 302 and/or the chine 304 when the slat 302 is positioned in the takeoff deployment position in connection with block 2402 of FIG. 24.

The method 2400 of FIG. 24 includes moving the slat relative to the airfoil from the takeoff deployment position to the stowed position (block 2404). For example, in connection with block 2404 of FIG. 24, the slat 302 of FIGS. 3-9 may be moved relative to the airfoil 306 of FIGS. 3-9 from the second deployed position 600 of FIGS. 6 and 7 to the stowed position 800 of FIGS. 8 and 9. In some examples in connection with block 2404 of FIG. 24, an aircraft (e.g., the aircraft 100 of FIGS. 1 and 2) implementing the slat 302 and the chine 304 of FIGS. 3-9 may be performing a takeoff and/or climb operation when the slat 302 is in the takeoff deployment position, and may be performing a cruise operation when the slat 302 is in the stowed position. In some examples in connection with block 2404 of FIG. 24, an aircraft (e.g., the aircraft 100 of FIGS. 1 and 2) implementing the slat 302 and the chine 304 of FIGS. 3-9 may be traveling at a speed of approximately Mach 0.4 or less when the slat 302 is in the takeoff deployment position. In some examples in connection with block 2404 of FIG. 24, an aircraft (e.g., the aircraft 100 of FIGS. 1 and 2) implementing the slat 302 and the chine 304 of FIGS. 3-9 may be traveling at a speed of greater than Mach 0.4 when the slat 302 is in the stowed position.

When the slat is positioned in the stowed position in connection with block 2404 of FIG. 24, the first lateral surface and the second lateral surface of the chine are covered and/or not exposed (e.g., covered from and/or not exposed to an airflow). For example, when the slat 302 of FIGS. 3-9 is positioned in the stowed position 800 of FIGS. 8 and 9, the first lateral surface 324 and the second lateral surface 326 of the chine 304 are covered from and/or not exposed to an airflow presented at and/or along the slat 302. In response to the first lateral surface 324 and the second lateral surface 326 of the chine 304 being covered from and/or not exposed to such airflow, the chine 304 does not generate a vortex. Thus, the chine 304 has no impact on an airflow presented at and/or along the slat 302 when the slat 302 is positioned in the stowed position in connection with block 2404 of FIG. 24.

The method 2400 of FIG. 24 includes moving the slat relative to the airfoil from the stowed position to a descent deployment position (block 2406). For example, in connection with block 2406 of FIG. 24, the slat 302 of FIGS. 3-9 may be moved relative to the airfoil 306 of FIGS. 3-9 from the stowed position 800 of FIGS. 8 and 9 to the second deployed position 600 of FIGS. 6 and 7 (e.g., an example descent deployment position). In some examples in connection with block 2406 of FIG. 24, an aircraft (e.g., the aircraft 100 of FIGS. 1 and 2) implementing the slat 302 and the chine 304 of FIGS. 3-9 may be performing a cruise operation when the slat 302 is in the stowed position, and may be performing a descent operation when the slat 302 is in the descent deployment position. In some examples in connection with block 2406 of FIG. 24, an aircraft (e.g., the aircraft 100 of FIGS. 1 and 2) implementing the slat 302 and the chine 304 of FIGS. 3-9 may be traveling at a speed of greater than Mach 0.4 when the slat 302 is in the stowed position. In some examples in connection with block 2406 of FIG. 24, an aircraft (e.g., the aircraft 100 of FIGS. 1 and 2) implementing the slat 302 and the chine 304 of FIGS. 3-9 may be traveling at a speed of approximately Mach 0.4 or less when the slat 302 is in the descent deployment position.

When the slat is positioned in the descent deployment position in connection with block 2406 of FIG. 24, the first lateral surface and the second lateral surface of the chine are exposed (e.g., exposed to an airflow). For example, when the slat 302 of FIGS. 3-9 is positioned in the second deployed position 600 of FIGS. 6 and 7, the first lateral surface 324 and the second lateral surface 326 of the chine 304 are exposed to an airflow presented at and/or along the slat 302 and/or the chine 304. In response to the first lateral surface 324 and the second lateral surface 326 of the chine 304 being exposed to such airflow, the chine 304 generates a vortex to energize and/or re-energize a boundary layer located at the topside 316 of the airfoil 306. Thus, the chine 304 provides a positive aerodynamic impact in response to an airflow presented at and/or along the slat 302 and/or the chine 304 when the slat 302 is positioned in the descent deployment position in connection with block 2406 of FIG. 24.

The method 2400 of FIG. 24 includes moving the slat relative to the airfoil from the descent deployment position to a landing deployment position (block 2408). For example, in connection with block 2408 of FIG. 24, the slat 302 of FIGS. 3-9 may be moved relative to the airfoil 306 of FIGS. 3-9 from the second deployed position 600 of FIGS. 6 and 7 to the first deployed position 300 of FIGS. 3-5 (e.g., an example landing deployment position). In some examples in connection with block 2408 of FIG. 24, an aircraft (e.g., the aircraft 100 of FIGS. 1 and 2) implementing the slat 302 and the chine 304 of FIGS. 3-9 may be performing a descent operation when the slat 302 is in the descent deployment position, and may be performing a landing operation when the slat 302 is in the landing deployment position. In some examples in connection with block 2408 of FIG. 24, an aircraft (e.g., the aircraft 100 of FIGS. 1 and 2) implementing the slat 302 and the chine 304 of FIGS. 3-9 may be traveling at a speed of approximately Mach 0.4 or less when the slat 302 is in the descent deployment position, and may also be traveling at a speed of approximately Mach 0.4 or less when the slat 302 is in the landing deployment position.

When the slat is positioned in the landing deployment position in connection with block 2408 of FIG. 24, the first lateral surface and the second lateral surface of the chine are exposed (e.g., exposed to an airflow). For example, when the slat 302 of FIGS. 3-9 is positioned in the first deployed position 300 of FIGS. 3-5, the first lateral surface 324 and the second lateral surface 326 of the chine 304 are exposed to an airflow presented at and/or along the slat 302 and/or the chine 304. In response to the first lateral surface 324 and the second lateral surface 326 of the chine 304 being exposed to such airflow, the chine 304 generates a vortex to energize and/or re-energize a boundary layer located at the topside 316 of the airfoil 306. Thus, the chine 304 provides a positive aerodynamic impact in response to an airflow presented at and/or along the slat 302 and/or the chine 304 when the slat 302 is positioned in the landing deployment position in connection with block 2408 of FIG. 24.

The method 2400 of FIG. 24 includes moving the slat relative to the airfoil from the landing deployment position to the stowed position (block 2410). For example, in connection with block 2410 of FIG. 24, the slat 302 of FIGS. 3-9 may be moved relative to the airfoil 306 of FIGS. 3-9 from the first deployed position 300 of FIGS. 3-5 to the stowed position 800 of FIGS. 8 and 9. In some examples in connection with block 2410 of FIG. 24, an aircraft (e.g., the aircraft 100 of FIGS. 1 and 2) implementing the slat 302 and the chine 304 of FIGS. 3-9 may be performing a landing operation when the slat 302 is in the landing deployment position, and may be performing a ground arrival and/or post-landing operation (e.g., taxiing from a runway to a terminal) when the slat 302 is in the stowed position. In some examples in connection with block 2410 of FIG. 24, an aircraft (e.g., the aircraft 100 of FIGS. 1 and 2) implementing the slat 302 and the chine 304 of FIGS. 3-9 may be traveling at a speed of approximately Mach 0.4 or less when the slat 302 is in the landing deployment position.

When the slat is positioned in the stowed position in connection with block 2410 of FIG. 24, the first lateral surface and the second lateral surface of the chine are covered and/or not exposed (e.g., covered from and/or not exposed to an airflow). For example, when the slat 302 of FIGS. 3-9 is positioned in the stowed position 800 of FIGS. 8 and 9, the first lateral surface 324 and the second lateral surface 326 of the chine 304 are covered from and/or not exposed to an airflow presented at and/or along the slat 302. In response to the first lateral surface 324 and the second lateral surface 326 of the chine 304 being covered from such airflow, the chine 304 does not generate a vortex. Thus, the chine 304 has no impact on an airflow presented at and/or along the slat 302 when the slat 302 is positioned in the stowed position in connection with block 2410 of FIG. 24. Following block 2410, the method 2400 of FIG. 24 ends.

Figure 25:
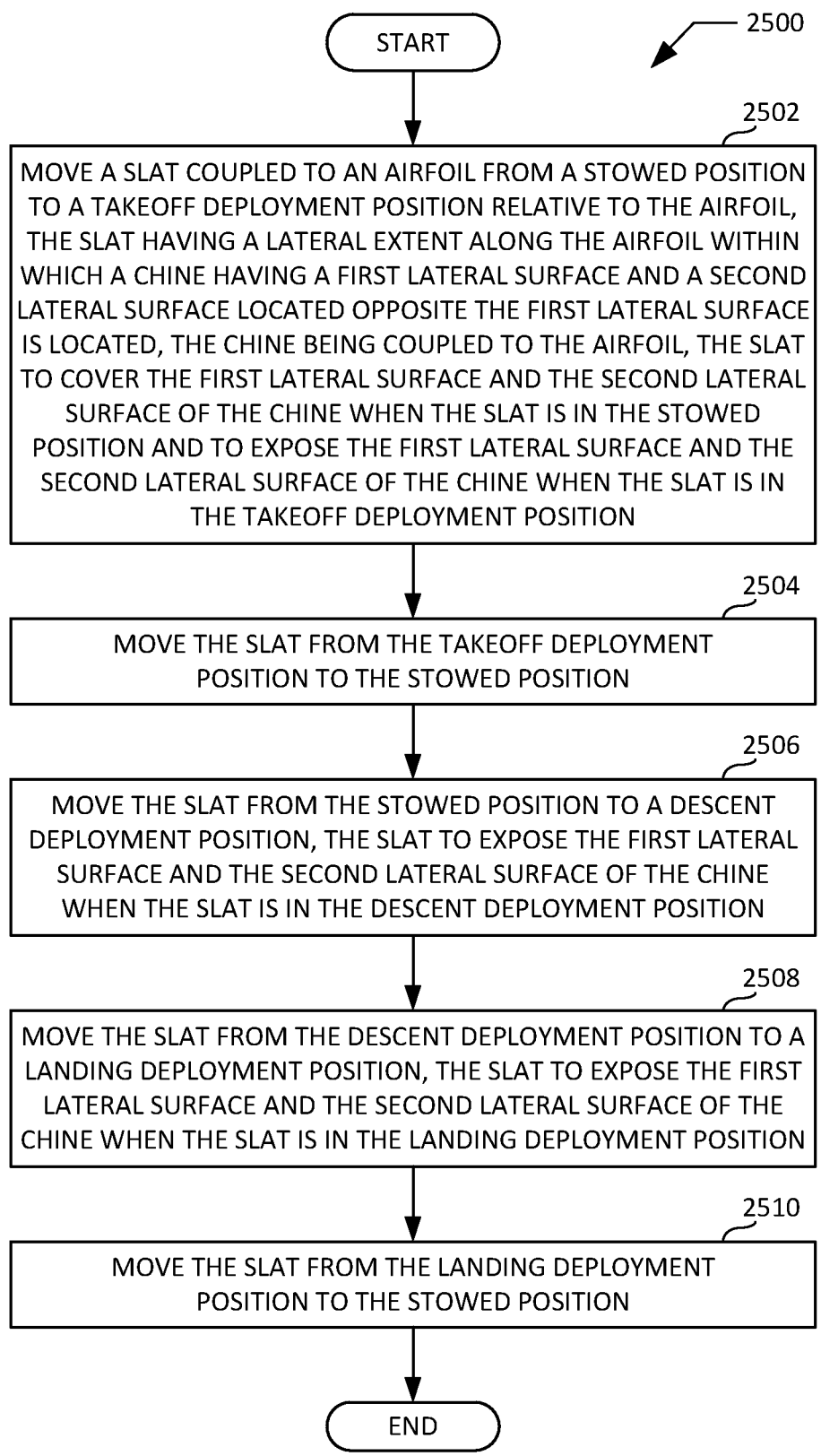
FIG. 25 is a flowchart representative of an example method for positioning the example slat of FIGS. 10-16 relative to the example chine of the example airfoil of FIGS. 10-16.

FIG. 25 is a flowchart representative of an example method 2500 for positioning the example slat 1002 of FIGS. 10-16 relative to the example chine 1004 of the example airfoil 1006 of FIGS. 10-16. In some examples, the method 2500 of FIG. 25 is applicable to a flight sequence that includes a ground departure and/or pre-takeoff operation, a takeoff and/or climb operation, a cruise operation, a descent operation, a landing operation, and a ground arrival and/or post-landing operation. In some examples, one or more of the movement(s) of the slat 1002 of FIGS. 10-16 relative to the chine 1004 of the airfoil 1006 of FIGS. 10-16 as described herein in connection with the method 2500 of FIG. 25 may occur via a deployment assembly (e.g., a roller track assembly) that couples the slat 1002 to the airfoil 1006. In some examples, one or more movement(s) of the deployment assembly corresponding to one or more movement(s) of the slat 1002 relative to the chine 1004 of the airfoil 1006 occur(s) via an actuator coupled to the deployment assembly and controlled via a controller coupled to the actuator.

The method 2500 of FIG. 25 pertains to moving a slat relative to a chine having a first lateral surface and a second lateral surface located opposite the first lateral surface, where the chine is located within a lateral extent of the slat along an airfoil, and where the slat covers the first lateral surface and the second lateral surface of the chine when the slat is in a stowed position. For example, the method 2500 of FIG. 25 may involve moving the slat 1002 of FIGS. 10-16 relative to the chine 1004 of FIGS. 10-16 having the first lateral surface 1024 and the second lateral surface 1026 if of FIGS. 10-16, where the chine 1004 is located within the lateral extent 1202 of the slat 1002 of FIGS. 10-16, and where the slat 1002 covers the first lateral surface 1024 and the second lateral surface 1026 of the chine 1004 when the chine is in a stowed position (e.g., the stowed position 1500 of FIGS. 15 and 16), as described above in connection with the examples of FIGS. 10-16.

The method 2500 of FIG. 25 begins with and/or otherwise includes moving a slat coupled to an airfoil from a stowed position to a takeoff deployment position relative to the airfoil (block 2502). For example, in connection with block 2502 of FIG. 25, the slat 1002 of FIGS. 10-16 may be moved relative to the airfoil 1006 of FIGS. 10-16 from the stowed position 1500 of FIGS. 15 and 16 to the second deployed position 1300 of FIGS. 13 and 14 (e.g., an example takeoff deployment position). In some examples in connection with block 2502 of FIG. 25, an aircraft (e.g., the aircraft 100 of FIGS. 1 and 2) implementing the slat 1002 and the chine 1004 of FIGS. 10-16 may be performing a ground departure and/or pre-takeoff operation (e.g., taxiing from a terminal to a runway) when the slat 1002 is in the stowed position, and may be performing a takeoff and/or climb operation when the slat 1002 is in the takeoff deployment position. In some examples in connection with block 2502 of FIG. 25, an aircraft (e.g., the aircraft 100 of FIGS. 1 and 2) implementing the slat 1002 and the chine 1004 of FIGS. 10-16 may be traveling at a speed of approximately Mach 0.4 or less when the slat 1002 is in the takeoff deployment position.

When the slat is positioned in the takeoff deployment position in connection with block 2502 of FIG. 25, a first lateral surface of the chine and a second lateral surface of the chine located opposite the first lateral surface are exposed (e.g., exposed to an airflow). For example, when the slat 1002 of FIGS. 10-16 is positioned in the second deployed position 1300 of FIGS. 13 and 14, the first lateral surface 1024 and the second lateral surface 1026 of the chine 1004 are exposed to an airflow presented at and/or along the slat 1002 and/or the chine 1004. In response to the first lateral surface 1024 and the second lateral surface 1026 of the chine 1004 being exposed to such airflow, the chine 1004 generates a vortex to energize and/or re-energize a boundary layer located at the topside 1016 of the airfoil 1006. Thus, the chine 1004 provides a positive aerodynamic impact in response to an airflow presented at and/or along the slat 1002 and/or the chine 1004 when the slat 1002 is positioned in the takeoff deployment position in connection with block 2502 of FIG. 25.

The method 2500 of FIG. 25 includes moving the slat relative to the airfoil from the takeoff deployment position to the stowed position (block 2504). For example, in connection with block 2504 of FIG. 25, the slat 1002 of FIGS. 10-16 may be moved relative to the airfoil 1006 of FIGS. 10-16 from the second deployed position 1300 of FIGS. 13 and 14 to the stowed position 1500 of FIGS. 15 and 16. In some examples in connection with block 2504 of FIG. 25, an aircraft (e.g., the aircraft 100 of FIGS. 1 and 2) implementing the slat 1002 and the chine 1004 of FIGS. 10-16 may be performing a takeoff and/or climb operation when the slat 1002 is in the takeoff deployment position, and may be performing a cruise operation when the slat 1002 is in the stowed position. In some examples in connection with block 2504 of FIG. 25, an aircraft (e.g., the aircraft 100 of FIGS. 1 and 2) implementing the slat 1002 and the chine 1004 of FIGS. 10-16 may be traveling at a speed of approximately Mach 0.4 or less when the slat 1002 is in the takeoff deployment position. In some examples in connection with block 2504 of FIG. 25, an aircraft (e.g., the aircraft 100 of FIGS. 1 and 2) implementing the slat 1002 and the chine 1004 of FIGS. 10-16 may be traveling at a speed of greater than Mach 0.4 when the slat 1002 is in the stowed position.

When the slat is positioned in the stowed position in connection with block 2504 of FIG. 25, the first lateral surface and the second lateral surface of the chine are covered and/or not exposed (e.g., covered from and/or not exposed to an airflow). For example, when the slat 1002 of FIGS. 10-16 is positioned in the stowed position 1500 of FIGS. 15 and 16, the first lateral surface 1024 and the second lateral surface 1026 of the chine 1004 are covered from and/or not exposed to an airflow presented at and/or along the slat 1002. In response to the first lateral surface 1024 and the second lateral surface 1026 of the chine 1004 being covered from and/or not exposed to such airflow, the chine 1004 does not generate a vortex. Thus, the chine 1004 has no impact on an airflow presented at and/or along the slat 1002 when the slat 1002 is positioned in the stowed position in connection with block 2504 of FIG. 25.

The method 2500 of FIG. 25 includes moving the slat relative to the airfoil from the stowed position to a descent deployment position (block 2506). For example, in connection with block 2506 of FIG. 25, the slat 1002 of FIGS. 10-16 may be moved relative to the airfoil 1006 of FIGS. 10-16 from the stowed position 1500 of FIGS. 15 and 16 to the second deployed position 1300 of FIGS. 13 and 14 (e.g., an example descent deployment position). In some examples in connection with block 2506 of FIG. 25, an aircraft (e.g., the aircraft 100 of FIGS. 1 and 2) implementing the slat 1002 and the chine 1004 of FIGS. 10-16 may be performing a cruise operation when the slat 1002 is in the stowed position, and may be performing a descent operation when the slat 1002 is in the decent deployment position. In some examples in connection with block 2506 of FIG. 25, an aircraft (e.g., the aircraft 100 of FIGS. 1 and 2) implementing the slat 1002 and the chine 1004 of FIGS. 10-16 may be traveling at a speed of greater than Mach 0.4 when the slat 1002 is in the stowed position. In some examples in connection with block 2506 of FIG. 25, an aircraft (e.g., the aircraft 100 of FIGS. 1 and 2) implementing the slat 1002 and the chine 1004 of FIGS. 10-16 may be traveling at a speed of approximately Mach 0.4 or less when the slat 1002 is in the descent deployment position.

When the slat is positioned in the descent deployment position in connection with block 2506 of FIG. 25, the first lateral surface and the second lateral surface of the chine are exposed (e.g., exposed to an airflow). For example, when the slat 1002 of FIGS. 10-16 is positioned in the second deployed position 1300 of FIGS. 13 and 14, the first lateral surface 1024 and the second lateral surface 1026 of the chine 1004 are exposed to an airflow presented at and/or along the slat 1002 and/or the chine 1004. In response to the first lateral surface 1024 and the second lateral surface 1026 of the chine 1004 being exposed to such airflow, the chine 1004 generates a vortex to energize and/or re-energize a boundary layer located at the topside 1016 of the airfoil 1006. Thus, the chine 1004 provides a positive aerodynamic impact in response to an airflow presented at and/or along the slat 1002 and/or the chine 1004 when the slat 1002 is positioned in the descent deployment position in connection with block 2506 of FIG. 25.

The method 2500 of FIG. 25 includes moving the slat relative to the airfoil from the descent deployment position to a landing deployment position (block 2508). For example, in connection with block 2508 of FIG. 25, the slat 1002 of FIGS. 10-16 may be moved relative to the airfoil 1006 of FIGS. 10-16 from the second deployed position 1300 of FIGS. 13 and 14 to the first deployed position 1000 of FIGS. 10-12 (e.g., an example landing deployment position). In some examples in connection with block 2508 of FIG. 25, an aircraft (e.g., the aircraft 100 of FIGS. 1 and 2) implementing the slat 1002 and the chine 1004 of FIGS. 10-16 may be performing a descent operation when the slat 1002 is in the descent deployment position, and may be performing a landing operation when the slat 1002 is in the landing deployment position. In some examples in connection with block 2508 of FIG. 25, an aircraft (e.g., the aircraft 100 of FIGS. 1 and 2) implementing the slat 1002 and the chine 1004 of FIGS. 10-16 may be traveling at a speed of approximately Mach 0.4 or less when the slat 1002 is in the descent deployment position, and may also be traveling at a speed of approximately Mach 0.4 or less when the slat 1002 is in the landing deployment position.

When the slat is positioned in the landing deployment position in connection with block 2508 of FIG. 25, the first lateral surface and the second lateral surface of the chine are exposed (e.g., exposed to an airflow). For example, when the slat 1002 of FIGS. 10-16 is positioned in the first deployed position 1000 of FIGS. 10-12, the first lateral surface 1024 and the second lateral surface 1026 of the chine 1004 are exposed to an airflow presented at and/or along the slat 1002 and/or the chine 1004. In response to the first lateral surface 1024 and the second lateral surface 1026 of the chine 1004 being exposed to such airflow, the chine 1004 generates a vortex to energize and/or re-energize a boundary layer located at the topside 1016 of the airfoil 1006. Thus, the chine 1004 provides a positive aerodynamic impact in response to an airflow presented at and/or along the slat 1002 and/or the chine 1004 when the slat 1002 is positioned in the landing deployment position in connection with block 2508 of FIG. 25.

The method 2500 of FIG. 25 includes moving the slat relative to the airfoil from the landing deployment position to the stowed position (block 2510). For example, in connection with block 2510 of FIG. 25, the slat 1002 of FIGS. 10-16 may be moved relative to the airfoil 1006 of FIGS. 10-16 from the first deployed position 1000 of FIGS. 10-12 to the stowed position 1500 of FIGS. 15 and 16. In some examples in connection with block 2510 of FIG. 25, an aircraft (e.g., the aircraft 100 of FIGS. 1 and 2) implementing the slat 1002 and the chine 1004 of FIGS. 10-16 may be performing a landing operation when the slat 1002 is in the landing deployment position, and may be performing a ground arrival and/or post-landing operation (e.g., taxiing from a runway to a terminal) when the slat 1002 is in the stowed position. In some examples in connection with block 2510 of FIG. 25, an aircraft (e.g., the aircraft 100 of FIGS. 1 and 2) implementing the slat 1002 and the chine 1004 of FIGS. 10-16 may be traveling at a speed of approximately Mach 0.4 or less when the slat 1002 is in the landing deployment position.

When the slat is positioned in the stowed position in connection with block 2510 of FIG. 25, the first lateral surface and the second lateral surface of the chine are covered and/or not exposed (e.g., covered from and/or not exposed to an airflow). For example, when the slat 1002 of FIGS. 10-16 is positioned in the stowed position 1500 of FIGS. 15 and 16, the first lateral surface 1024 and the second lateral surface 1026 of the chine 1004 are covered from and/or not exposed to an airflow presented at and/or along the slat 1002. In response to the first lateral surface 1024 and the second lateral surface 1026 of the chine 1004 being covered from such airflow, the chine 1004 does not generate a vortex. Thus, the chine 1004 has no impact on an airflow presented at and/or along the slat 1002 when the slat 1002 is positioned in the stowed position in connection with block 2510 of FIG. 25. Following block 2510, the method 2500 of FIG. 25 ends.

Figure 26:
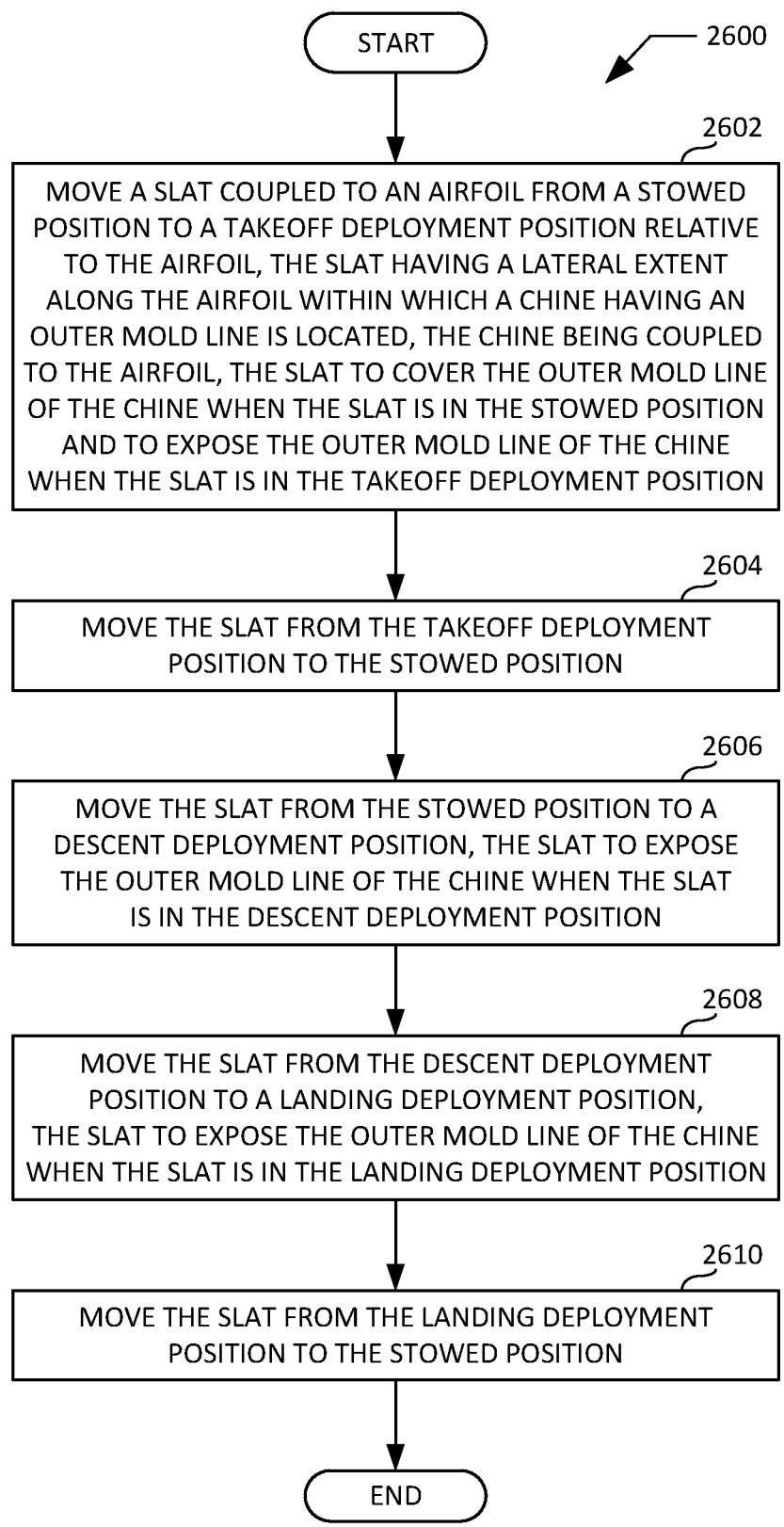
FIG. 26 is a flowchart representative of an example method for positioning the example slat of FIGS. 17-23 relative to the example chine of the example airfoil of FIGS. 17-23.

FIG. 26 is a flowchart representative of an example method 2600 for positioning the example slat 1702 of FIGS. 17-23 relative to the example chine 1704 of the example airfoil 1706 of FIGS. 17-23. In some examples, the method 2600 of FIG. 26 is applicable to a flight sequence that includes a ground departure and/or pre-takeoff operation, a takeoff and/or climb operation, a cruise operation, a descent operation, a landing operation, and a ground arrival and/or post-landing operation. In some examples, one or more of the movement(s) of the slat 1702 of FIGS. 17-23 relative to the chine 1704 of the airfoil 1706 of FIGS. 17-23 as described herein in connection with the method 2600 of FIG. 26 may occur via a deployment assembly (e.g., a roller track assembly) that couples the slat 1702 to the airfoil 1706. In some examples, one or more movement(s) of the deployment assembly corresponding to one or more movement(s) of the slat 1702 relative to the chine 1704 of the airfoil 1706 occur(s) via an actuator coupled to the deployment assembly and controlled via a controller coupled to the actuator.

The method 2600 of FIG. 26 pertains to moving a slat relative to a chine having an outer mold line, where the chine is located within a lateral extent of the slat along an airfoil, and where the slat covers the outer mold line of the chine when the slat is in a stowed position. For example, the method 2600 of FIG. 26 may involve moving the slat 1702 of FIGS. 17-23 relative to the chine 1704 of FIGS. 17-23 having the outer mold line 1722 of FIGS. 17-23, where the chine 1704 is located within the lateral extent 1902 of the slat 1702 of FIGS. 17-23, and where the slat 1702 covers the outer mold line 1722 of the chine 1704 when the slat 1702 is in a stowed position (e.g., the stowed position 2200 of FIGS. 22 and 23), as described above in connection with the examples of FIGS. 17-23.

The method 2600 of FIG. 26 begins with and/or otherwise includes moving a slat coupled to an airfoil from a stowed position to a takeoff deployment position relative to the airfoil (block 2602). For example, in connection with block 2602 of FIG. 26, the slat 1702 of FIGS. 17-23 may be moved relative to the airfoil 1706 of FIGS. 17-23 from the stowed position 2200 of FIGS. 22 and 23 to the second deployed position 2000 of FIGS. 20 and 21 (e.g., an example takeoff deployment position). In some examples in connection with block 2602 of FIG. 26, an aircraft (e.g., the aircraft 100 of FIGS. 1 and 2) implementing the slat 1702 and the chine 1704 of FIGS. 17-23 may be performing a ground departure and/or pre-takeoff operation (e.g., taxiing from a terminal to a runway) when the slat 1702 is in the stowed position, and may be performing a takeoff and/or climb operation when the slat 1702 is in the takeoff deployment position. In some examples in connection with block 2602 of FIG. 26, an aircraft (e.g., the aircraft 100 of FIGS. 1 and 2) implementing the slat 1702 and the chine 1704 of FIGS. 17-23 may be traveling at a speed of approximately Mach 0.4 or less when the slat 1702 is in the takeoff deployment position.

When the slat is positioned in the takeoff deployment position in connection with block 2602 of FIG. 26, a first lateral surface of the chine and a second lateral surface of the chine located opposite the first lateral surface are exposed (e.g., exposed to an airflow). For example, when the slat 1702 of FIGS. 17-23 is positioned in the second deployed position 2000 of FIGS. 20 and 21, the first lateral surface 1724 and the second lateral surface 1726 of the chine 1704 are exposed to an airflow presented at and/or along the slat 1702 and/or the chine 1704. In response to the first lateral surface 1724 and the second lateral surface 1726 of the chine 1704 being exposed to such airflow, the chine 1704 generates a vortex to energize and/or re-energize a boundary layer located at the topside 1716 of the airfoil 1706. Thus, the chine 1704 provides a positive aerodynamic impact in response to an airflow presented at and/or along the slat 1702 and/or the chine 1704 when the slat 1702 is positioned in the takeoff deployment position in connection with block 2602 of FIG. 26.

The method 2600 of FIG. 26 includes moving the slat relative to the airfoil from the takeoff deployment position to the stowed position (block 2604). For example, in connection with block 2604 of FIG. 26, the slat 1702 of FIGS. 17-23 may be moved relative to the airfoil 1706 of FIGS. 17-23 from the second deployed position 2000 of FIGS. 20 and 21 to the stowed position 2200 of FIGS. 22 and 23. In some examples in connection with block 2604 of FIG. 26, an aircraft (e.g., the aircraft 100 of FIGS. 1 and 2) implementing the slat 1702 and the chine 1704 of FIGS. 17-23 may be performing a takeoff and/or climb operation when the slat 1702 is in the takeoff deployment position, and may be performing a cruise operation when the slat 1702 is in the stowed position. In some examples in connection with block 2604 of FIG. 26, an aircraft (e.g., the aircraft 100 of FIGS. 1 and 2) implementing the slat 1702 and the chine 1704 of FIGS. 17-23 may be traveling at a speed of approximately Mach 0.4 or less when the slat 1702 is in the takeoff deployment position. In some examples in connection with block 2604 of FIG. 26, an aircraft (e.g., the aircraft 100 of FIGS. 1 and 2) implementing the slat 1702 and the chine 1704 of FIGS. 17-23 may be traveling at a speed of greater than Mach 0.4 when the slat 1702 is in the stowed position.

When the slat is positioned in the stowed position in connection with block 2604 of FIG. 26, the first lateral surface and the second lateral surface of the chine are covered and/or not exposed (e.g., covered from and/or not exposed to an airflow). For example, when the slat 1702 of FIGS. 17-23 is positioned in the stowed position 2200 of FIGS. 22 and 23, the first lateral surface 1724 and the second lateral surface 1726 of the chine 1704 are covered from and/or not exposed to an airflow presented at and/or along the slat 1702. In response to the first lateral surface 1724 and the second lateral surface 1726 of the chine 1704 being covered from and/or not exposed to such airflow, the chine 1704 does not generate a vortex. Thus, the chine 1704 has no impact on an airflow presented at and/or along the slat 1702 when the slat 1702 is positioned in the stowed position in connection with block 2604 of FIG. 26.

The method 2600 of FIG. 26 includes moving the slat relative to the airfoil from the stowed position to a descent deployment position (block 2606). For example, in connection with block 2606 of FIG. 26, the slat 1702 of FIGS. 17-23 may be moved relative to the airfoil 1706 of FIGS. 17-23 from the stowed position 2200 of FIGS. 22 and 23 to the second deployed position 2000 of FIGS. 20 and 21 (e.g., an example descent deployment position). In some examples in connection with block 2606 of FIG. 26, an aircraft (e.g., the aircraft 100 of FIGS. 1 and 2) implementing the slat 1702 and the chine 1704 of FIGS. 17-23 may be performing a cruise operation when the slat 1702 is in the stowed position, and may be performing a descent operation when the slat 1702 is in the descent deployment position. In some examples in connection with block 2606 of FIG. 26, an aircraft (e.g., the aircraft 100 of FIGS. 1 and 2) implementing the slat 1702 and the chine 1704 of FIGS. 17-23 may be traveling at a speed of greater than Mach 0.4 when the slat 1702 is in the stowed position. In some examples in connection with block 2606 of FIG. 26, an aircraft (e.g., the aircraft 100 of FIGS. 1 and 2) implementing the slat 1702 and the chine 1704 of FIGS. 17-23 may be traveling at a speed of approximately Mach 0.4 or less when the slat 1702 is in the descent deployment position.

When the slat is positioned in the descent deployment position in connection with block 2606 of FIG. 26, the first lateral surface and the second lateral surface of the chine are exposed (e.g., exposed to an airflow). For example, when the slat 1702 of FIGS. 17-23 is positioned in the second deployed position 2000 of FIGS. 20 and 21, the first lateral surface 1724 and the second lateral surface 1726 of the chine 1704 are exposed to an airflow presented at and/or along the slat 1702 and/or the chine 1704. In response to the first lateral surface 1724 and the second lateral surface 1726 of the chine 1704 being exposed to such airflow, the chine 1704 generates a vortex to energize and/or re-energize a boundary layer located at the topside 1716 of the airfoil 1706. Thus, the chine 1704 provides a positive aerodynamic impact in response to an airflow presented at and/or along the slat 1702 and/or the chine 1704 when the slat 1702 is positioned in the descent deployment position in connection with block 2606 of FIG. 26.

The method 2600 of FIG. 26 includes moving the slat relative to the airfoil from the descent deployment position to a landing deployment position (block 2608). For example, in connection with block 2608 of FIG. 26, the slat 1702 of FIGS. 17-23 may be moved relative to the airfoil 1706 of FIGS. 17-23 from the second deployed position 2000 of FIGS. 20 and 21 to the first deployed position 1700 of FIGS. 17-19 (e.g., an example landing deployment position). In some examples in connection with block 2608 of FIG. 26, an aircraft (e.g., the aircraft 100 of FIGS. 1 and 2) implementing the slat 1702 and the chine 1704 of FIGS. 17-23 may be performing a descent operation when the slat 1702 is in the descent deployment position, and may be performing a landing operation when the slat 1702 is in the landing deployment position. In some examples in connection with block 2608 of FIG. 26, an aircraft (e.g., the aircraft 100 of FIGS. 1 and 2) implementing the slat 1702 and the chine 1704 of FIGS. 17-23 may be traveling at a speed of approximately Mach 0.4 or less when the slat 1702 is in the descent deployment position, and may also be traveling at a speed of approximately Mach 0.4 or less when the slat 1702 is in the landing deployment position.

When the slat is positioned in the landing deployment position in connection with block 2608 of FIG. 26, the first lateral surface and the second lateral surface of the chine are exposed (e.g., exposed to an airflow). For example, when the slat 1702 of FIGS. 17-23 is positioned in the first deployed position 1700 of FIGS. 17-19, the first lateral surface 1724 and the second lateral surface 1726 of the chine 1704 are exposed to an airflow presented at and/or along the slat 1702 and/or the chine 1704. In response to the first lateral surface 1724 and the second lateral surface 1726 of the chine 1704 being exposed to such airflow, the chine 1704 generates a vortex to energize and/or re-energize a boundary layer located at the topside 1716 of the airfoil 1706. Thus, the chine 1704 provides a positive aerodynamic impact in response to an airflow presented at and/or along the slat 1702 and/or the chine 1704 when the slat 1702 is positioned in the landing deployment position in connection with block 2608 of FIG. 26.

The method 2600 of FIG. 26 includes moving the slat relative to the airfoil from the landing deployment position to the stowed position (block 2610). For example, in connection with block 2610 of FIG. 26, the slat 1702 of FIGS. 17-23 may be moved relative to the airfoil 1706 of FIGS. 17-23 from the first deployed position 1700 of FIGS. 17-19 to the stowed position 2200 of FIGS. 22 and 23. In some examples in connection with block 2610 of FIG. 26, an aircraft (e.g., the aircraft 100 of FIGS. 1 and 2) implementing the slat 1702 and the chine 1704 of FIGS. 17-23 may be performing a landing operation when the slat 1702 is in the landing deployment position, and may be performing a ground arrival and/or post-landing operation (e.g., taxiing from a runway to a terminal) when the slat 1702 is in the stowed position. In some examples in connection with block 2610 of FIG. 26, an aircraft (e.g., the aircraft 100 of FIGS. 1 and 2) implementing the slat 1702 and the chine 1704 of FIGS. 17-23 may be traveling at a speed of approximately Mach 0.4 or less when the slat 1702 is in the landing deployment position.

When the slat is positioned in the stowed position in connection with block 2610 of FIG. 26, the first lateral surface and the second lateral surface of the chine are covered and/or not exposed (e.g., covered from and/or not exposed to an airflow). For example, when the slat 1702 of FIGS. 17-23 is positioned in the stowed position 2200 of FIGS. 22 and 23, the first lateral surface 1724 and the second lateral surface 1726 of the chine 1704 are covered from and/or not exposed to an airflow presented at and/or along the slat 1702. In response to the first lateral surface 1724 and the second lateral surface 1726 of the chine 1704 being covered from such airflow, the chine 1704 does not generate a vortex. Thus, the chine 1704 has no impact on an airflow presented at and/or along the slat 1702 when the slat 1702 is positioned in the stowed position in connection with block 2610 of FIG. 26. Following block 2610, the method 2600 of FIG. 26 ends.

From the foregoing, it will be appreciated that the disclosed integrated slat chine apparatus and methods advantageously increase the aerodynamic performance (e.g., increase the maximum lift coefficient) of an airfoil when a slat of the apparatus is deployed (e.g., during takeoff and/or landing operations of an aircraft) relative to a chine of the apparatus that is coupled to and/or integrated with the airfoil. In some examples, the chine of the apparatus may advantageously generate a vortex to energize and/or re-energize a boundary layer of the airfoil to which the chine is coupled. In some examples, the generated vortex may increase a lift to drag (L/D) ratio associated with the airfoil when the slat of the apparatus is deployed. The disclosed integrated slat chine apparatus and methods provide the aforementioned benefit without adversely impacting the aerodynamic performance of the airfoil when the slat of the apparatus is stowed (e.g., during a cruise operation of an aircraft) relative to the chine of the apparatus. Implementation of the disclosed integrated slat chine apparatus and methods may also advantageously reduce (e.g., eliminate) any reliance on and/or need for auto-slat and/or auto-gap functions and associated actuation hardware.

In some disclosed examples, a first example apparatus comprises a chine and a slat. In some disclosed examples, the chine is coupled to an airfoil. In some disclosed examples, the chine has a lateral surface. In some disclosed examples, the slat is located adjacent the lateral surface of the chine and coupled to the airfoil. In some disclosed examples, the slat is movable relative to the airfoil between a stowed position and a deployed position. In some disclosed examples, the slat is to expose the lateral surface of the chine when the slat is in the deployed position and to cover the lateral surface of the chine when the slat is in the stowed position.

In some disclosed examples of the first example apparatus, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine is located outboard of a nacelle coupled to the airfoil. In some disclosed examples, a portion of an outer mold line of the slat is to be aligned with a portion of an outer mold line of the chine when the slat is in the stowed position. In some disclosed examples, the chine is to generate a vortex in response to an airflow presented at the chine when the slat is in the deployed position. In some disclosed examples, the vortex is to energize a boundary layer of the airfoil.

In some disclosed examples of the first example apparatus, the lateral surface of the chine is a first lateral surface of the chine located opposite a second lateral surface of the chine, the slat is a first slat located adjacent the first lateral surface of the chine, the stowed position is a first stowed position, and the deployed position is a first deployed position. In some disclosed examples, the first example apparatus further comprises a second slat located adjacent the second lateral surface of the chine and coupled to the airfoil. In some disclosed examples, the second slat is movable relative to the airfoil between a second stowed position and a second deployed position. In some disclosed examples, the second slat is to expose the second lateral surface of the chine when the second slat is in the second deployed position and to cover the second lateral surface of the chine when the second slat is in the second stowed position.

In some disclosed examples, a second example apparatus comprises a chine and a slat. In some disclosed examples, the chine is coupled to an airfoil. In some disclosed examples, the chine has a first lateral surface and a second lateral surface located opposite the first lateral surface. In some disclosed examples, the slat is coupled to the airfoil. In some disclosed examples, the chine is located within a lateral extent of the slat along the airfoil. In some disclosed examples, the slat is movable relative to the airfoil between a stowed position and a deployed position. In some disclosed examples, the slat is to expose the first lateral surface and the second lateral surface of the chine when the slat is in the deployed position and to cover the first lateral surface and the second lateral surface of the chine when the slat is in the stowed position.

In some disclosed examples of the second example apparatus, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine is located outboard of a nacelle coupled to the airfoil. In some disclosed examples, a portion of an outer mold line of the slat is to be aligned with a portion of an outer mold line of the chine when the slat is in the stowed position. In some disclosed examples, the chine is to generate a vortex in response to an airflow presented at the chine when the slat is in the deployed position. In some disclosed examples, the vortex is to energize a boundary layer of the airfoil In some disclosed examples, a third example apparatus comprises a chine and a slat. In some disclosed examples, the chine is coupled to an airfoil. In some disclosed examples, the chine has an outer mold line. In some disclosed examples, the slat is coupled to the airfoil. In some disclosed examples, the chine is located within a lateral extent of the slat along the airfoil. In some disclosed examples, the slat is movable relative to the airfoil between a stowed position and a deployed position. In some disclosed examples, the slat is to expose the outer mold line of the chine when the slat is in the deployed position and to cover the outer mold line of the chine when the slat is in the stowed position.

In some disclosed examples of the third example apparatus, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine extends from the leading edge of the airfoil in a first direction that is at an angle relative to a second direction, the slat being movable relative to the airfoil along the second direction. In some disclosed examples, the angle is approximately fifteen degrees in an inboard direction. In some disclosed examples, the chine is located outboard of a nacelle coupled to the airfoil. In some disclosed examples, the chine is to generate a vortex in response to an airflow presented at the chine when the slat is in the deployed position. In some disclosed examples, the vortex is to energize a boundary layer of the airfoil.

In some disclosed examples, a first example method comprises moving a slat relative to an airfoil between a stowed position and a deployed position. In some disclosed examples, the slat is coupled to the airfoil. In some disclosed examples, the slat is located adjacent a lateral surface of a chine. In some disclosed examples, the chine is coupled to the airfoil. In some disclosed examples, the slat is to expose the lateral surface of the chine when the slat is in the deployed position and to cover the lateral surface of the chine when the slat is in the stowed position.

In some disclosed examples of the first example method, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine is located outboard of a nacelle coupled to the airfoil. In some disclosed examples, a portion of an outer mold line of the slat is to be aligned with a portion of an outer mold line of the chine when the slat is in the stowed position.

In some disclosed examples, the first example method further comprises generating a vortex via the chine in response to an airflow presented at the chine when the slat is in the deployed position. In some disclosed examples, the first example method further comprises energizing a boundary layer of the airfoil via the vortex.

In some disclosed examples of the first example method, the lateral surface of the chine is a first lateral surface of the chine located opposite a second lateral surface of the chine, the slat is a first slat located adjacent the first lateral surface of the chine, the stowed position is a first stowed position, and the deployed position is a first deployed position. In some disclosed examples, the first example method further comprises moving a second slat relative to the airfoil between a second stowed position and a second deployed position. In some disclosed examples, the second slat is coupled to the airfoil. In some disclosed examples, the second slat is located adjacent the second lateral surface of the chine. In some disclosed examples, the second slat is to expose the second lateral surface of the chine when the second slat is in the second deployed position and to cover the second lateral surface of the chine when the second slat is in the second stowed position.

In some disclosed examples, a second example method comprises moving a slat relative to an airfoil between a stowed position and a deployed position. In some disclosed examples, the slat is coupled to the airfoil. In some disclosed examples, the chine is coupled to the airfoil. In some disclosed examples, the chine is located within a lateral extent of the slat along the airfoil. In some disclosed examples, the chine has a first lateral surface and a second lateral surface located opposite the first lateral surface. In some disclosed examples, the slat is to expose the first surface and the second lateral surface of the chine when the slat is in the deployed position and to cover the first lateral surface and the second lateral surface of the chine when the slat is in the stowed position.

In some disclosed examples of the second example method, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine is located outboard of a nacelle coupled to the airfoil. In some disclosed examples, a portion of an outer mold line of the slat is to be aligned with a portion of an outer mold line of the chine when the slat is in the stowed position.

In some disclosed examples, the second example method further comprises generating a vortex via the chine in response to an airflow presented at the chine when the slat is in the deployed position. In some disclosed examples, the second example method further comprises energizing a boundary layer of the airfoil via the vortex.

In some disclosed examples, a third example method comprises moving a slat relative to an airfoil between a stowed position and a deployed position. In some disclosed examples, the slat is coupled to the airfoil. In some disclosed examples, a chine having an outer mold line is coupled to the airfoil. In some disclosed examples, the chine is located within a lateral extent of the slat along the airfoil. In some disclosed examples, the slat is to expose the outer mold line of the chine when the slat is in the deployed position and to cover the outer mold line of the chine when the slat is in the stowed position.

In some disclosed examples of the third example method, the chine is located at a leading edge of the airfoil. In some disclosed examples, the chine extends from the leading edge of the airfoil in a first direction that is parallel to a second direction, the slat being moveable relative to the airfoil along the second direction. In some disclosed examples, the chine extends from the leading edge of the airfoil in a first direction that is at an angle relative to a second direction, the slat being movable relative to the airfoil along the second direction. In some disclosed examples, the angle is approximately fifteen degrees in an inboard direction. In some disclosed examples, the chine is located outboard of a nacelle coupled to the airfoil.

In some disclosed examples, the third example method further comprises generating a vortex via the chine in response to an airflow presented at the chine when the slat is in the deployed position. In some disclosed examples, the third example method further comprises energizing a boundary layer of the airfoil via the vortex.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a chine coupled to an airfoil at a fixed position relative to a leading edge of the airfoil, the chine having a lateral surface; and
    a slat located adjacent the lateral surface of the chine and coupled to the airfoil, the slat being movable relative to the airfoil between a stowed position and a deployed position, the slat exposing the lateral surface of the chine when the slat is in the deployed position, the slat completely covering the lateral surface of the chine when the slat is in the stowed position.

2. The apparatus of claim 1, wherein the chine is located at the leading edge of the airfoil.

3. The apparatus of claim 2, wherein the chine extends from the leading edge of the airfoil in a first direction that is parallel to a second direction, the slat being moveable relative to the airfoil along the second direction.

4. The apparatus of claim 1, wherein the chine is located outboard of a nacelle coupled to the airfoil.

5. The apparatus of claim 1, wherein a portion of an outer mold line of the slat is flush with a portion of an outer mold line of the chine when the slat is in the stowed position.

6. The apparatus of claim 1, wherein the chine generates a vortex to energize a boundary layer of the airfoil in response to an airflow presented at the chine when the slat is in the deployed position, and wherein the chine does not generate the vortex when the slat is in the stowed position.

7. The apparatus of claim 1, wherein the lateral surface of the chine is a first lateral surface of the chine located opposite a second lateral surface of the chine, the slat is a first slat located adjacent the first lateral surface of the chine, the stowed position is a first stowed position, and the deployed position is a first deployed position, the apparatus further comprising a second slat located adjacent the second lateral surface of the chine and coupled to the airfoil, the second slat being movable relative to the airfoil between a second stowed position and a second deployed position, the second slat exposing the second lateral surface of the chine when the second slat is in the second deployed position, the second slat completely covering the second lateral surface of the chine when the second slat is in the second stowed position.

8. An apparatus, comprising:
    a chine coupled to an airfoil at a fixed position relative to a leading edge of the airfoil, the chine having a first lateral surface and a second lateral surface located opposite the first lateral surface; and
    a slat coupled to the airfoil, the chine being located within a lateral extent of the slat along a spanwise direction of the airfoil, the slat being movable relative to the airfoil between a stowed position and a deployed position, the slat exposing the first lateral surface and the second lateral surface of the chine when the slat is in the deployed position, the slat covering the first lateral surface and the second lateral surface of the chine when the slat is in the stowed position.

9. The apparatus of claim 8, wherein the chine is located at the leading edge of the airfoil.

10. The apparatus of claim 9, wherein the chine extends from the leading edge of the airfoil in a first direction that is parallel to a second direction, the slat being moveable relative to the airfoil along the second direction.

11. The apparatus of claim 8, wherein the chine is located outboard of a nacelle coupled to the airfoil.

12. The apparatus of claim 8, wherein a portion of an outer mold line of the slat is flush with a portion of an outer mold line of the chine when the slat is in the stowed position.

13. The apparatus of claim 8, wherein the chine generates a vortex to energize a boundary layer of the airfoil in response to an airflow presented at the chine when the slat is in the deployed position, and wherein the chine does not generate the vortex when the slat is in the stowed position.

14. An apparatus, comprising:
    a chine coupled to an airfoil at a fixed position relative to a leading edge of the airfoil, the chine having an outer mold line; and a slat coupled to the airfoil, the chine being located within a lateral extent of the slat along a spanwise direction of the airfoil, the slat being movable relative to the airfoil between a stowed position and a deployed position, the slat exposing the outer mold line of the chine when the slat is in the deployed position, the slat covering the outer mold line of the chine when the slat is in the stowed position.

15. The apparatus of claim 14, wherein the chine is located at the leading edge of the airfoil.

16. The apparatus of claim 15, wherein the chine extends from the leading edge of the airfoil in a first direction that is parallel to a second direction, the slat being moveable relative to the airfoil along the second direction.

17. The apparatus of claim 15, wherein the chine extends from the leading edge of the airfoil in a first direction that is at an angle relative to a second direction, the slat being movable relative to the airfoil along the second direction.

18. The apparatus of claim 17, wherein the angle is approximately fifteen degrees in an inboard direction.

19. The apparatus of claim 14, wherein the chine is located outboard of a nacelle coupled to the airfoil.

20. The apparatus of claim 14, wherein the chine generates a vortex to energize a boundary layer of the airfoil in response to an airflow presented at the chine when the slat is in the deployed position, and wherein the chine does not generate the vortex when the slat is in the stowed position.

* * * * *